US012216969B2

(12) United States Patent
Macklin et al.

(10) Patent No.: US 12,216,969 B2
(45) Date of Patent: Feb. 4, 2025

(54) METHODS OF CONTACT FOR SIMULATION

(71) Applicant: NVIDIA Corporation, Santa Clara, CA (US)

(72) Inventors: Miles Macklin, Auckland (NZ); Matthias Mueller-Fischer, Zürich (CH); Nuttapong Chentanez, Bangkok (TH); Stefan Jeschke, Vienna (AT); Tae-Yong Kim, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1033 days.

(21) Appl. No.: 17/012,709

(22) Filed: Sep. 4, 2020

(65) Prior Publication Data

US 2022/0075914 A1 Mar. 10, 2022

(51) Int. Cl.
| | | |
|---|---|---|
| *G06F 30/23* | (2020.01) | |
| *G06F 17/16* | (2006.01) | |
| *G06F 30/27* | (2020.01) | |
| *G06N 3/08* | (2023.01) | |
| *G06T 1/20* | (2006.01) | |
| *G06T 15/00* | (2011.01) | |
| *G06T 15/06* | (2011.01) | |
| *G06T 17/20* | (2006.01) | |
| *G06F 111/04* | (2020.01) | |
| *G06F 113/12* | (2020.01) | |

(52) U.S. Cl.
CPC ............. *G06F 30/23* (2020.01); *G06F 17/16* (2013.01); *G06F 30/27* (2020.01); *G06N 3/08* (2013.01); *G06T 1/20* (2013.01); *G06T 15/005* (2013.01); *G06T 15/06* (2013.01); *G06T 17/20* (2013.01); *G06F 2111/04* (2020.01); *G06F 2113/12* (2020.01)

(58) Field of Classification Search
CPC ................. G06F 30/23; G06F 2111/04; G06F 2113/12; G06F 30/20; G06F 17/12; G06F 17/13; G06F 2119/14; G06F 17/16; G06F 30/27; G06N 3/08; G06T 1/20; G06T 15/005; G06T 15/06; G06T 17/20; G06T 2111/04; G06T 2113/12; G06T 30/20; G06T 17/12; G06T 17/13; G06T 2119/14
USPC ............................................................ 703/6
See application file for complete search history.

(56) References Cited

U.S. PATENT DOCUMENTS

2020/0082589 A1* 3/2020 Teran ..................... G06T 15/005

OTHER PUBLICATIONS

Baraff, David et al. "Large Steps in Cloth Simulation", 1998, Siggraph. (Year: 1998).*
Wang, Huamin et al., "Descent Methods for Elastic Body Simulation on the GPU", Nov. 2016, ACM Trans. Graph. 35, 6, Article 212, ACM. (Year: 2016).*
Baraff, David, "Fast Contact Force Computation for Nonpenetrating Rigid Bodies", Jul. 24-29, 1994, Siggraph '94, ACM. (Year: 1994).*

(Continued)

*Primary Examiner* — Cedric Johnson
(74) *Attorney, Agent, or Firm* — Davis Wright Tremaine LLP

(57) ABSTRACT

Apparatuses, systems, and techniques apply to a force-based (e.g., primal) formulation for object simulation. In at least one embodiment, updates to the force-based formulation is determined by solving for constraints that are to be satisfied when simulating rigid bodies (e.g., contact rich scenarios).

20 Claims, 53 Drawing Sheets

600

Primal 602

Dual 604

Resulting Simulation In A Stiffness Ratio Test

(56) References Cited

OTHER PUBLICATIONS

Ding, Ounan et al., "Penalty Force of Coupling Materials with Coulomb Friction", Jul. 2020, IEEE Transactions on Visualization and Computer Graphics, vol. 26, No. 7, IEEE. (Year: 2020).*
Wong. S.-K. et al., "Modeling and Simulation Techniques for Garments", 2011, Woodhead Publishing Limited. (Year: 2011).*
Jeon, Inyong et al., "Constrainable Multigrid for Cloth", 2013, Pacific Graphics, vol. 32, No. 7, The Eurographics Association and John Wiley and Sons Ltd. (Year: 2013).*
Pan, Zherong et al., "GPU-Based Contact-Aware Trajectory Optimization Using a Smooth Force Model", Jul. 26-28, 2019, SCA '19, Association for Computing Machinery. (Year: 2019).*
Andrews et al., "Geometric Stiffness for Real-time Constrained Multibody Dynamics," Computer Graphics Forum, vol. 36, Wiley Online Library, 2017, 12 pages.
Baraff et al., "Large Steps in Cloth Simulation," Proceedings of the 25th Annual Conference on Computer graphics and Interactive Techniques, ACM, Jul. 19-24, 1998, 12 pages.
Batty et al., "A Fast Variational Framework for Accurate Solid-Fluid Coupling," ACM Transactions on Graphics, 26(3): Jul. 2007, 7 pages.
Bell et al., "Particle-Based Simulation of Granular Materials," Proceedings of the ACM SIGGRAPH/Eurographics Symposium on Computer animation, 2005, 10 pages.
Bender et al., "Interactive Simulation of Rigid Body Dynamics in Computer Graphics," Computer Graphics Forum 33(1): Feb. 2014, 25 pages.
Bertsekas, "Nonlinear Programming," Athena Scientific, 1995, 372 pages.
Bouaziz et al., "Projective Dynamics: Fusing Constraint Projections for Fast Fimulation," ACM Transactions on Graphics, 33(4): 2014, 11 pages.
Boyd et al., "Convex Optimization," Cambridge University Press, 2004, 730 pages.
Chen et al., "EigenFit for Consistent Elastodynamic Simulation Across Mesh Resolution," Proceedings of the 18th annual ACM SIGGRAPH/Eurographics Symposium on Computer Animation, 2019, 13 pages.
Daviet et al., "A Hybrid Iterative Solver for Robustly Capturing Coulomb Friction in Hair Dynamics," ACM Transactions on Graphics, vol. 30, 2011, 12 pages.
Desbrun et al., "Interactive Animation of Structured Deformable Objects," 1999, 8 pages.
Ding et al., "Penalty Force for Coupling Materials with Coulomb Friction," IEEE Transactions on Visualization and Computer Graphics, 2019, 13 pages.
Drumwright, "A Fast and Stable Penalty Method for Rigid Body Simulation," IEEE Transactions on Visualization and Computer Graphics 14(1): 2007, 12 pages.
Ebert et al., "Texturing & Modeling: A Procedural Approach," Morgan Kaufmann, 2003, 721 pages.
Erleben, "Methodology for Assessing Mesh-Based Contact Point Methods," ACM Transactions on Graphics, 37(3): Article 39, Jul. 2018, 30 pages.
Erleben, "Numerical Methods for Linear Complementarity Problems in Physics-Based Animation," ACM SIGGRAPH 2013 Courses, Feb. 2013, 42 pages.
Erleben, "Rigid Body Contact Problems using Proximal Operators, " Proceedings of the ACM Symposium on Computer Animation, 2017, 12 pages.
Featherstone, "Rigid Body Dynamics Algorithms, " Springer, 2014, 276 pages.
Gast et al., "Optimization Integrator for Large Time Steps," IEEE transactions on Visualization and Computer Graphics, 21(10): 2015, 13 pages.
Goldenthal et al., "Efficient Simulation of Inextensible Cloth," ACM Transactions on Graphics, vol. 26, 2007, 7 pages.
Guendelman et al., "Nonconvex Rigid Bodies with Stacking," ACM Transactions on Graphics, 22(3): Jul. 2003, 8 pages.

Horak et al., "On the Similarities and Differences Among Contact Models in Robot Simulation," IEEE Robotics and Automation Letters, 4(2): Apr. 2019.
IEEE, "IEEE Standard 754-2008 (Revision of IEEE Standard 754-1985): IEEE Standard for Floating-Point Arithmetic," Aug. 29, 2008, 70 pages.
Johnson, "Contact Mechanics," Cambridge University Press, 1985, 462 pages.
Kang et al., "Fast and Stable Animation of Cloth with an Approximated Implicit Method," Proceedings Computer Graphics International, IEEE, 2000, 9 pages.
Kaufman et al., "Staggered Projections for Frictional Contact in Multibody Systems," ACM Transactions on Graphics, vol. 27, 2008, 11 pages.
Lee et al., "Angle of Repose and Angle of Marginal Stability: Molecular Dynamics of Granular Particles," Journal of Physics A: Mathematical and General 26, 1993, 11 pages.
Li et al., "Fast Simulation of Deformable Characters with Articulated Skeletons in Projective Dynamics," Proceedings of the 18th Annual ACM SIGGRAPH/Eurographics Symposium on Computer Animation, 2019, 10 pages.
Liu et al., "Fast Simulation of Mass-Spring Systems," ACM Transactions on Graphics, 32(6): 2013, 7 pages.
Liu et al., "On the Limited Memory BFGS Method for Large Scale Optimization," Mathematical Programming 45, 1989, 27 pages.
Liu et al., "Quasi-newton Methods for Real-Time Simulation of Hyperelastic Materials," ACM Transactions on Graphics, 36(3): 2017, 16 pages.
Macklin et al., "XPBD: Position-Based Simulation of Compliant Constrained Dynamics," Proceedings of the 9th International Conference on Motion in Games, 2016, 6 pages.
Marhefka et al., "Simulation of Contact using a Nonlinear Damping Model," Proceedings of IEEE International Conference on Robotics and Automation, vol. 2, 1996, 7 pages.
Martin et al., "Unified Simulation of Elastic Rods, Shells, and Solids," ACM, Article 39, Mar. 2010, 10 pages.
Mazhar et al., "An Analysis of Several Methods for Handling Hard-Sphere Frictional Contact in Rigid Multibody Dynamics," 2014, 25 pages.
Müller et al., "Position Based Dynamics", Journal of Visual Communication and Image Representation, 18(2): 2007, 10 pages.
Narain et al., "Adaptive Anisotropic Remeshing for Cloth Simulation," ACM Transactions on Graphics 31(6): Nov. 2012, 10 pages.
Narain et al., ADMM ? Projective Dynamics: Fast Simulation of General Constitutive Models. In Proceedings of the ACM SIGGRAPH/Eurographics Symposium on Computer Animation, 2016, 8 pages.
Niebe et al., "Numerical Methods for Linear Complementarity Problems in Physics-Based Animation," Synthesis Lectures on Computer Graphics and Animation 7(1): 2015, 155 pages.
Overby et al., ADMM ? Projective Dynamics: Fast Simulation of Hyperelastic Models with Dynamic Constraints. IEEE Transactions on Visualization and Computer Graphics 23(10): 2017, 14 pages.
Pan et al., "GPU-Based Contact-Aware Trajectory Optimization Using a Smooth Force Model," Association for Computing Machinery, Article 4, 2019, 12 pages.
Servin et al., "Interactive Simulation of Elastic Deformable Materials," Proceedings of SIGRAD Conference, 2006, 11 pages.
Smith et al., "Reflections on Simultaneous Impact," ACM Transactions on Graphics, 31(4): 2012, 12 pages.
Soler et al., "Cosserat Rods with Projective Dynamics," Computer Graphics Forum, 37(8): Wiley Online Library, 2018, 11 pages.
Stam, "Nucleus: Towards a Unified Dynamics Solver for Computer Graphics," Computer-Aided Design and Computer Graphics, IEEE International Conference, 2009, 11 pages.
Stewart, "An Implicit Time-Stepping Scheme for Rigid Body Dynamics with Inelastic Collisions and Coulomb Friction," 39(15): 1996, 8 pages.
Stewart, "Rigid-Body Dynamics with Friction and Impact," SIAM Review, 42(1): 2000, 37 pages.
Tang et al., "Continuous Penalty Forces," ACM Transactions on Graphics, 31(4): 2012, 9 pages.

(56) References Cited

OTHER PUBLICATIONS

Tang et al., "I-Cloth: Incremental Collision Handling for GPU-Based Interactive Cloth Simulation," ACM Transactions on Graphics, 37(6): 2018, 10 pages.
Todorov et al., "MuJoCo : A Physics Engine for Model-Based Control," 2012, 8 pages.
Todorov, Convex and Analytically-Invertible Dynamics with Contacts and Constraints: Theory and Implementation in MuJoCo, IEEE International Conference on Robotics and Automation, 2014, 8 pages.
Tonge et al., "Mass Splitting for Jitter-Free Parallel Rigid Body Simulation," ACM Transactions on Graphics, 31(4): Jul. 2012, 8 pages.
Tournier et al., Stable Constrained Dynamics, ACM Transactions on Graphics, 34(4): 2015, 10 pages.
Wang et al., "Descent Methods for Elastic Body Simulation on the GPU," ACM Transactions on Graphics, 35(6): 2016, 10 pages.
Wang, "A Chebyshev Semi-Iterative Approach for Accelerating Projective and Position-Based Dynamics," ACM Transactions on Graphics, 34(6): 2015, 9 pages.
Xu et al., "Implicit Multibody Penaltybaseddistributed Contact," IEEE Transactions on Visualization and Computer Graphics, 20(9): 2014, 14 pages.
Yamane et al., "Stable Penalty-Based Model of Frictional Contacts," Proceedings IEEE International Conference on Robotics and Automation, 2006, 6 pages.
Zhang et al., "Accelerating ADMM for Efficient Simulation and Optimization," ACM Transactions on Graphics, 38(6): 2019, 21 pages.
Zheng et al., "Toward High-Quality Modal Contact Sound," ACM Transactions on Graphics, 30(4): Aug. 2011, 11 pages.

\* cited by examiner

Resulting Frames From A Large Scale Piling Example

Resulting Simulation In A Stiffness Ratio Test

Resulting Simulation In A Mass Ratio Test

Primal 1002 Dual 1004

Resulting Simulation In A Contact Mass Ratio Test

Resulting Simulation In A Contact Stiffness Ratio Test

Resulting Simulation Of Grasp Stability With Varying Friction Stiffness

METHODS OF CONTACT FOR SIMULATION

TECHNICAL FIELD

At least one embodiment pertains to processing resources used to execute one or more programs to determine constraints for object simulation. For example, at least one embodiment pertains to processors or computing systems used to execute one or more programs that simulate contact between objects using primal formulations.

BACKGROUND

Variational frameworks such as Projective Dynamics (PD) have proved popular for deformation simulation, such as simulation of cloth or deformable body parts. Given a continuous time dynamics model, an implicit time discretization will generally result in a nonlinear system of equations. Many numerical methods have been proposed to solve these discretized equations of motion, which are categorized broadly as primal and dual methods. However, performing computational operations such as primal and dual methods on rigid body simulations in high contact scenarios can use significant memory, time, and/or computing resources to ensure that objects do not penetrate one another. In high contact scenarios, performing primal and dual methods may produce undesirable effects, such as where the objects being simulated can result in uneven surfaces or undesired interpenetration between objects.

DETAILED DESCRIPTION

Figure 1:
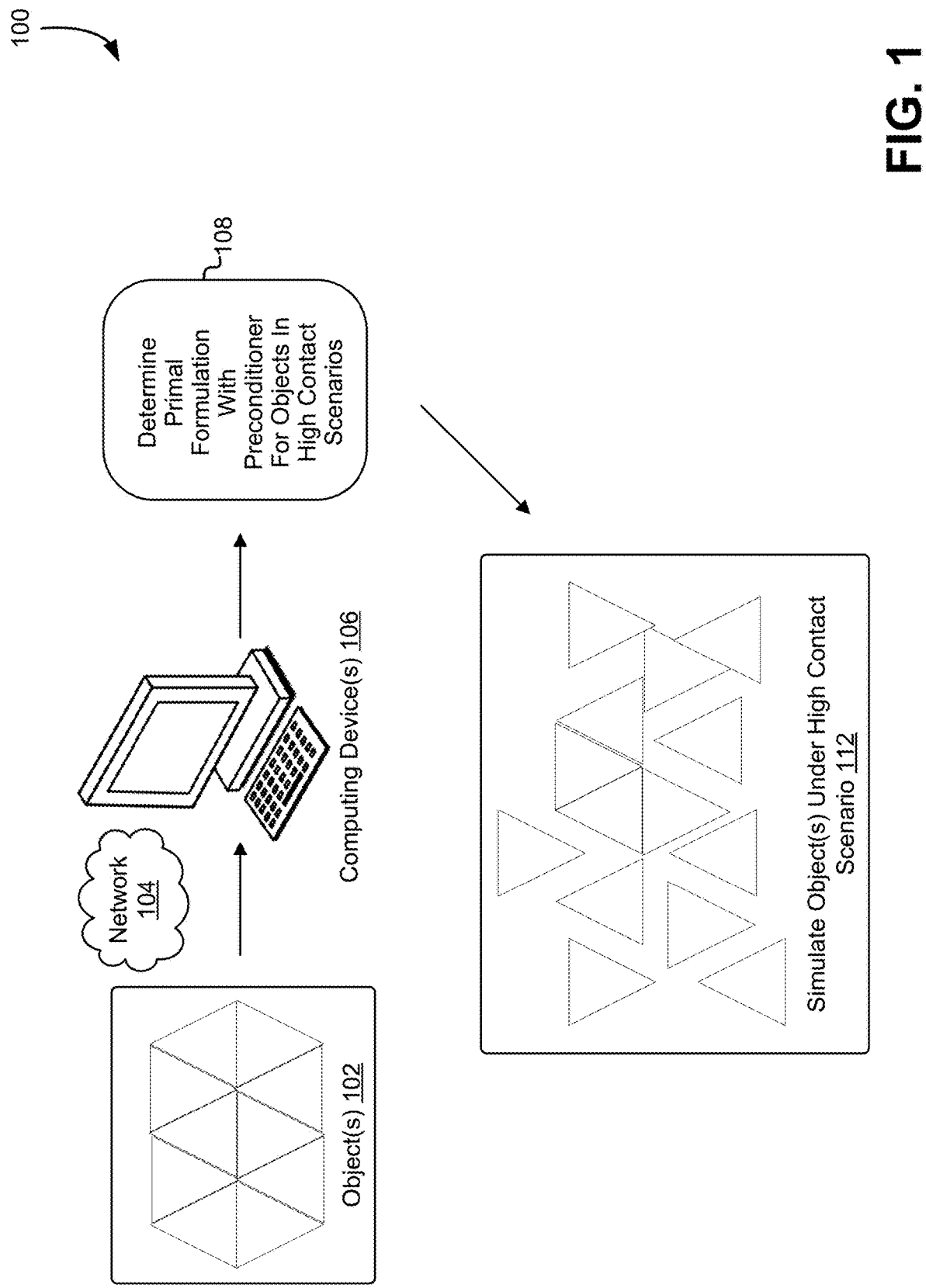
FIG. 1 illustrates a diagram of an example system that determines constraints of the system for object simulations, according to at least one embodiment.

Techniques described herein are directed to an improvement to force-based (e.g., primal) and constraint-based (e.g., dual) formulations used to simulate objects to achieve certain simulation goals. In one example, a system simulates objects with different properties (e.g., rigid body objects) with contact-rich scenarios such as rigid body simulations. Simulation involves movement of objects from one frame to the next while satisfying constraints of the system (e.g., no penetration of objects, having smooth contact force distributions). Accordingly, the system determines the constraints for an object so that the next state (frame) for the object can satisfy the constraints and achieve the simulation's goals.

After determining constraints for objects to be simulated, contact forces between objects are solved (e.g., strength of the constraints or force of the constraints are computed) as the objects move from one frame to the next so that the constraints in a dual formulation are satisfied (e.g., one object does not collide with the other). Likewise, when applying the primal formulation, the system can also solve for the forces (e.g., friction force) of an object from one frame to another to achieve a certain simulation goal (e.g., where two objects do not overlap one another). To compute the forces in the primal formulation that satisfy the constraints, techniques described herein utilize a robust numerical method that can efficiently solve a nonlinear optimization problem. The efficiency of the optimization method, in some embodiments, is further improved by the inclusion of a suitable preconditioner.

Specifically, the techniques described herein expands upon methods (e.g., primal methods) with respect to dry frictional contact by deriving a smooth approximation of the Coulomb friction model from a variational basis, and the provision of an efficient preconditioner suitable for parallelization. That is, techniques described herein provide a primal method (formulation) of contact that is differentiable, insensitive to mass-ratios, and can be utilized without tracking of auxiliary variables. The primal method, being differentiable, has well-defined inverse dynamics, which is an important property for trajectory optimization. Moreover, as the primal method is insensitive to mass ratios, the primal method may be applied to stably simulate scenarios involving both small and large bodies. In addition, given that the primal method can be utilized without the tracking of auxiliary variables such as Lagrange multipliers, the system size remains constant over the course of a simulation, which is desirable if using the system state as an input to a model, such as a neural network controller. Additionally, force distributions obtained from relaxed contact models are found to be smoother than the result from hard-contact models, which can be desirable when contact forces act as input to control algorithms.

The techniques described herein provide a primal method such as Projective Dynamics (PD) that is derived from a common variational basis. The primal method (sometimes referred to herein simply as a primal model, primal frictional contact model, relaxed primal model, relaxed contact model, force-based formulation, primal formulation, variational, and/or optimization-based formulation) may be derived from a variational basis on rigid body simulations and may be utilized to improve visualizations during simulation. The primal method described herein is also simple to implement, supports differentiability, and is well-suited to graphics processing units (GPUs) and other parallel processing devices. In an embodiment, a relaxed primal model (e.g., an optimization-based primal formulation) is combined with a descent-based solver well-suited for GPU implementations and capable of scaling to hundreds of thousands of simultaneous contacts. The techniques described herein uses a new preconditioned frictional contact solver that is compatible with existing primal optimization methods, and competitive with complementarity-based approaches. The relaxed primal model generates improved contact force distributions when compared to dual methods, and has the advantage of being differentiable, making it well-suited for trajectory optimization.

Moreover, the primal method disclosed herein also has an advantage in that it can be performed without the inversion of the mass matrix M. The techniques described herein provide for the use of consistent mass matrices, which are able to produce more accurate results for finite element model-based (FEM-based) simulations. Primal methods also make it particularly easy to perform implicit integration of arbitrary force models. For example, materials with nonlinear constitutive equations, or activation models with complex dynamics such as muscle-tendon units. Unlike dual methods, which performs a finding of a suitable variable splitting, primal methods use force Jacobians, or their approximation.

FIG. 1 illustrates a diagram of an example system 100 that determines constraints of the system 100 for object simulations, according to at least one embodiment. In an embodiment, a system 100 with one or more computing devices 106 receives one or more input data (e.g., objects) 102 over network 104 that is to be simulated. In an embodiment, one or more computing devices 106 comprise one or more processors (e.g., compute unified device architecture (CUDA)-enabled GPUs) that are configured to execute CUDA code to determine a set of constraints (or simply referring to herein as constraints) of the system 100. The system 100 determines the constraints by applying a primal formulation for one or more objects 102 in high contact scenarios. In an embodiment, primal formulations are typically expressed and solved in terms of degrees of freedom, e.g., positions, velocities, and forces. In an embodiment, components of system 100 may communicate between and among one another using any of a variety of different network types, including but not limited to local area networks (LANs) and/or wide area networks (WANs) via wired and/or wireless communication protocols.

That is, in an embodiment, the one or more computing devices 106 receive the one or more objects 102 over network 104. In an embodiment, the one or more computing devices 106 execute one or more programs (e.g., CUDA programs) to simulate the one or more objects 102 to achieve certain simulation goals. In an embodiment, the system 100 simulates the one or more objects 102 with different properties (e.g., rigid body objects) in contact-rich scenarios such as rigid body simulations. Whenever the one or more objects 102 move from one point in time (e.g., frame) to another, during simulation, the constraints of the system 100 need to be satisfied. Some examples of constraints for a simulation include but are not limited to ensuring that objects are not penetrating one another, having smooth contact force distributions, and/or the restriction of movement, etc. Accordingly, the system 100 determines the constraints of the system 100 so that the next state (frame) for the one or more objects 102 can satisfy the constraints and achieve one or more simulation goals.

After determining the constraints on the system 100, when applying the primal formulation, the system 100 may also solve for the forces (e.g., friction force) of the one or more objects 102 from one frame to another to achieve a certain simulation goal. In an embodiment, the system 100 determines a primal formulation with a preconditioner 108 for these objects 102 in high contact scenarios. In an embodiment, to compute the forces in the primal formulation that satisfy the constraints, a robust numerical method is efficiently utilized to solve a nonlinear optimization problem. The efficiency of the optimization method may be further improved by the inclusion of a suitable preconditioner. Once the primal formulation is determined, objects 102 are simulated under high contact scenarios 112. Additional examples of high contact scenarios and the resulting simulations can be found in at least FIGS. 6-7 and 10-15 described below.

In an embodiment, when performing simulation of objects, an implicit time-stepping scheme is formulated as a discrete variational optimization problem, and solved by a system 100 that performs either primal or dual numerical methods. Additionally, a smoothed friction model may be derived from a variational dissipation potential. Results from applying both primal and dual methods for solving the resulting optimization problem are described herein and further compared with one another to illustrate the advantages of using the optimization-based primal formulation to achieve certain simulation goals for the one or more objects 100 that are simulated in high contact scenarios.

In an embodiment, the implicit time-stepping scheme begins by using generalized system coordinates and their time derivatives as $q$ and $\dot{q}$ are defined, respectively. To simplify the following derivations, the system may be re-parameterized by introducing the discrete velocity u+, and the relationship q+=q−+hGu+, where the superscripts +1− indicate the state at the end and start of the time step, respectively. The matrix G may be a kinematic map that maps spatial velocities to system coordinate time derivatives (e.g., $\dot{q}=Gu$). This velocity re-parameterization treats rigid bodies and particles in a unified manner. The discrete equations of motion may then be defined as follows:

$$M(u^+ - \tilde{u}) - \Delta t f(q^+, u^+) = 0. \quad (1)$$

where the constant $\tilde{u} \equiv u^- + \Delta t M^{-1}(f_{ext} + f_{gyro})$ is the unconstrained velocity that includes the external and gyroscopic forces integrated explicitly. As such, implicit time integration may be formulated as an optimization problem. First, the objective function may be defined as follows:

$$g(u) \equiv \frac{1}{2}(u - \tilde{u})^T M(u - \tilde{u}) + \sum_i U_i(q^+(u)), \quad (2)$$

where $U_i$ are arbitrary energy potentials that give rise to the forces f on the system. The optimization problem is then as follows:

$$u^+ \equiv \underset{u}{\operatorname{argmin}}\ g(u). \quad (3)$$

In an embodiment, having an implicit time integration stated in this variational form allows for many robust methods to be utilized to solve such optimization problems, which then provides a more unified treatment. Example techniques utilize first order methods, e.g., those that use only information about the gradient of g since they are simple to implement, and well suited for parallelization. As described in more detail below, the use of second order information is described. Note that the gradient of the objective in equation (2) is simply given by equation (1), e.g.:

$$d|_{u^+} \equiv \frac{\partial g^T}{\partial u}\bigg|_{u^+} = M(u^+ - \tilde{u}) - \Delta t f(q^+, u^+) \quad (4)$$

where the generalized force is $$f = -\sum_i G^T \frac{\partial U_i^T}{\partial q^+}.$$

In an embodiment, minimization of equation (3) is solved using gradient descent. Thus, in an embodiment, the solution $u^+$ and $q^+$ may be updated as follows:

$$u^+ \leftarrow u^+ - \alpha d \quad (5)$$

$$q^+ \leftarrow q^- - \Delta t G u^+ \quad (6)$$

where $\alpha$ is a step-length parameter. Gradient descent typically converges very slowly and a line search may be used to avoid overshooting and divergence. The convergence of gradient descent may be improved by defining a preconditioning matrix P. After defining preconditioning matrix P such that $d^T P d > 0$, the descent update for $u^+$ is then:

$$u^+ \leftarrow u^+ - \alpha P d. \quad (7)$$

In an embodiment, P is an Hessian inverse, e.g.:

$$P \approx H^{-1} \equiv \left(\frac{\partial^2 g}{\partial u^2}\right)^{-1},$$

which corresponds to Newton's method.

In an embodiment, a special case of quadratic energy potentials are considered in a single potential of the form:

$$U \equiv \frac{1}{2} k C(q)^2, \qquad (8)$$

where k is a stiffness parameter, and C(q) a constraint function that can be either a scalar or vector function. The corresponding generalized force arising from U may be defined as follows:

$$f = -G^T \frac{\partial U^T}{\partial q} = -k J^T C(q), \qquad (9)$$

where the constraint Jacobian is given by $$J + \frac{\partial c}{\partial q} G.$$

For a Newton style preconditioner, the Hessian, H, may be utilized for objective function g with respect to the solution variable u, $$H \equiv \frac{\partial^2 g}{\partial u^2} = M - \Delta t \frac{\partial f}{\partial u}. \qquad (10)$$

Assuming the mass M is known, the term to be computed is the force Jacobian $$\frac{\partial f}{\partial u},$$

which, for a quadratic potential, is given by:

$$\frac{\partial f}{\partial u} = -\Delta t k \left[ J^T J + \frac{\partial J}{\partial u} C \right]. \qquad (11)$$

Here, the second term corresponds to geometric stiffness. Using just first-order terms, the preconditioner may be:

$$P^{GN} \equiv [M + \Delta t^2 k J^T J]^{-1} \approx \left[ \frac{\partial^2 g}{\partial u^2} \right]^{-1}, \qquad (12)$$

which corresponds to a Gauss-Newton iteration on g. In an embodiment, computing the inverse or solving a system of equations is avoided by using a simple diagonal approximation, where each entry is the reciprocal of the diagonal of $P^{GN}$, e.g.:

$$P_{dd}^D \equiv \frac{1}{[M_{dd} + \Delta t^2 k J_d^2]}. \qquad (13)$$

(Note that d is the index of the degree of freedom, not the constraint.)

Given an optimization problem in the form of equation (3) indicated above, it may also be possible to construct a dual optimization problem over Lagrange multipliers. That is, the dual problem may be derived for constrained dynamics methods such as extended position-based dynamics (XPBD).

To construct the dual of the primal optimization problem, auxiliary variables $\lambda \equiv -Kc$ where $\equiv \text{diag}[k_1, \ldots, k_n]$, and $c \equiv [C_1, \ldots, C_n]$ are introduced. This provides the system with potential energy as $$U \equiv -\frac{1}{2} c^T \lambda,$$

and define the following Lagrangian function:

$$\mathcal{L}(u, \lambda) \equiv \frac{1}{2}(u - \tilde{u})^T M(u - \tilde{u}) - \lambda^T c(q^+) - \frac{1}{2} \lambda^T K^{-1} \lambda \qquad (14)$$

It can be verified that the stationarity conditions for this Lagrangian function correspond to the original problem (3) with quadratic potentials. The corresponding Lagrange dual function is then $h(\lambda) \equiv \inf_u \mathcal{L}(u^*, \lambda) = \mathcal{L}(u^*, \lambda)$. In general, the constraint functions are nonlinear, and so a closed form expression for u* in terms of λ cannot be obtained. However, assuming constraint linearity, the following approximation can be made $u^* \approx \tilde{u} + \Delta t M^{-1} J^T \lambda$. This may then be inserted into the Lagrangian function, where the dual function is then:

$$h(\lambda) \approx \frac{\Delta t^2}{2} \lambda^T (JM^{-1}J^T) \lambda - \lambda^T c(q^+) - \frac{1}{2} \lambda^T K^{-1} \lambda, \qquad (15)$$

with a corresponding dual maximization problem:

$$\lambda^+ \equiv \underset{\lambda}{\text{argmax}}\ h(\lambda) \qquad (16)$$

To derive the optimality conditions for equation (16), the derivative of h may be taken, while maintaining that $q^+$ is implicitly a function of u* and in turn λ, to obtain:

$$\frac{\partial h}{\partial \lambda} \equiv -[c(q^+) + K^{-1}\lambda] = 0. \qquad (17)$$

This set of nonlinear equations corresponds to the form in the XPBD algorithm. To build a preconditioner, the Hessian with respect to λ is evaluated, again differentiating through the definition of $q^+$, giving:

$$\frac{\partial^2 h}{\partial \lambda^2} \equiv -[\Delta t^2 JM^{-1}J^T + K^{-1}]. \qquad (18)$$

which, in the case of a diagonal approximation, the preconditioner for the dual ascent is then:

$$P_{ii}^D = \frac{1}{\Delta t^2 J_i M^{-1} J_i^T + K_{ii}^{-1}}. \qquad (19)$$

Note that for maximization the sign of the preconditioner reversed to ensure an ascent direction. The update step is then:

$$\lambda^+ \leftarrow \prod \left( \lambda^+ + \alpha P \frac{\partial h}{\partial \lambda} \right), \tag{20}$$

where $\Pi$ is a projection operator used to enforce bound and friction constraints on the dual variables. This is followed by an update of the primal variables:

$$u^+ \leftarrow \tilde{u} + \Delta t M^{-1} J^T \lambda^+, \tag{21}$$

$$q^+ \leftarrow q^- + \Delta t G u^+, \tag{22}$$

This derivation shows how dual-space algorithms such as XPBD may be obtained from the starting point of a primal optimization problem.

In an embodiment, the sensitivity of both primal and dual methods are analyzed by examining the conditioning of the system Hessian side-by-side:

$$\frac{\partial^2 g}{\partial u^2} \equiv [M + \Delta t^2 J^T K J]. \tag{23}$$

$$\frac{\partial^2 h}{\partial \lambda^2} \equiv [\Delta t^2 J M^{-1} J^T + K^{-1}]. \tag{24}$$

Figure 6:
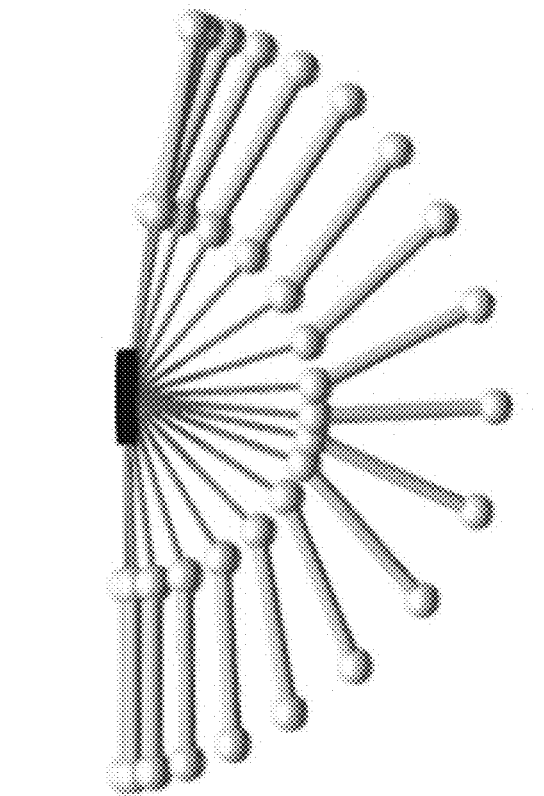
FIG. 6 illustrates a diagram of a simulation in a stiffness ratio test, according to at least one embodiment.
Figure 6:
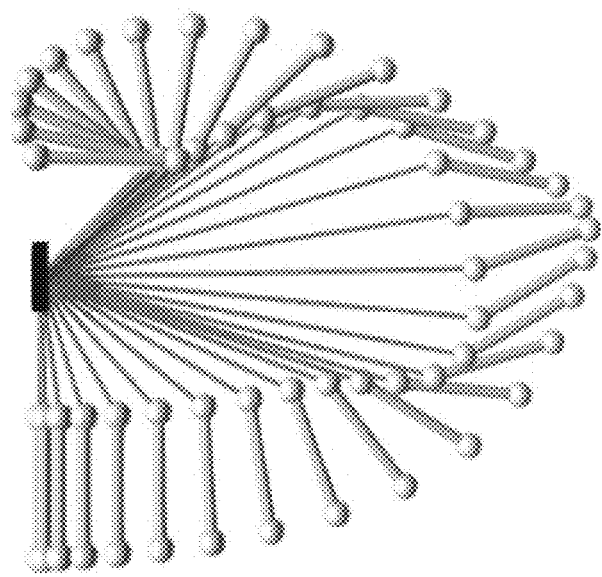
Figure 7:
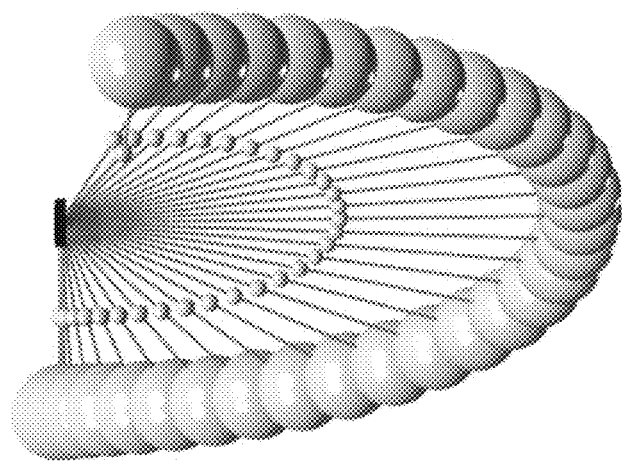
FIG. 7 illustrates a diagram of a simulation in a mass ratio test, according to at least one embodiment.
Figure 7:
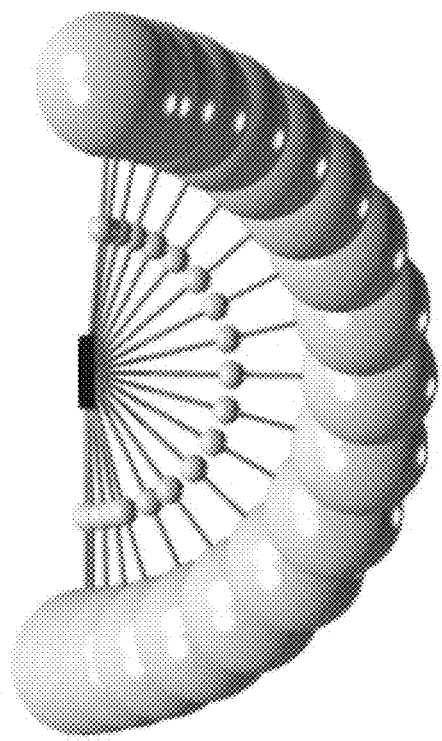
Figure 8:
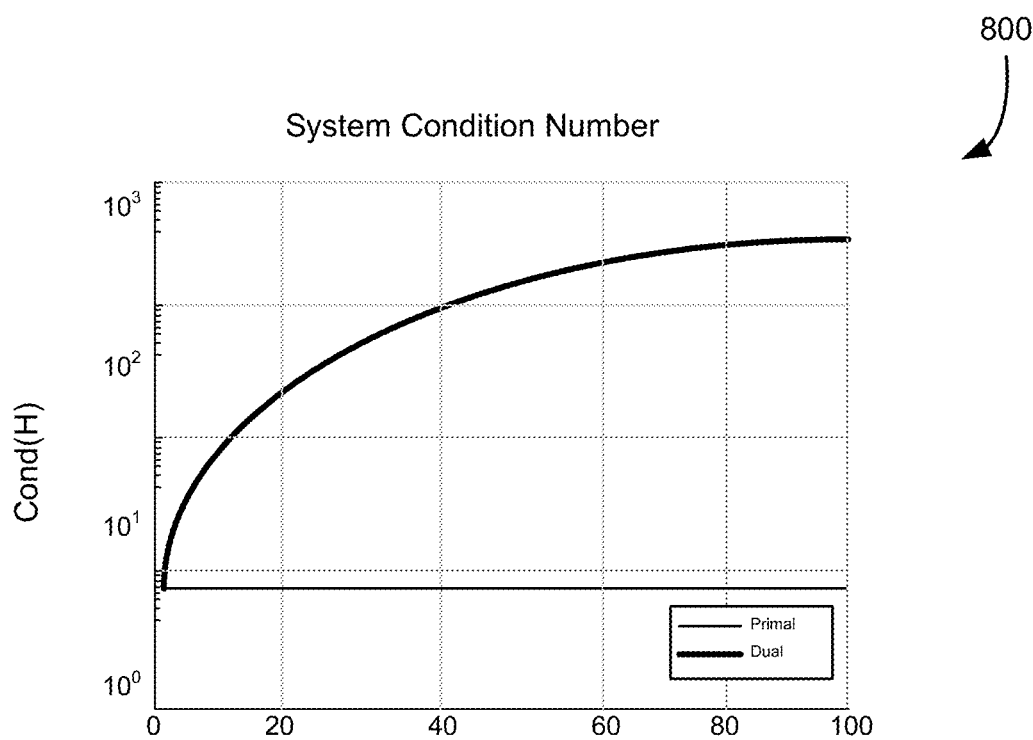
FIG. 8 illustrates graphs for the system condition number with a large mass attached in both a dual and primal system, according to at least one embodiment.
Figure 8:
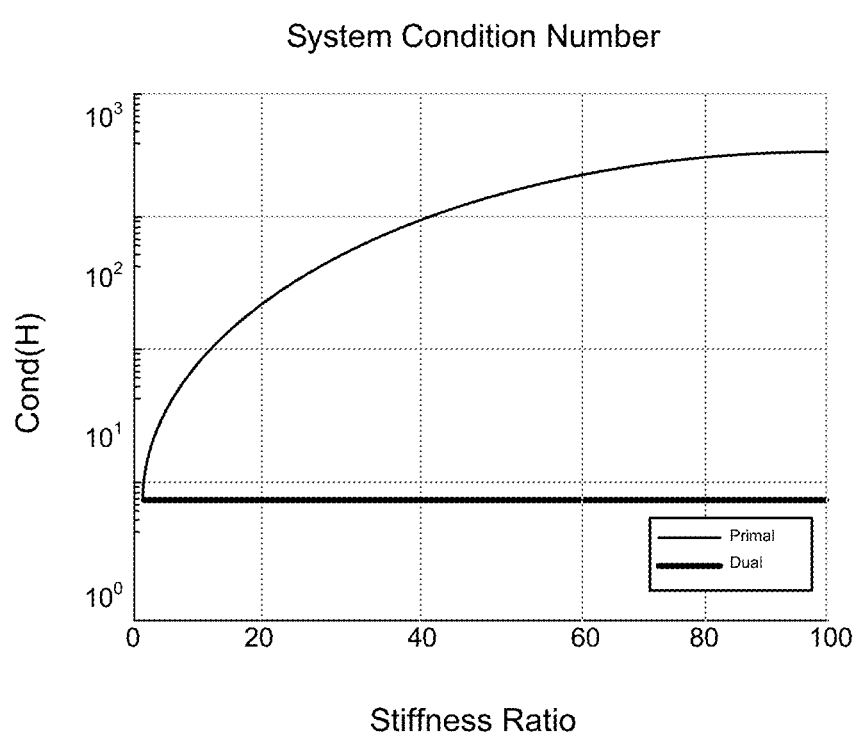

In equation (23) indicated above, when K has a large norm and is poorly conditioned (e.g., there are high stiffness ratios), then, in some embodiments, this will dominate the mass term and primal descent methods will converge slowly, as shown in FIG. 6. The situation is reversed for the dual method as shown in equation (24), when M has a large relative norm and is poorly conditioned (e.g., high mass ratios) then, in some embodiments, the system will be hard to solve for iterative dual methods as shown in FIG. 7. In FIG. 8, for a simple 1-D chain, the condition number of the systems exactly mirror each other for mass/stiffness ratios in each form. Example algorithms for both a primal descent simulation loop and dual ascent simulation loop are provided below:

---
ALGORITHM 1: Primal Descent Simulation Loop.
---
```
while Simulating do
    Perform collision detection;
    u+ ← ũ;
    q+ ← q- + ΔtGu+;
    for n descent iterations do
        Initialize force f, and Jacobian diagonal p;
        f ← 0;
        p ← 0;
        Evaluate forces and derivatives;
        for i forces do
            f ← f + f_i;
            p ← p + diag(Δtk^i J_i^T J_i);
        end
        Build preconditioner;
        for d degrees of freedom do
            P_dd^D = (M_dd + Δtp_d)^-1;
        end
        Compute gradient;
        d ← M(u+ - ũ) - Δtf;
        Update state;
        u+ ← u+ - aP^D d;
        q+ ← q- + ΔtGu+;
    end
end
```

---
ALGORITHM 2: Dual Ascent Simulation Loop
---
```
while Simulating do
    Perform collision detection;
    u+ ← ũ;
    q+ ← q- + ΔtGu+;
    for n ascent iterations do
        Initialize Lagrange multipliers λ, and dual gradient h;
        λ ← 0;
        h ← 0;
        Evaluate constraints and derivatives;
        for i constraints do
            h_i = -C_i(q+) - k_i^-1 λ_i;
            P_ii^D = (Δt^2 J_i M^-1 J_i^T + K_ii^-1)^-1;
        end
        Compute gradient;
        λ ← Π(λ + aP^D h);
        Update state;
        u+ ← u+ + ΔtM^-1 J^T Δλ;
        q+ ← q- + ΔtGu+;
    end
end
```

Figure 2:
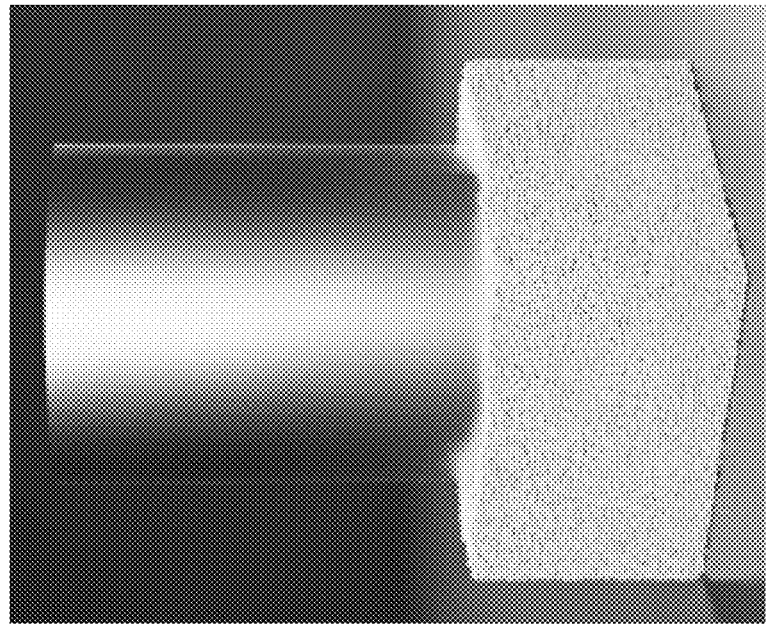
FIG. 2 illustrates a diagram of a rigid body simulation, according to at least one embodiment.
Figure 2:
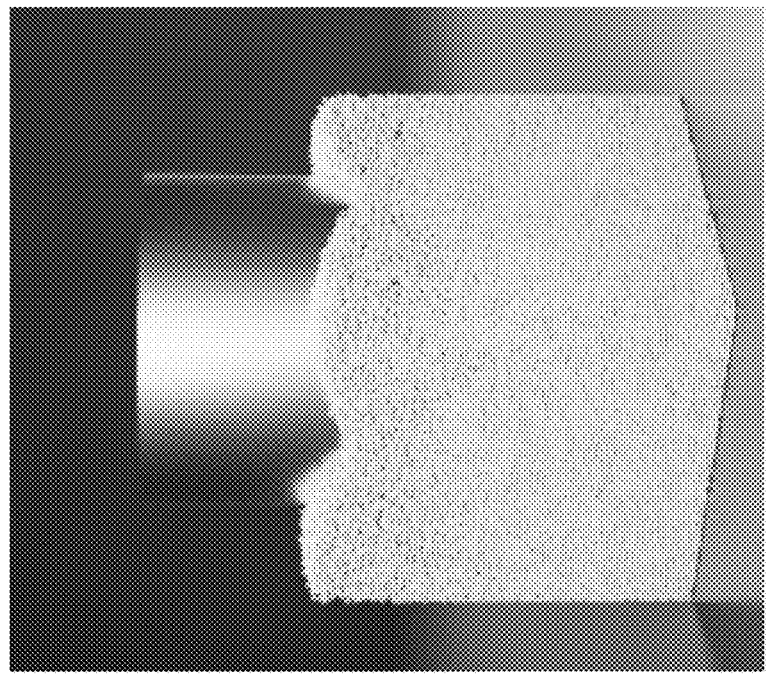

FIG. 2 illustrates a diagram 200 of a rigid body simulation, according to at least one embodiment. That is, as shown in FIG. 2, the granular medium consists of 256 k rigid bodies with an average radius of 5 mm. The resulting mass ratio between the grains and cylinder is 80000:1, which results in an ill-conditioned system for dual formulations (e.g., constraint-based solvers) 202. Primal formulations 204, on the other hand, are relatively unaffected by this ratio. In other words, a granular material consisting of 256 k rigid bodies, as shown in FIG. 2, is simulated. The grains may consist of spherical bodies with an average radius of 5 mm and a mass of 5 g. The contact parameters may be set at $k_n = k_f = 10^4$ and $\mu = 0.3$. A large cylindrical weight is dropped onto the pile creating a mass ratio of 80000:1. After 1.25 seconds of simulation, one of the walls is removed, allowing the grains to flow out. As shown in FIG. 2, for primal formulation 204, the grains support the weight easily, while dual formulation 202 with the same iteration count shows significant compression.

Specifically, in an embodiment with respect to friction forces, the slip velocity at a contact is defined as: $u_s = D^T u \in \mathbb{R}^{n \times 2}$, where $D \in \mathbb{R}^{n \times 2}$ is a basis that projects the body's relative velocity to the tangent plane, defined by two orthogonal vectors, perpendicular to the normal n.

In an embodiment, Coulomb's friction law is derived from a principle of maximal dissipation that results in the following conditions on the equations of motion:

$$D^T u + \lambda_s \nabla \psi(\lambda_f) = 0, \tag{30}$$

$$0 \leq \lambda_s \perp \mu \lambda_n - \psi(\lambda_f) \geq 0, \tag{31}$$

Here $\lambda_f \in \mathbb{R}^2$ is, in an embodiment, a vector of frictional Lagrange multipliers. In an embodiment, $\lambda_s$ is a slack variable that controls stick/slip transitions, and $\psi(\lambda_f)$ is a function that encodes the friction cone as a level set, and $\mu$ is the coefficient of friction, with the final frictional force given by $f_f = D \lambda_f$. As in the contact constraint case (described below with respect to FIG. 4), for a descent-based dual solver, the complementarity constraints may be enforced by projecting the Lagrange multipliers onto the normal cone.

Instead, in an embodiment, a primal formulation of frictional contact is proposed. A variational energy giving rise to frictional dissipation forces is described. However, to address the issue of indeterminacy in static $u_s = 0$ case, the Coulomb model may be relaxed to include a stiff quadratic region around the origin:

$$U_f(u) \equiv \begin{cases} \frac{1}{2}k_f|u_s|^2 & k_f|u_s| < \mu|f_n|, \\ \mu|f_n||u_s|-\gamma, & \text{otherwise.} \end{cases} \quad (32)$$

Figure 9:
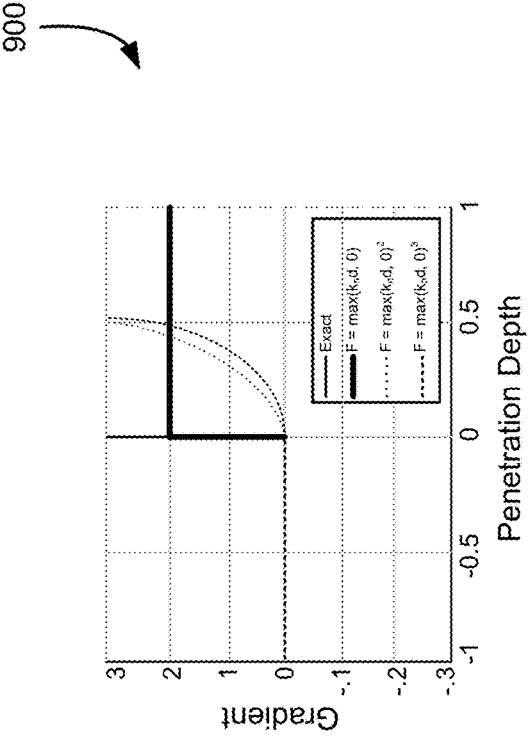
FIG. 9 illustrates graphs resulting from applying contact models, according to at least one embodiment.
Figure 9:
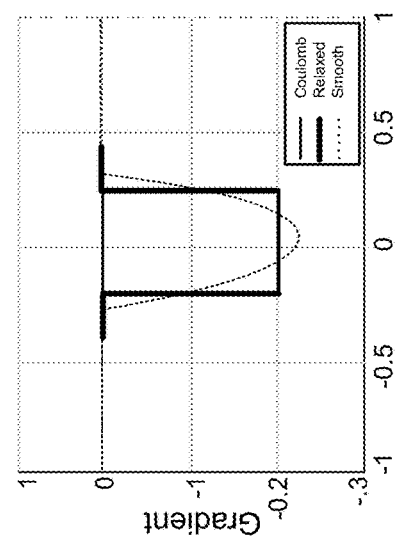
Figure 9:
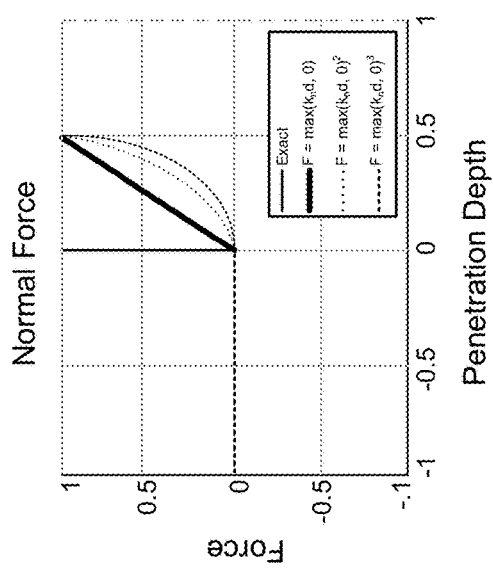
Figure 9:
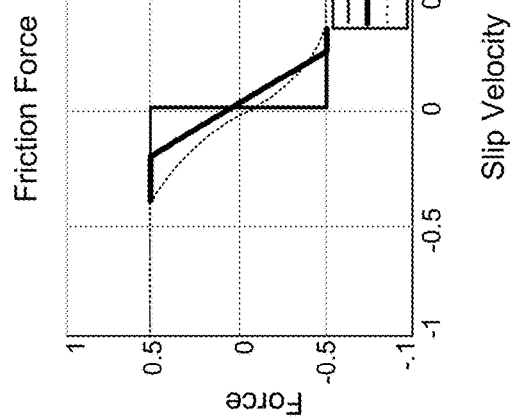

Here, the parameter $k_f$ controls stiffness in the 'stick' regime. Moreover, $f_n$ is treated as a constant parameter to the potential, which in the discrete setting corresponds to staggering, or lagging the update of normal forces in the friction calculations between iterations. In an embodiment, the constant $$\gamma = \frac{\mu^2|f_n|^2}{2k_f}$$

is chosen to make the potential have $C^0$ continuity when $k_f|u_s|=\mu|f_n|$. In an embodiment, the potential is quadratic around the origin and is linear past a certain point (in the slip regime). Thus, in an embodiment, it gives rise to the following forces:

$$f_f(u) \equiv -\min\left(k_f, \mu\frac{|f_n|}{|u_s|}\right)D^T u_s, \quad (33)$$

which in 1-D looks like the relaxed step function as illustrated in FIG. 9. In an embodiment, to construct a preconditioner for this frictional force, a potential Hessian can be utilized, which has the form:

$$\frac{\partial f_f}{\partial u} \equiv -D^T \Lambda D, \quad (34)$$

with $\Lambda$ given by:

$$\Lambda \equiv \begin{cases} k_f I & k_f|u_s| < \mu|f_n|, \\ \mu\frac{|f_n|}{|u_s|}\left(I - \frac{u_s u_s^T}{|u_s|^2}\right) & \text{otherwise.} \end{cases} \quad (35)$$

The term $$I - \frac{u_s u_s^T}{|u_s|^2}$$

may come from the derivative of a normalized vector, and accounts for the turning of constraint directions. Efficiency may be increased by optionally approximating the Hessian with the following diagonal (scalar) approximation:

$$\Lambda \equiv \begin{cases} k_f I & k_f|u_s| < \mu|f_n|, \\ \mu\frac{|f_n|}{|u_s|}, & \text{otherwise.} \end{cases} \quad (36)$$

Figure 3:
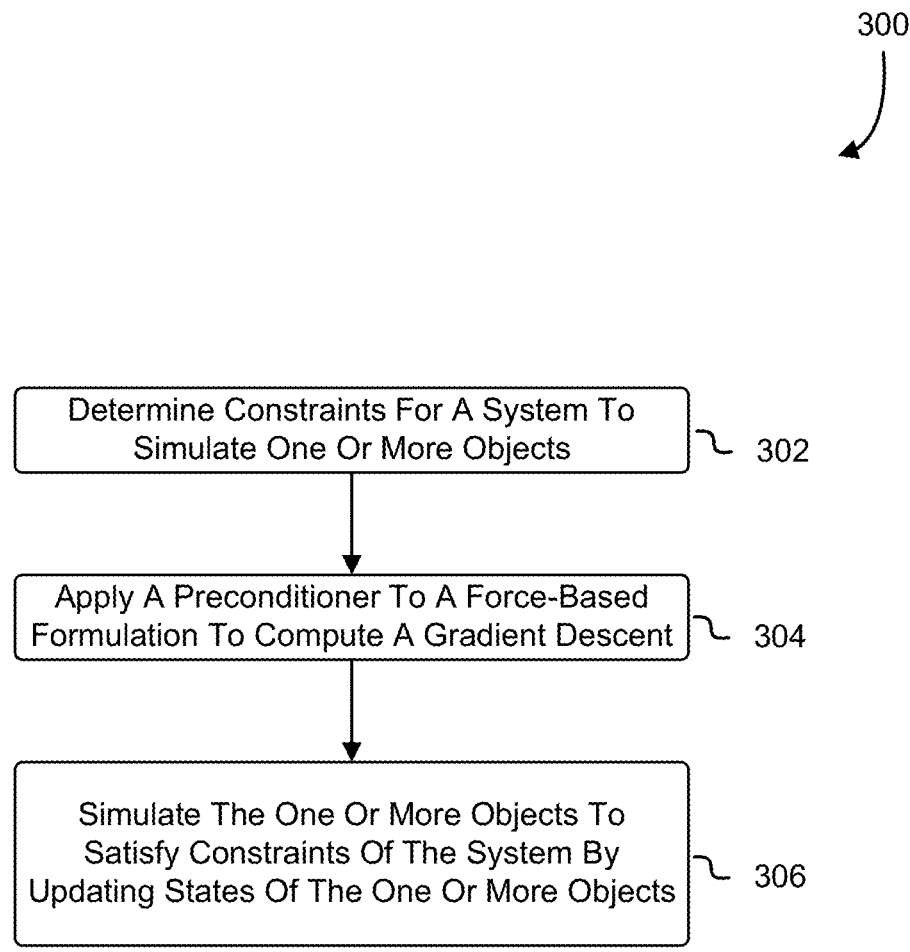
FIG. 3 illustrates a process of determining constraints of a system for object simulations, according to at least one embodiment.

FIG. 3 illustrates a process 300 of determining constraints of a system for object simulations, according to at least one embodiment. In at least one embodiment, constraints for a system that can be used to simulate objects in high contact scenarios are determined 302. In at least one embodiment, a system having one or more processors is configured to execute instructions that determines constraints (e.g., velocity approximations, contact forces, and friction coefficients between the one or more objects) for the system. Generally, a system simulates one or more objects with various properties (e.g., rigid body objects). When these objects move from one frame to the next, during simulation, the constraints of the system need to be satisfied (e.g., no penetration of objects, having smooth contact force distributions). Accordingly, the system determines the constraints of the system for an object so that the next state (frame) for the object can satisfy the constraints and achieve the simulation goal.

To find the constraints, the system may solve for the forces (e.g., friction force) of an object as it moves from one state to another. In an embodiment, to compute the forces in the primal formulation that satisfy the constraints, a robust numerical method can be used to efficiently solve a nonlinear optimization problem. The efficiency of the optimization method may be further improved by the inclusion of a suitable preconditioner (e.g., applying a preconditioner to compute one or more gradients by performing a gradient descent) 304. In an embodiment, the preconditioner is a Hessian approximation where the higher order terms corresponding to the geometric stiffness are dropped. This leads to an efficient implementation with a diagonally invertible preconditioner.

In an embodiment, the constraints of the system are satisfied at each frame during simulation using an implicit penalty formulation. In an embodiment, the system then simulates the one or more objects to satisfy the constraints of the system by updating states of the one or more objects based on the gradient descent 306. In other words, a primal formulation (e.g., force-based formulation) is determined to satisfy constraints of a system by applying preconditioned gradient-descent steps to the primal optimization problem. In an embodiment, the optimization may include a differentiable contact model using Coulomb friction or otherwise based on a differentiable contact model using Coulomb friction with associated efficient preconditioner.

Figure 4:
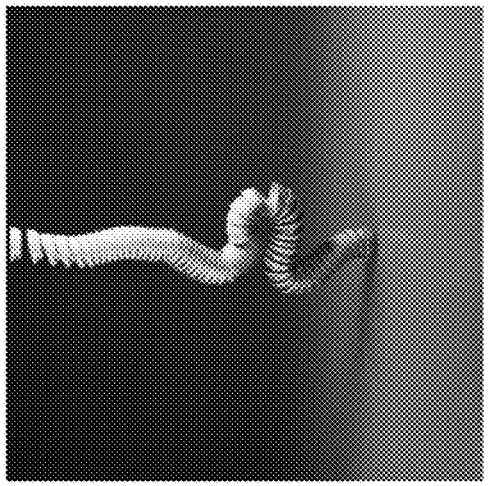
FIG. 4 illustrates a diagram of frames resulting from a large scale piling simulation example, according to at least one embodiment.
Figure 4:
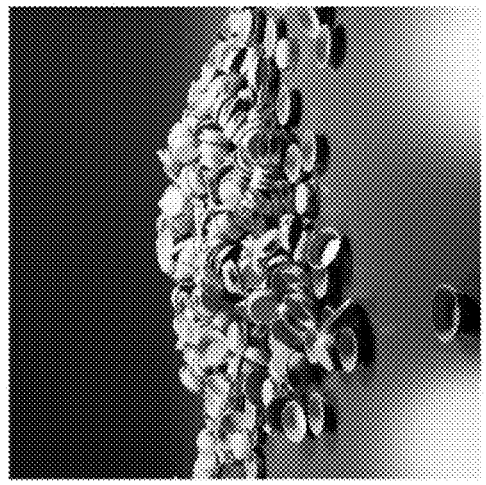
Figure 4:
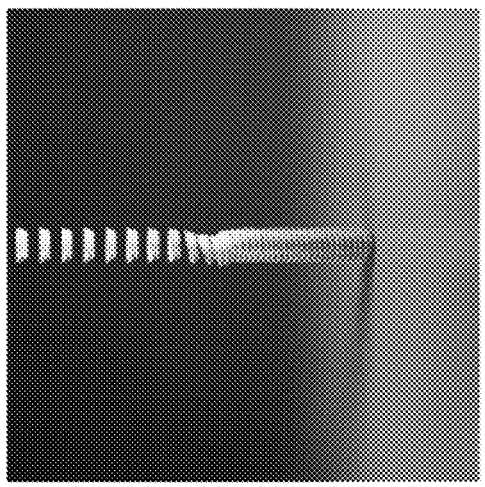
Figure 4:
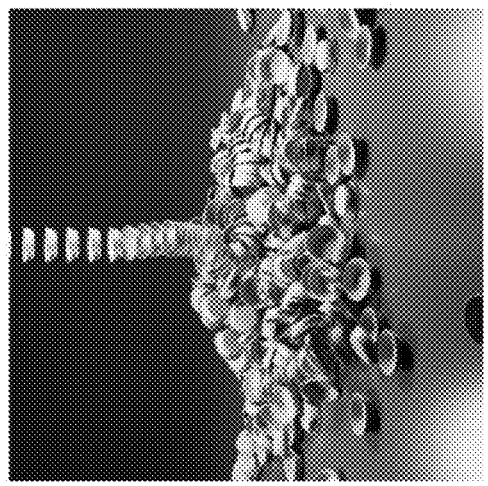

FIG. 4 illustrates a diagram 400 of frames resulting from a large scale piling simulation example, according to at least one embodiment. That is, as shown in FIG. 4, a sequence of frames from a large-scale piling example is simulated. Despite having 393 k (40× more) contacts, in an embodiment, a parallel preconditioned gradient descent solver runs at real time rates. In an embodiment, as shown in FIG. 4, 512 bowls each represented by a triangle mesh with 1160 faces are dropped from a height. In an embodiment, contact parameters of $k_n=k_f=10^6$, and $\mu=0.7$ are defined. In an embodiment, a triangle-based representation generates 393 k contacts when settled (40× larger); however, when using a parallel gradient-based solver, it still runs at real time rates and forms a stable pile. As shown in FIG. 4, similar behavior with both primal and dual based solvers are determined.

In an embodiment, with respect to simulating objects in a high contact scenarios, a primal contact model that incorporates slip and stick regions with a robust preconditioner suitable for implicit integration with descent-based solvers is utilized. Non-interpenetration constraints using inequalities may be first defined as follows:

$$C_n(q) \equiv n^T[a(q)-b(q)]-d \geq 0, \quad (25)$$

where $n \in \mathbb{R}^3$ is the contact plane normal given by the direction vector between closest points of triangle-mesh features, and d is a separation distance to maintain that may be used to model surface thickness. The points a and $b \in \mathbb{R}^3$ may be functions of a rigid body frame, or particle positions (in the case of a deformable body). Although the contact normal is treated as fixed over the course of the time step, it is also possible to use a nonlinear constraint on the object motion.

In an embodiment, a complementarity formulation of contact enforces the non-penetration condition, shown in equation (25), as well as the associated Signorini-Fischera condition, $$0 \leq C_n(q) \perp \lambda_n \geq 0, \quad (26)$$

The contact force may be given by $f_n(q) \equiv J_n^T \lambda_n$, where $$J_n = \frac{\partial C_n}{\partial q} G$$

is the constraint Jacobian. For iterative dual optimization methods, satisfying the bound constraint on the Lagrange multipliers may be achieved by a simple projection to $\mathbb{R}^+$ which is denoted by $\Pi(\pi_n)$.

In an embodiment, penalty methods of contact associate a stiff potential with the contact constraint in equation (25). In an embodiment, one view of penalty forms of contact is as a regularization of the complementarity form. That is, in an embodiment, a function of the clamped constraint error is utilized as follows:

$$U_n(q) \equiv \frac{k_n}{p} \min(0, C_n(q))^p, \quad (27)$$

where p is a constant exponent (often chosen to be 2). The associated (non-smooth) force due to this potential:

$$f_n(q) \equiv k_n J_n^T \min(0, C_n(q))^{p-1}, \quad (28)$$

where $k_n$ controls the stiffness of the contact. In an embodiment, an advantage of penalty based approaches is that they can easily support nonlinear contact models. In addition, by varying p, smoother contact forces that provide continuous derivatives may be obtained. As shown in FIG. 9, when $k \to \infty$ the force approaches a hard constraint limit, and as p increases, so does the smoothness of contact forces. In an embodiment, a preconditioner for the contact normal force is constructed using the following Hessian approximation:

$$\frac{\partial f_n}{\partial u} \approx -\begin{cases} k_n J_n^T J_n (p-1) \min(0, C_n(q))^{p-2} & C_n(q) < 0 \\ 0, & \text{otherwise} \end{cases} \quad (29)$$

where the higher order terms corresponding to the geometric stiffness are dropped. In an embodiment, the Hessian approximation is justified since, unlike single-step Newton schemes, the constraint gradients throughout the nonlinear solver is repeatedly re-evaluated.

Figure 5:
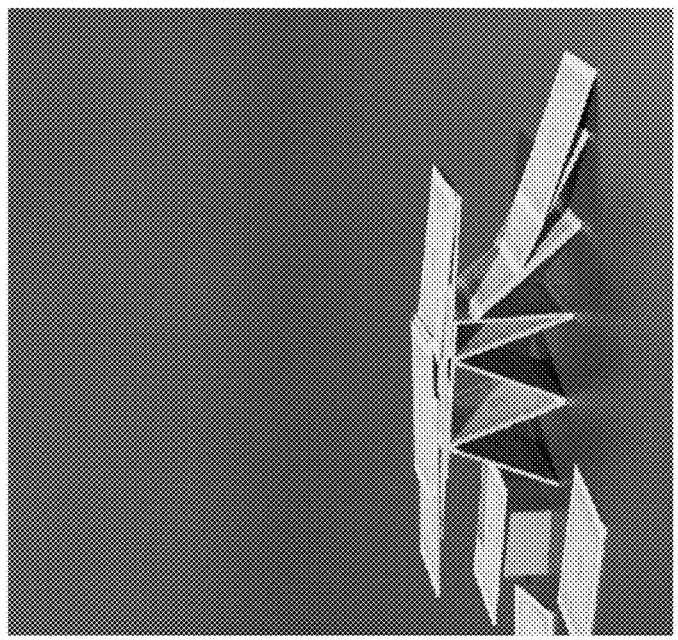
FIG. 5 illustrates a diagram of a structured stacking simulation example, according to at least one embodiment.
Figure 5:
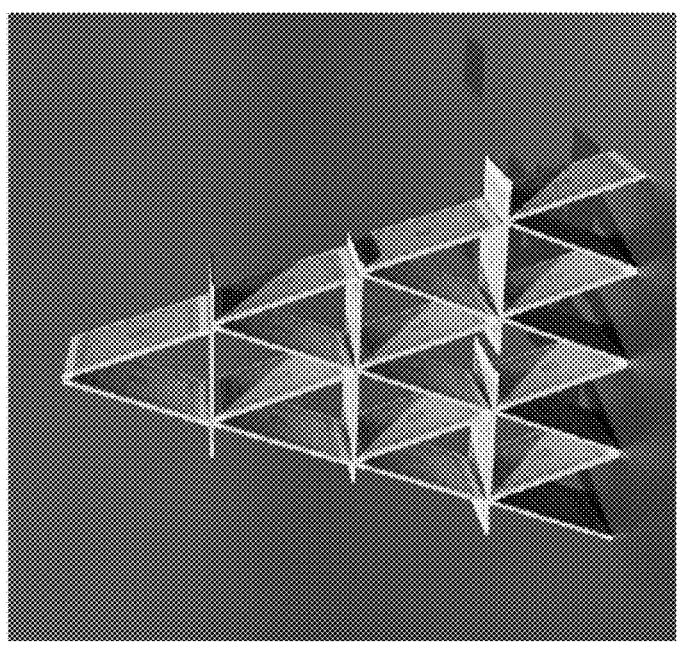

FIG. 5 illustrates a diagram 500 of a structured stacking simulation example, according to at least one embodiment. That is, as shown in FIG. 5, a classic stacking test is illustrated involving a house of cards. In some embodiments, until the cards are knocked down by an external body, implicit primal contact is able to achieve similarly stable structures to traditional dual methods.

FIG. 6 illustrates a diagram 600 of a simulation in a stiffness ratio test, according to at least one embodiment. That is, as shown in FIG. 6, a double pendulum is simulated where the lower spring is $10^4$ times stiffer than the upper one. Such high stiffness ratios cause ill-conditioning for primal formulations 602 and lead to stretching. In contrast, dual formulations 604 are insensitive to stiffness ratios, and show the correct behavior. In other words, the effect of stiffness ratios is shown FIG. 6. In some embodiments, two point-masses are connected by springs with stiffness coefficients that vary by a ratio of 10000:1. Although both springs are stiff enough to easily support the masses, when combined with a descent-based solver, the much stiffer lower spring has the effect of slowing convergence for the top spring, resulting in significant stretching. In an embodiment, dual-space solvers 604 do not suffer from any ill-conditioning in this case, showing the correct (e.g., unstretched) behavior.

FIG. 7 illustrates a diagram 700 of a simulation in a mass ratio test, according to at least one embodiment. That is, as shown in FIG. 7, a double pendulum are simulated consisting of two spheres with a mass ratio of $10^4$. In some embodiments, high mass ratios cause ill-conditioning for dual methods 704, which manifests as excessive stretching when using fixed iteration counts. However, in some embodiments, primal formulations 702 are insensitive to mass ratios and show the correct behavior. In other words, the sensitivity of both primal 702 and dual 704 methods to mass ratios using a simple double pendulum with a mass ratio of 10000:1 is shown in FIG. 7. In some embodiments, optimization on the dual problem 704 proceeds slowly, leading to large stretching. In contrast, primal-space optimization 702 is relatively unaffected.

FIG. 8 illustrates graphs 800 for the system condition number with a large mass attached in both a dual and primal system, according to at least one embodiment. In FIG. 8, a plot of the system condition number for a 1-D chain of particles with a large mass attached, as shown in FIG. 7. As the mass of the weight is increased as the condition number of the dual system increases (top graph of FIG. 8). The situation is exactly reversed for the case of stiffness ratios shown in FIG. 6, where increasing stiffness leads to poor conditioning (bottom graph of FIG. 8).

FIG. 9 illustrates graphs 900 resulting from applying contact models, according to at least one embodiment. That is, as shown in FIG. 9, relaxed contact models approximate hard contact by replacing the step function with a linear hinge (top left of FIG. 9). In an embodiment, the function may be exponentiated such that $C^1/C^2$ continuity is obtained with analytic derivatives (top right of FIG. 9). In an embodiment, the Coulomb friction is also relaxed to obtain invertible contact models (bottom left of FIG. 9). The relaxed friction model may then be smoothed to obtain second order differentiability (bottom right of FIG. 9).

Figure 10:
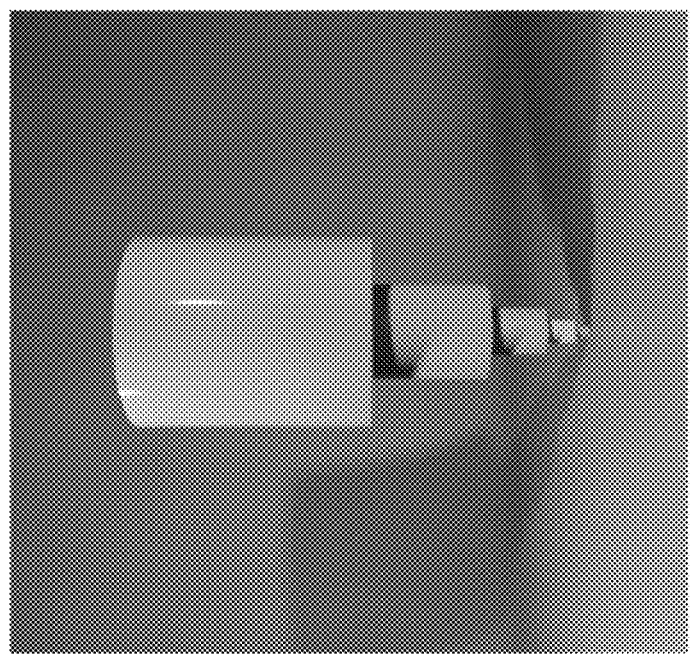
FIG. 10 illustrates a diagram of resulting simulations in a contact mass ratio test in both a dual and primal system, according to at least one embodiment.
Figure 10:
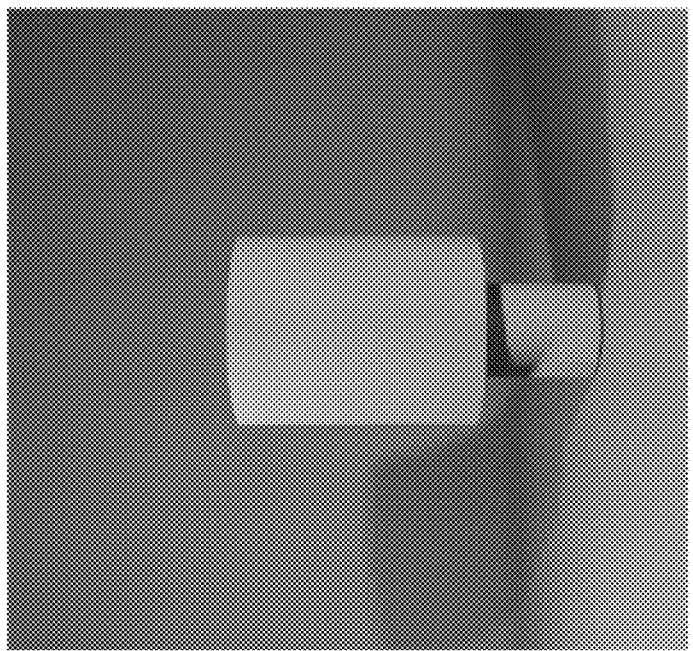

FIG. 10 illustrates a diagram 1000 of resulting simulations in a contact mass ratio test in both a dual and primal system, according to at least one embodiment. That is, as shown in FIG. 10, a contact stacking scenario with a mass ratio of 4096:1. In an embodiment, the primal solvers 1002 are insensitive to this ratio and stack stably in 20 iterations. Conversely, this scenario leads to ill-conditioning for dual methods 1004 which fail to stack with 500 iterations. For the primal solver 1002, contact parameters of $k_n = k_f = 10^8$ is used, which is sufficient to stably support the stack. In contrast, dual-space 1004 optimization converges slowly for this case, leading to large interpenetrations of the objects.

Figure 11:
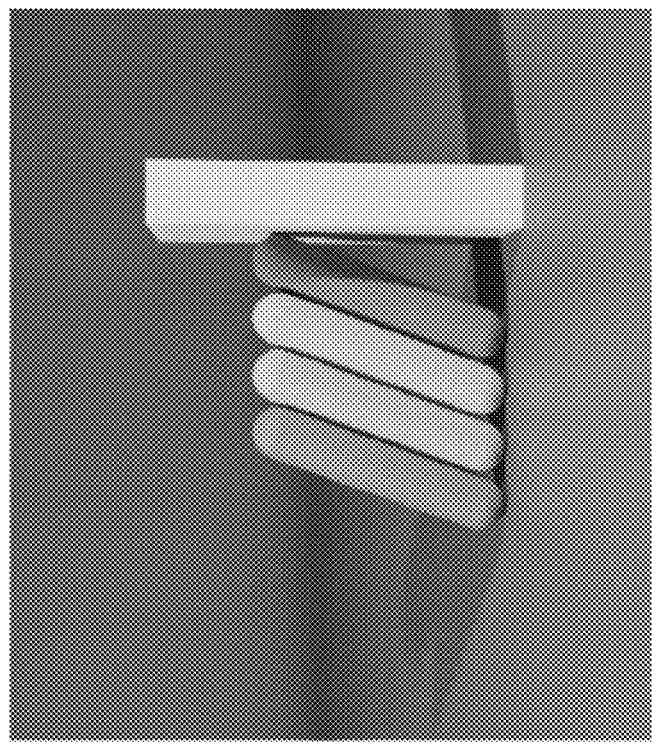
FIG. 11 illustrates a diagram of resulting simulations in a contact stiffness ratio test in both a dual and primal system, according to at least one embodiment.
Figure 11:
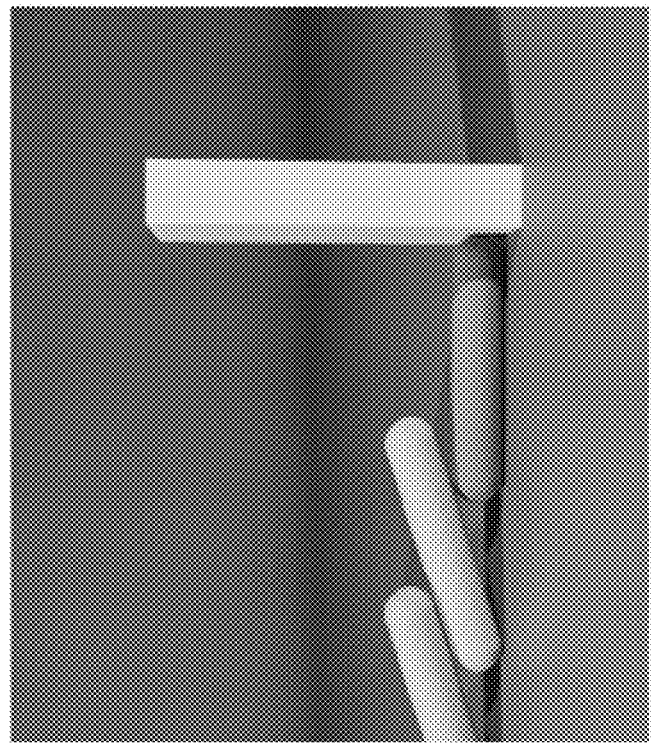

FIG. 11 illustrates a diagram 1100 of resulting simulations in a contact stiffness ratio test in both a dual 1104 and primal 1102 system, according to at least one embodiment. That is, FIG. 11 shows an example of a high stiffness ratio contact scenario. As an example, the contact stiffness coefficients are chosen as $k_n=10^8$, and $k_f=10^6$, which creates a stiffness ratio of 100:1. This leads to an ill-conditioned system for primal descent solvers, and results in an inaccurate solution for frictional forces. In this stiffness ratio problem, where the normal and friction stiffness coefficients $k_n$ and $k_f$ differ by a large magnitude, the effect of raising the contact stiffness while leaving the friction stiffness fixed is illustrated. When combined with an iterative method, this has the effect of reducing friction convergence, leading to slip.

Figure 12:
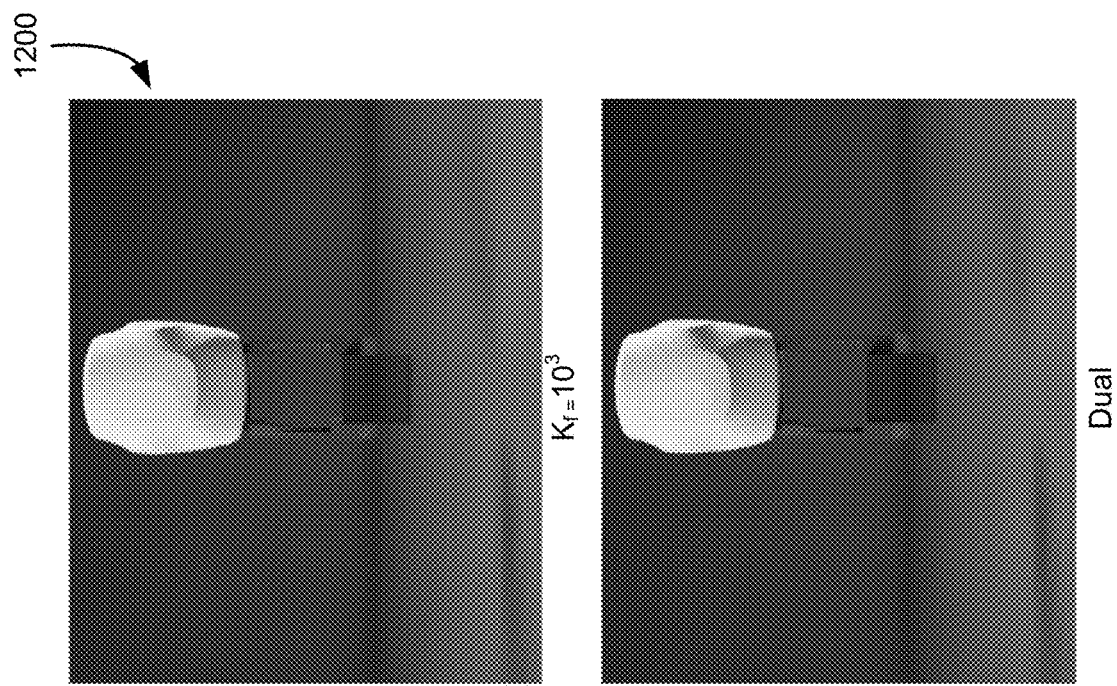
FIG. 12 illustrates a diagram of experimental visual results of grip stability with varying frictional stiffness, according to at least one embodiment.
Figure 12:
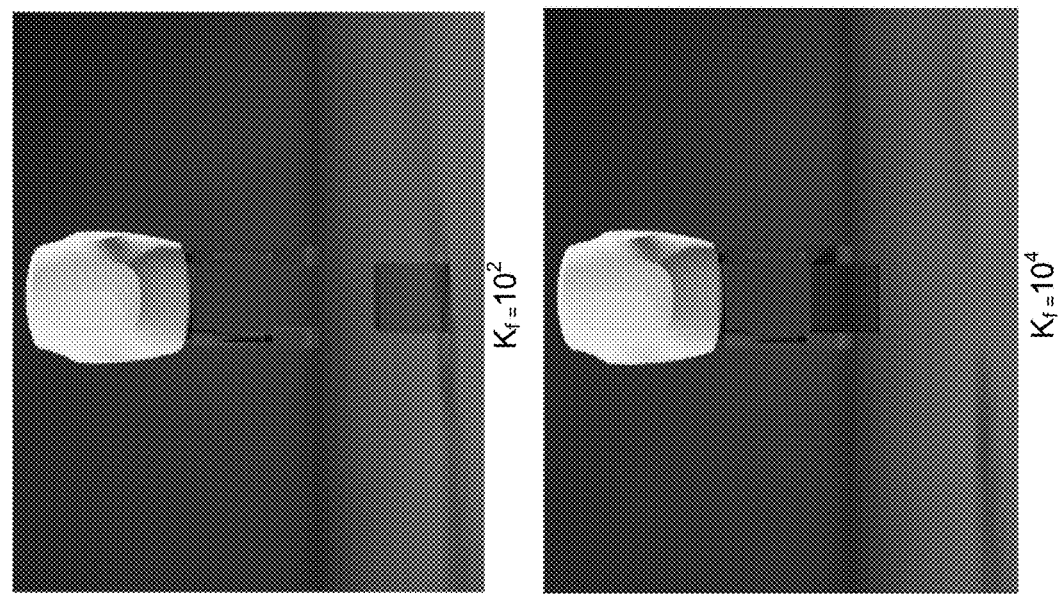

FIG. 12 illustrates a diagram 1200 of experimental visual results of grip stability with varying frictional stiffness, according to at least one embodiment. In an embodiment, the effect of frictional stiffness on grasp stability is measured. As an example, as illustrated in FIG. 12, a robot picks up a cube, attempts to lift it to a height of 8 cm, and remains stationary. Each image shows the final state of a grasp after 15 seconds. The effect of varying friction stiffness with $k_f$ increasing from left to right is shown in FIG. 12. Low stiffness results in visible slipping, but high stiffness with implicit integration can be made nearly as stable as hard contact (dual) models over long periods of time. In an embodiment, the error induced by the relaxed model of contact on a robotic manipulation task is measured. As depicted, history-based tracking is not available and some non-zero slip may be expected. As a result, for low values of $k_f$ the robot may be unable to hold the cube stationary. However, for high enough coefficients, primal contact was competitive with the dual baseline.

Figure 13:
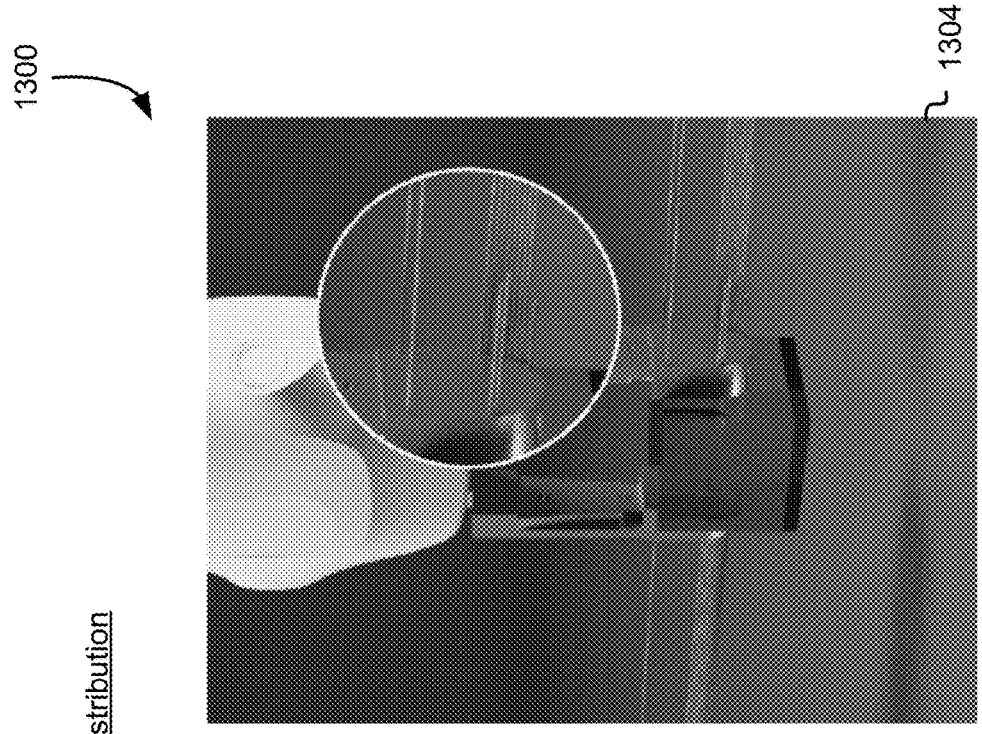
FIG. 13 illustrates a diagram of experimental visual results of force distributions, according to at least one embodiment.
Figure 13:
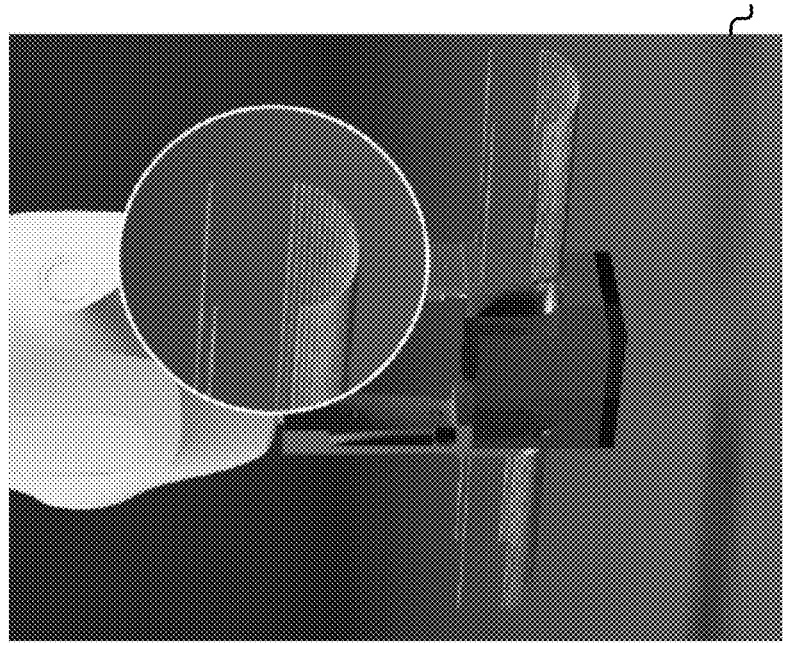

FIG. 13 illustrates a diagram 1300 of experimental visual results of force distributions, according to at least one embodiment. In an embodiment, contact normal forces are illustrated in FIG. 13. The distribution of forces generated by a relaxed primal contact model are illustrated as smooth 1302. For hard contact models the problem is underdetermined, leading to a solution that depends on the ordering of contacts 1304. In some embodiments, there are scenarios where there are many redundant contact constraints, causing the problem to become underdetermined. As an example, hard-contact solvers may produce an unpredictable force distribution 1304 that is dependent on the ordering of constraints. In at least one embodiment, a benefit of the relaxed primal model 1302 is that it generates evenly distributed forces without additional post-processing. For example, as illustrated in FIG. 13, a robot grips a cube. The gripper is tessellated somewhat non-uniformly, but in a relaxed primal model of contact 1302 the system remains well-posed and leads to a smooth distribution of contact forces over the vertices.

Figure 14:
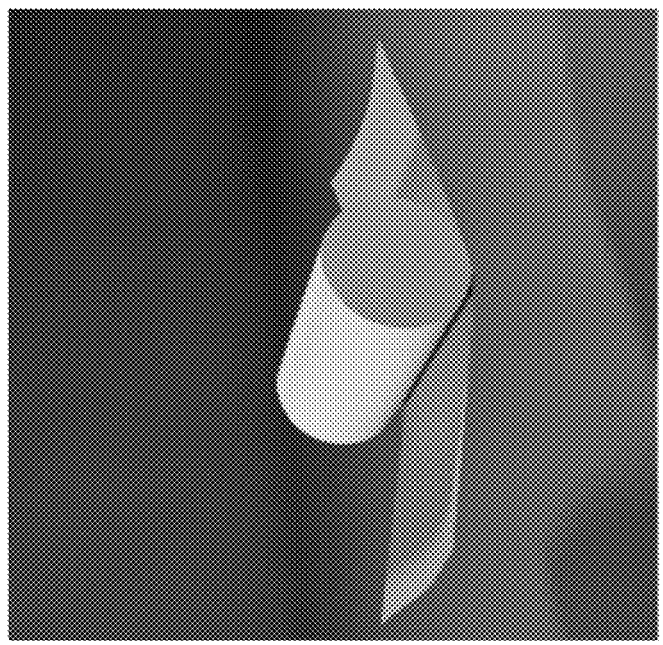
FIG. 14 illustrates a diagram of experimental visual results of a cloth simulation in both a dual and primal system, according to at least one embodiment.
Figure 14:
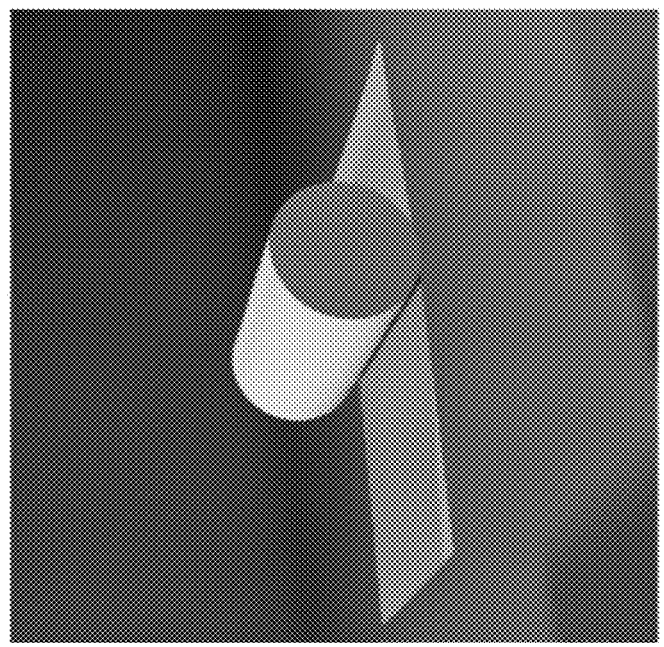

FIG. 14 illustrates a diagram 1400 of experimental visual results of a cloth simulation in both a dual and primal system, according to at least one embodiment. In an embodiment, visualization simulations using both dual and primal systems are performed on one or more objects that are triangle mesh (e.g., cloth, dress, deformable body parts, etc.). That is, for an object suspended by inextensible cloth ($k=10^{10}$), the primal methods 1402 may be able to achieve higher effective stiffness than that of dual methods 1404 in an equivalent number of iterations. In the example illustrated in FIG. 14, in an effort to investigate the behavior of each method (primal 1402 and dual 1404) on deformable simulation, a piece of cloth modeled by 800 triangles is suspended and a rigid body is dropped onto it from a height. As a result, the dual method 1404 does not become stiffer after some elastic stiffness threshold value around $k_f=10^8$.

Figure 15:
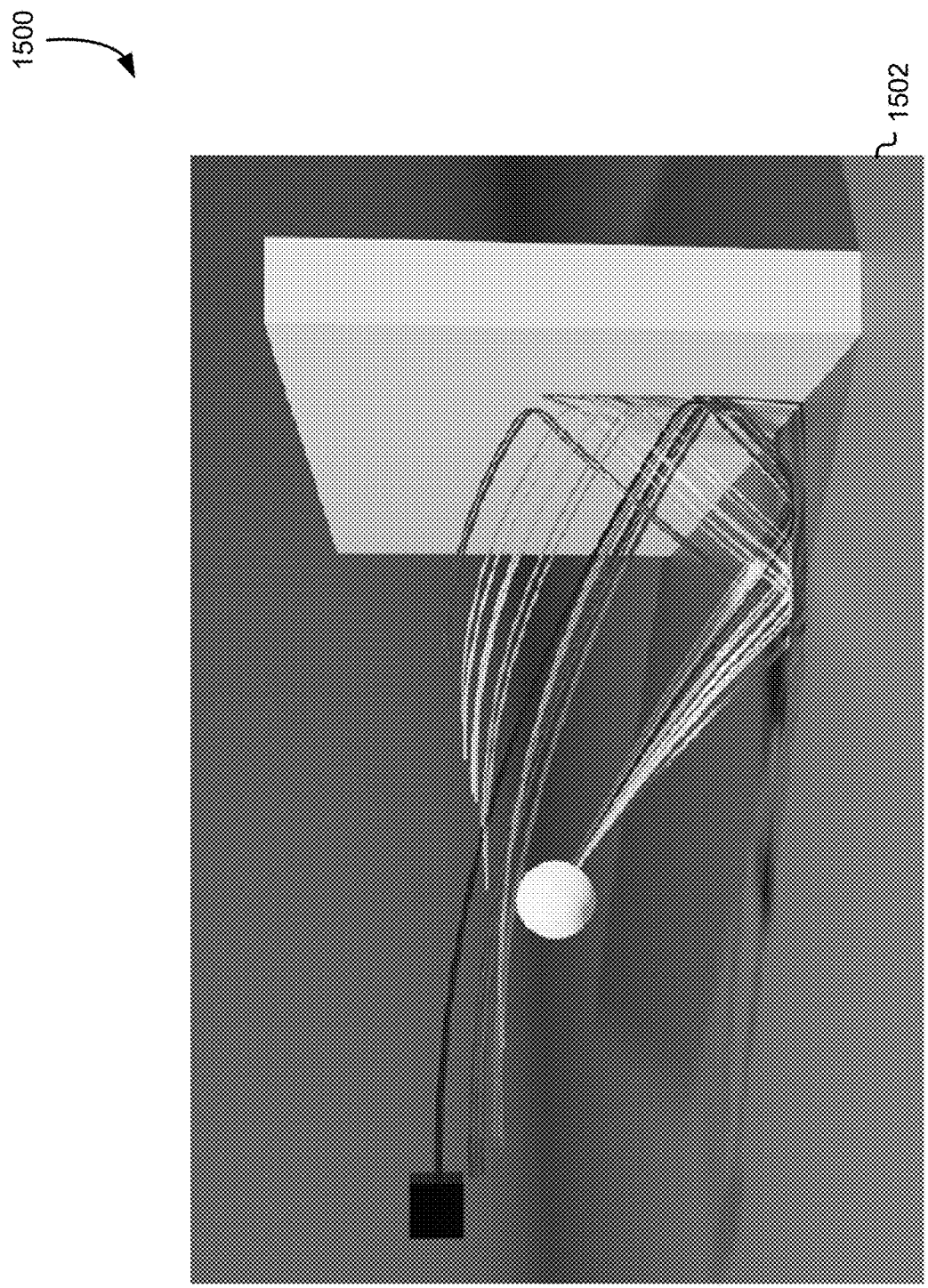
FIG. 15 illustrates a diagram of experimental visual results from implementing trajectory optimization test using differentiable simulation, according to at least one embodiment.

FIG. 15 illustrates a diagram 1500 of experimental visual results from implementing trajectory optimization test using differentiable simulation, according to at least one embodiment. That is, in at least one embodiment, a trajectory optimization test using differentiable simulation to minimize the distance to a target through two contact events is presented in FIG. 15. The primal contact model, that is described herein, is well-suited to differentiability since it may be smoothed, and the system size remains fixed regardless of the number of contacts. As shown in the example 1502 of trajectory optimization in FIG. 15, given an initial trajectory that involves impacts with two surfaces, the goal is to find a starting impulse such that a bouncing ball hits a target at t=0.5 s. A discrete adjoint method may be used to perform reverse mode differentiation through the primal contact solver and optimize the loss function using a Limited-memory Broyden-Fletcher-Goldfarb-Shanno (L-BFGS) optimizer. Primal formulations of contact may be well-suited to differentiability for two reasons. First, the contact forces may be smoothed to provide $C^2$ continuity that is utilized for some optimization methods. Second, when performing reverse mode differentiation the state of the system must be saved at each forward step to compute the correct gradients during the backwards pass. For primal contact the size of the system is fixed regardless of the number of contacts. In contrast, the dual system must store a varying, and potentially large amount of contact information at each forward step.

Data Center

Figure 16:
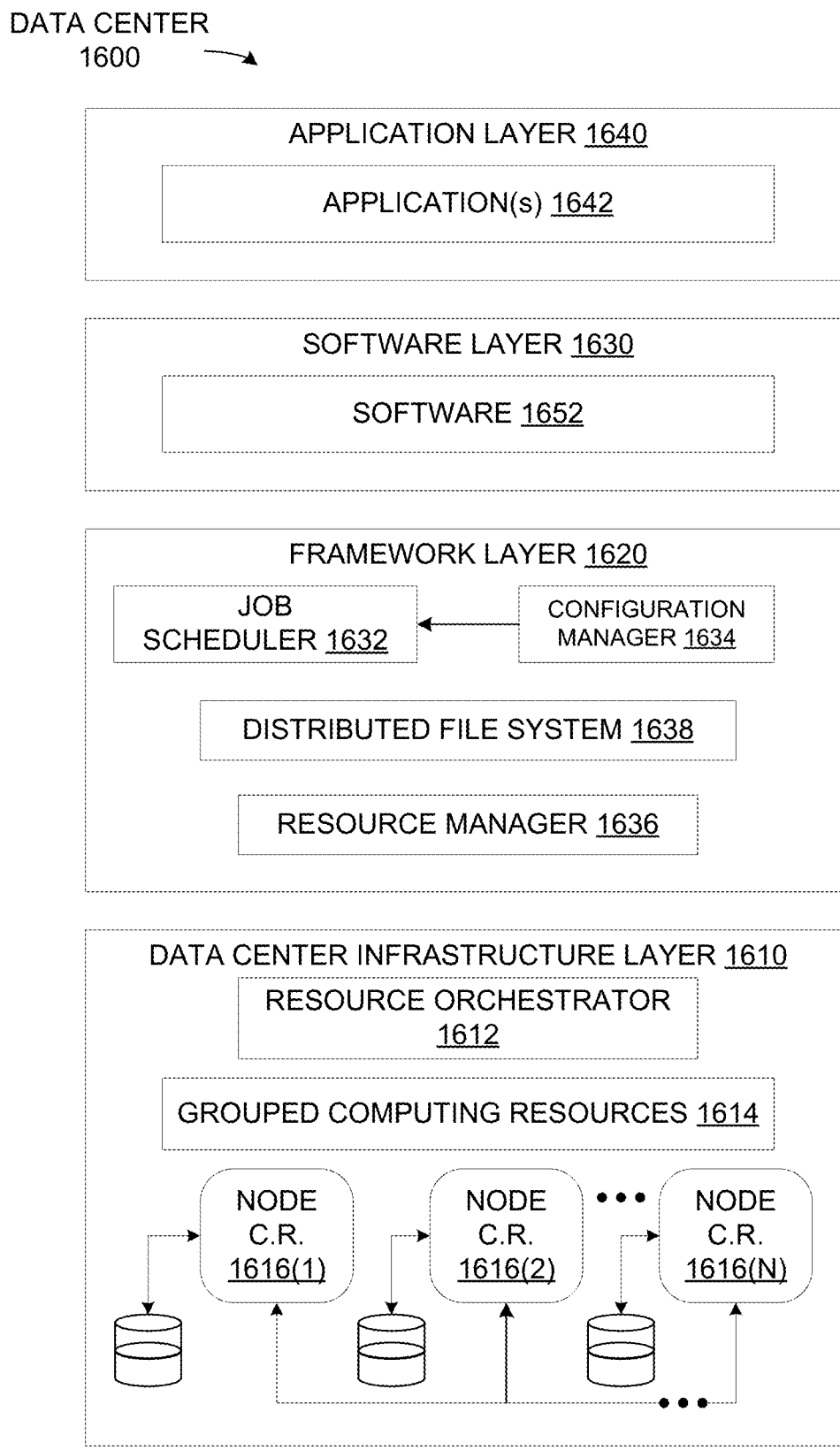
FIG. 16 illustrates an exemplary data center, in accordance with at least one embodiment.

FIG. 16 illustrates an exemplary data center 1600, in accordance with at least one embodiment. In at least one embodiment, data center 1600 includes, without limitation, a data center infrastructure layer 1610, a framework layer 1620, a software layer 1630 and an application layer 1640.

In at least one embodiment, as shown in FIG. 16, data center infrastructure layer 1610 may include a resource orchestrator 1612, grouped computing resources 1614, and node computing resources ("node C.R.s") 1616(1)-1616(N), where "N" represents any whole, positive integer. In at least one embodiment, node C.R.s 1616(1)-1616(N) may include, but are not limited to, any number of central processing units ("CPUs") or other processors (including accelerators, field programmable gate arrays ("FPGAs"), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1616(1)-1616(N) may be a server having one or more of above-mentioned computing resources.

In at least one embodiment, grouped computing resources 1614 may include separate groupings of node C.R.s housed within one or more racks (not shown), or many racks housed in data centers at various geographical locations (also not shown). Separate groupings of node C.R.s within grouped computing resources 1614 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1612 may configure or otherwise control one or more node C.R.s 1616(1)-1616(N) and/or grouped computing resources 1614. In at least one embodiment, resource orchestrator 1612 may include a software design infrastructure ("SDI") management entity for data center 1600. In at least one embodiment, resource orchestrator 1612 may include hardware, software or some combination thereof.

In at least one embodiment, as shown in FIG. 16, framework layer 1620 includes, without limitation, a job scheduler 1632, a configuration manager 1634, a resource manager 1636 and a distributed file system 1638. In at least one embodiment, framework layer 1620 may include a framework to support software 1652 of software layer 1630 and/or one or more application(s) 1642 of application layer 1640. In at least one embodiment, software 1652 or application(s) 1642 may respectively include web-based service software or applications, such as those provided by Amazon Web Services, Google Cloud and Microsoft Azure. In at least one embodiment, framework layer 1620 may be, but is not limited to, a type of free and open-source software web application framework such as Apache Spark™ (hereinafter "Spark") that may utilize distributed file system 1638 for large-scale data processing (e.g., "big data"). In at least one embodiment, job scheduler 1632 may include a Spark driver to facilitate scheduling of workloads supported by various layers of data center 1600. In at least one embodiment, configuration manager 1634 may be capable of configuring different layers such as software layer 1630 and framework layer 1620, including Spark and distributed file system 1638 for supporting large-scale data processing. In at least one embodiment, resource manager 1636 may be capable of managing clustered or grouped computing resources mapped to or allocated for support of distributed file system 1638 and job scheduler 1632. In at least one embodiment, clustered or grouped computing resources may include grouped computing resource 1614 at data center infrastructure layer 1610. In at least one embodiment, resource manager 1636 may coordinate with resource orchestrator 1612 to manage these mapped or allocated computing resources.

In at least one embodiment, software 1652 included in software layer 1630 may include software used by at least portions of node C.R.s 1616(1)-1616(N), grouped computing resources 1614, and/or distributed file system 1638 of framework layer 1620. One or more types of software may include, but are not limited to, Internet web page search software, e-mail virus scan software, database software, and streaming video content software.

In at least one embodiment, application(s) 1642 included in application layer 1640 may include one or more types of applications used by at least portions of node C.R.s 1616(1)-1616(N), grouped computing resources 1614, and/or distributed file system 1638 of framework layer 1620. In at least one or more types of applications may include, without limitation, CUDA applications.

In at least one embodiment, any of configuration manager 1634, resource manager 1636, and resource orchestrator 1612 may implement any number and type of self-modifying actions based on any amount and type of data acquired in any technically feasible fashion. In at least one embodiment, self-modifying actions may relieve a data center operator of data center 1600 from making possibly bad configuration decisions and possibly avoiding underutilized and/or poor performing portions of a data center.

Computer-Based Systems

The following FIGS. set forth, without limitation, exemplary computer-based systems that can be used to implement at least one embodiment.

Figure 17:
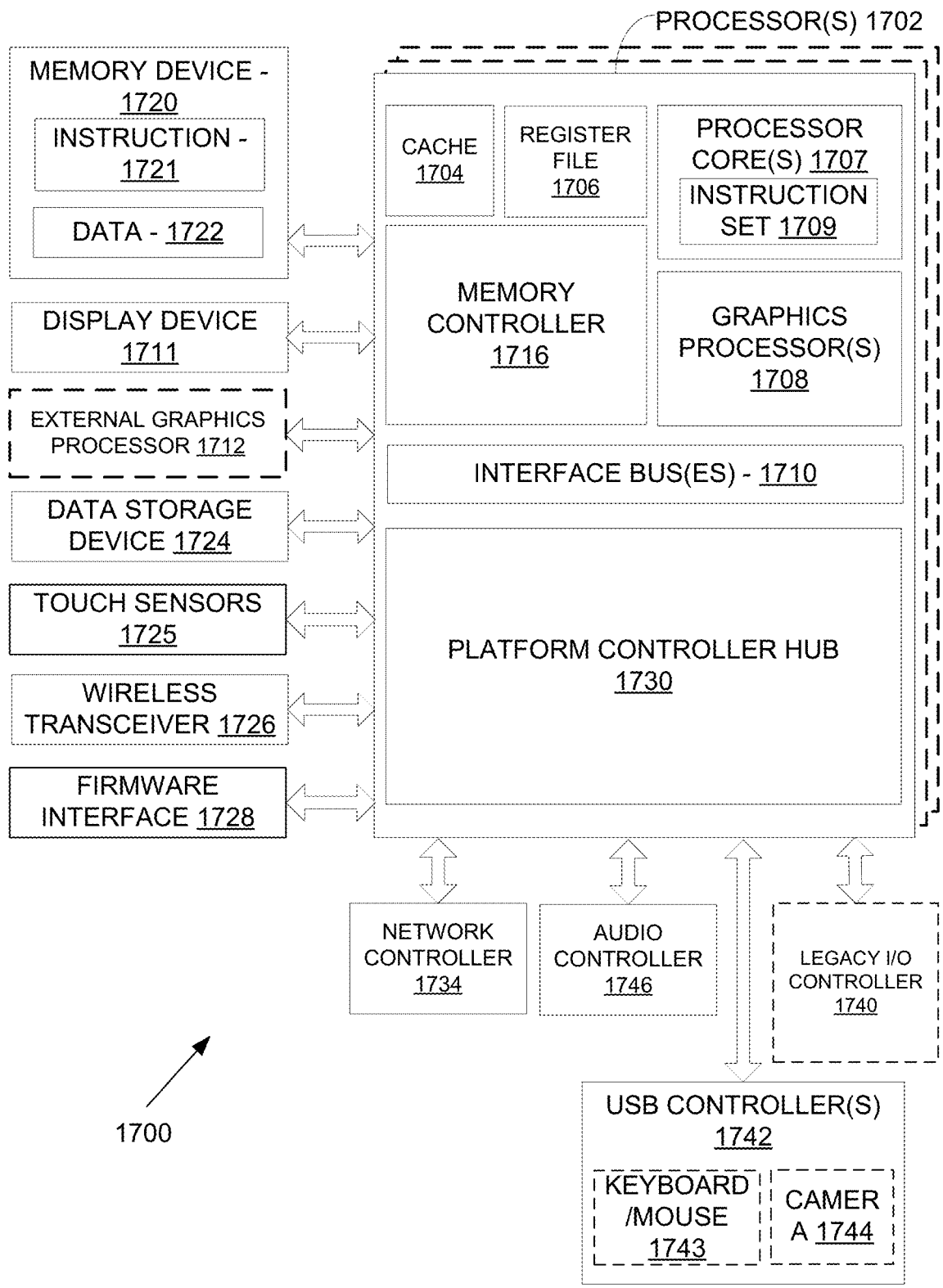
FIG. 17 illustrates a processing system, in accordance with at least one embodiment.

FIG. 17 illustrates a processing system 1700, in accordance with at least one embodiment. In at least one embodiment, processing system 1700 includes one or more processors 1702 and one or more graphics processors 1708, and may be a single processor desktop system, a multiprocessor workstation system, or a server system having a large number of processors 1702 or processor cores 1707. In at least one embodiment, processing system 1700 is a processing platform incorporated within a system-on-a-chip ("SorT") integrated circuit for use in mobile, handheld, or embedded devices.

In at least one embodiment, processing system 1700 can include, or be incorporated within a server-based gaming platform, a game console, a media console, a mobile gaming console, a handheld game console, or an online game console. In at least one embodiment, processing system 1700 is a mobile phone, smart phone, tablet computing device or mobile Internet device. In at least one embodiment, processing system 1700 can also include, couple with, or be integrated within a wearable device, such as a smart watch wearable device, smart eyewear device, augmented reality device, or virtual reality device. In at least one embodiment, processing system 1700 is a television or set top box device having one or more processors 1702 and a graphical interface generated by one or more graphics processors 1708.

In at least one embodiment, one or more processors 1702 each include one or more processor cores 1707 to process instructions which, when executed, perform operations for system and user software. In at least one embodiment, each of one or more processor cores 1707 is configured to process a specific instruction set 1709. In at least one embodiment, instruction set 1709 may facilitate Complex Instruction Set Computing ("CISC"), Reduced Instruction Set Computing ("RISC"), or computing via a Very Long Instruction Word ("VLIW"). In at least one embodiment, processor cores 1707 may each process a different instruction set 1709, which may include instructions to facilitate emulation of other instruction sets. In at least one embodiment, processor core 1707 may also include other processing devices, such as a digital signal processor ("DSP").

In at least one embodiment, processor 1702 includes cache memory ('cache") 1704. In at least one embodiment, processor 1702 can have a single internal cache or multiple levels of internal cache. In at least one embodiment, cache memory is shared among various components of processor 1702. In at least one embodiment, processor 1702 also uses an external cache (e.g., a Level 3 ("L3") cache or Last Level Cache ("LLC")) (not shown), which may be shared among processor cores 1707 using known cache coherency techniques. In at least one embodiment, register file 1706 is additionally included in processor 1702 which may include different types of registers for storing different types of data (e.g., integer registers, floating point registers, status registers, and an instruction pointer register). In at least one embodiment, register file 1706 may include general-purpose registers or other registers.

In at least one embodiment, one or more processor(s) 1702 are coupled with one or more interface bus(es) 1710 to transmit communication signals such as address, data, or control signals between processor 1702 and other components in processing system 1700. In at least one embodiment interface bus 1710, in one embodiment, can be a processor bus, such as a version of a Direct Media Interface ("DMI") bus. In at least one embodiment, interface bus 1710 is not limited to a DMI bus, and may include one or more Peripheral Component Interconnect buses (e.g., "PCI," PCI Express ("PCIe")), memory buses, or other types of interface buses. In at least one embodiment processor(s) 1702 include an integrated memory controller 1716 and a platform controller hub 1730. In at least one embodiment, memory controller 1716 facilitates communication between a memory device and other components of processing system 1700, while platform controller hub ("PCH") 1730 provides connections to Input/Output ("I/O") devices via a local I/O bus.

In at least one embodiment, memory device 1720 can be a dynamic random access memory ("DRAM") device, a static random access memory ("SRAM") device, flash memory device, phase-change memory device, or some other memory device having suitable performance to serve as processor memory. In at least one embodiment memory device 1720 can operate as system memory for processing system 1700, to store data 1722 and instructions 1721 for use when one or more processors 1702 executes an application or process. In at least one embodiment, memory controller 1716 also couples with an optional external graphics processor 1712, which may communicate with one or more graphics processors 1708 in processors 1702 to perform graphics and media operations. In at least one embodiment, a display device 1711 can connect to processor(s) 1702. In at least one embodiment display device 1711 can include one or more of an internal display device, as in a mobile electronic device or a laptop device or an external display device attached via a display interface (e.g., DisplayPort, etc.). In at least one embodiment, display device 1711 can include a head mounted display ("HMD") such as a stereoscopic display device for use in virtual reality ("VR") applications or augmented reality ("AR") applications.

In at least one embodiment, platform controller hub 1730 enables peripherals to connect to memory device 1720 and processor 1702 via a high-speed I/O bus. In at least one embodiment, I/O peripherals include, but are not limited to, an audio controller 1746, a network controller 1734, a firmware interface 1728, a wireless transceiver 1726, touch sensors 1725, a data storage device 1724 (e.g., hard disk drive, flash memory, etc.). In at least one embodiment, data storage device 1724 can connect via a storage interface (e.g., SATA) or via a peripheral bus, such as PCI, or PCIe. In at least one embodiment, touch sensors 1725 can include touch screen sensors, pressure sensors, or fingerprint sensors. In at least one embodiment, wireless transceiver 1726 can be a Wi-Fi transceiver, a Bluetooth transceiver, or a mobile network transceiver such as a 3G, 4G, or Long Term Evolution ("LTE") transceiver. In at least one embodiment, firmware interface 1728 enables communication with system firmware, and can be, for example, a unified extensible firmware interface ("UEFI"). In at least one embodiment, network controller 1734 can enable a network connection to a wired network. In at least one embodiment, a high-performance network controller (not shown) couples with interface bus 1710. In at least one embodiment, audio controller 1746 is a multi-channel high definition audio controller. In at least one embodiment, processing system 1700 includes an optional legacy I/O controller 1740 for coupling legacy Personal System 2 ("PS/2")) devices to processing system 1700. In at least one embodiment, platform controller hub 1730 can also connect to one or more Universal Serial Bus ("USB") controllers 1742 connect input devices, such as keyboard and mouse 1743 combinations, a camera 1744, or other USB input devices.

In at least one embodiment, an instance of memory controller 1716 and platform controller hub 1730 may be integrated into a discreet external graphics processor, such as external graphics processor 1712. In at least one embodiment, platform controller hub 1730 and/or memory controller 1716 may be external to one or more processor(s) 1702. For example, in at least one embodiment, processing system 1700 can include an external memory controller 1716 and platform controller hub 1730, which may be configured as a memory controller hub and peripheral controller hub within a system chipset that is in communication with processor(s) 1702.

Figure 18:
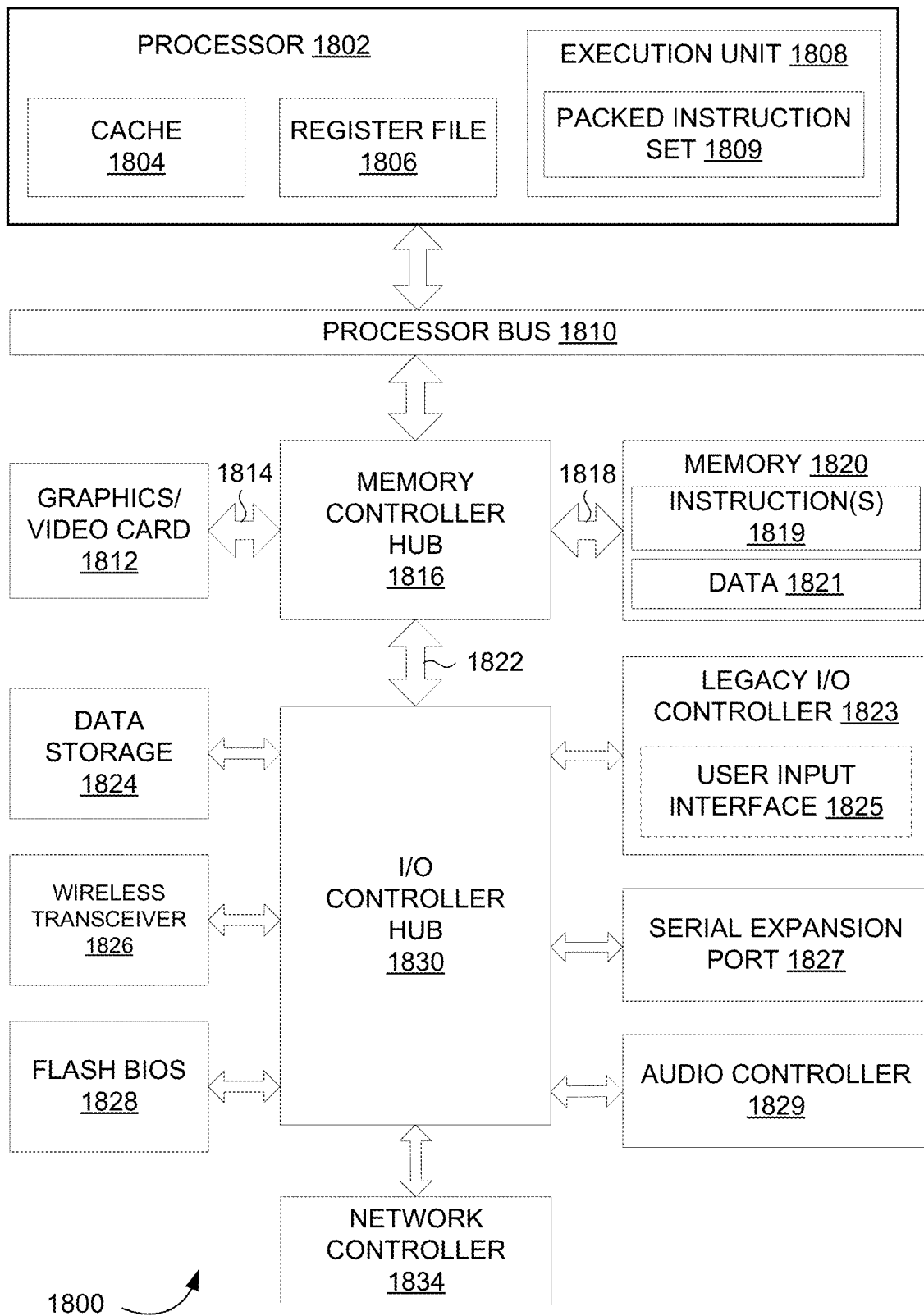
FIG. 18 illustrates a computer system, in accordance with at least one embodiment.

FIG. 18 illustrates a computer system 1800, in accordance with at least one embodiment. In at least one embodiment, computer system 1800 may be a system with interconnected devices and components, an SOC, or some combination. In at least on embodiment, computer system 1800 is formed with a processor 1802 that may include execution units to execute an instruction. In at least one embodiment, computer system 1800 may include, without limitation, a component, such as processor 1802 to employ execution units including logic to perform algorithms for processing data. In at least one embodiment, computer system 1800 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 1800 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 1800 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions.

In at least one embodiment, computer system 1800 may include, without limitation, processor 1802 that may include, without limitation, one or more execution units 1808 that may be configured to execute a Compute Unified Device Architecture ("CUDA") (CUDA® is developed by NVIDIA Corporation of Santa Clara, Calif.) program. In at least one embodiment, a CUDA program is at least a portion of a software application written in a CUDA programming language. In at least one embodiment, computer system 1800 is a single processor desktop or server system. In at least one embodiment, computer system 1800 may be a multiprocessor system. In at least one embodiment, processor 1802 may include, without limitation, a CISC microprocessor, a RISC microprocessor, a VLIW microprocessor, a processor implementing a combination of instruction sets, or any other processor device, such as a digital signal processor, for example. In at least one embodiment, processor 1802 may be coupled to a processor bus 1810 that may transmit data signals between processor 1802 and other components in computer system 1800.

In at least one embodiment, processor 1802 may include, without limitation, a Level 1 ("L1") internal cache memory ("cache") 1804. In at least one embodiment, processor 1802 may have a single internal cache or multiple levels of internal cache. In at least one embodiment, cache memory may reside external to processor 1802. In at least one embodiment, processor 1802 may also include a combination of both internal and external caches. In at least one embodiment, a register file 1806 may store different types of data in various registers including, without limitation, integer registers, floating point registers, status registers, and instruction pointer register.

In at least one embodiment, execution unit 1808, including, without limitation, logic to perform integer and floating point operations, also resides in processor 1802. Processor 1802 may also include a microcode ("ucode") read only memory ("ROM") that stores microcode for certain macro instructions. In at least one embodiment, execution unit 1808 may include logic to handle a packed instruction set 1809. In at least one embodiment, by including packed instruction set 1809 in an instruction set of a general-purpose processor 1802, along with associated circuitry to execute instructions, operations used by many multimedia applications may be performed using packed data in a general-purpose processor 1802. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 1808 may also be used in microcontrollers, embedded processors, graphics devices, DSPs, and other types of logic circuits. In at least one embodiment, computer system 1800 may include, without limitation, a memory 1820. In at least one embodiment, memory 1820 may be implemented as a DRAM device, an SRAM device, flash memory device, or other memory device. Memory 1820 may store instruction(s) 1819 and/or data 1821 represented by data signals that may be executed by processor 1802.

In at least one embodiment, a system logic chip may be coupled to processor bus 1810 and memory 1820. In at least one embodiment, the system logic chip may include, without limitation, a memory controller hub ("MCH") 1816, and processor 1802 may communicate with MCH 1816 via processor bus 1810. In at least one embodiment, MCH 1816 may provide a high bandwidth memory path 1818 to memory 1820 for instruction and data storage and for storage of graphics commands, data and textures. In at least one embodiment, MCH 1816 may direct data signals between processor 1802, memory 1820, and other components in computer system 1800 and to bridge data signals between processor bus 1810, memory 1820, and a system I/O 1822. In at least one embodiment, system logic chip may provide a graphics port for coupling to a graphics controller. In at least one embodiment, MCH 1816 may be coupled to memory 1820 through high bandwidth memory path 1818 and graphics/video card 1812 may be coupled to MCH 1816 through an Accelerated Graphics Port ("AGP") interconnect 1814.

In at least one embodiment, computer system 1800 may use system I/O 1822 that is a proprietary hub interface bus to couple MCH 1816 to I/O controller hub ("ICH") 1830. In at least one embodiment, ICH 1830 may provide direct connections to some I/O devices via a local I/O bus. In at least one embodiment, local I/O bus may include, without limitation, a high-speed I/O bus for connecting peripherals to memory 1820, a chipset, and processor 1802. Examples may include, without limitation, an audio controller 1829, a firmware hub ("flash BIOS") 1828, a wireless transceiver 1826, a data storage 1824, a legacy I/O controller 1823 containing a user input interface 1825 and a keyboard interface, a serial expansion port 1827, such as a USB, and a network controller 1834. Data storage 1824 may comprise a hard disk drive, a floppy disk drive, a CD-ROM device, a flash memory device, or other mass storage device.

In at least one embodiment, FIG. 18 illustrates a system, which includes interconnected hardware devices or "chips." In at least one embodiment, FIG. 18 may illustrate an exemplary SoC. In at least one embodiment, devices illustrated in FIG. 18 may be interconnected with proprietary interconnects, standardized interconnects (e.g., PCIe), or some combination thereof. In at least one embodiment, one or more components of system 1800 are interconnected using compute express link ("CXL") interconnects.

Figure 19:
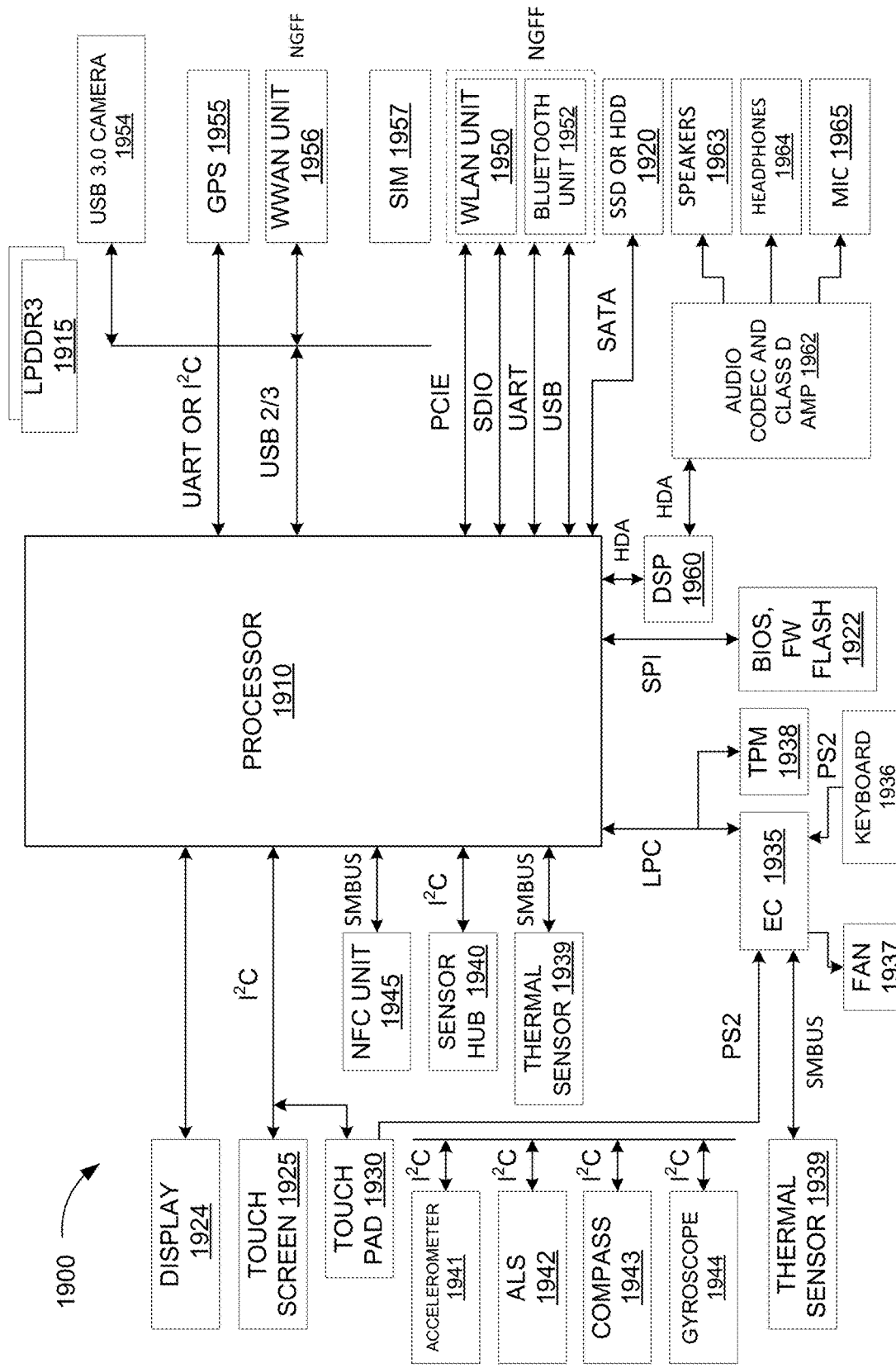
FIG. 19 illustrates a system, in accordance with at least one embodiment.

FIG. 19 illustrates a system 1900, in accordance with at least one embodiment. In at least one embodiment, system 1900 is an electronic device that utilizes a processor 1910. In at least one embodiment, system 1900 may be, for example and without limitation, a notebook, a tower server, a rack server, a blade server, a laptop, a desktop, a tablet, a mobile device, a phone, an embedded computer, or any other suitable electronic device.

In at least one embodiment, system 1900 may include, without limitation, processor 1910 communicatively coupled to any suitable number or kind of components, peripherals, modules, or devices. In at least one embodiment, processor 1910 is coupled using a bus or interface, such as an $I^2C$ bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 19 illustrates a system which includes interconnected hardware devices or "chips." In at least one embodiment, FIG. 19 may illustrate an exemplary SoC. In at least one embodiment, devices illustrated in FIG. 19 may be interconnected with proprietary interconnects, standardized interconnects (e.g., PCIe) or some combination thereof. In at least one embodiment, one or more components of FIG. 19 are interconnected using CXL interconnects.

In at least one embodiment, FIG. 19 may include a display 1924, a touch screen 1925, a touch pad 1930, a Near Field Communications unit ("NFC") 1945, a sensor hub 1940, a thermal sensor 1939, an Express Chipset ("EC") 1935, a Trusted Platform Module ("TPM") 1938, BIOS/firmware/flash memory ("BIOS, FW Flash") 1922, a DSP 1960, a Solid State Disk ("SSD") or Hard Disk Drive ("HDD") 1920, a wireless local area network unit ("WLAN") 1950, a Bluetooth unit 1952, a Wireless Wide Area Network unit ("WWAN") 1956, a Global Positioning System ("GPS") 1955, a camera ("USB 3.0 camera") 1954 such as a USB 3.0 camera, or a Low Power Double Data Rate ("LPDDR") memory unit ("LPDDR3") 1915 implemented in, for example, LPDDR3 standard. These components may each be implemented in any suitable manner.

In at least one embodiment, other components may be communicatively coupled to processor 1910 through components discussed above. In at least one embodiment, an accelerometer 1941, an Ambient Light Sensor ("ALS")

1942, a compass 1943, and a gyroscope 1944 may be communicatively coupled to sensor hub 1940. In at least one embodiment, a thermal sensor 1939, a fan 1937, a keyboard 1936, and a touch pad 1930 may be communicatively coupled to EC 1935. In at least one embodiment, a speaker 1963, a headphones 1964, and a microphone ("mic") 1965 may be communicatively coupled to an audio unit ("audio codec and class d amp") 1962, which may in turn be communicatively coupled to DSP 1960. In at least one embodiment, audio unit 1962 may include, for example and without limitation, an audio coder/decoder ("codec") and a class D amplifier. In at least one embodiment, a SIM card ("SIM") 1957 may be communicatively coupled to WWAN unit 1956. In at least one embodiment, components such as WLAN unit 1950 and Bluetooth unit 1952, as well as WWAN unit 1956 may be implemented in a Next Generation Form Factor ("NGFF").

Figure 20:
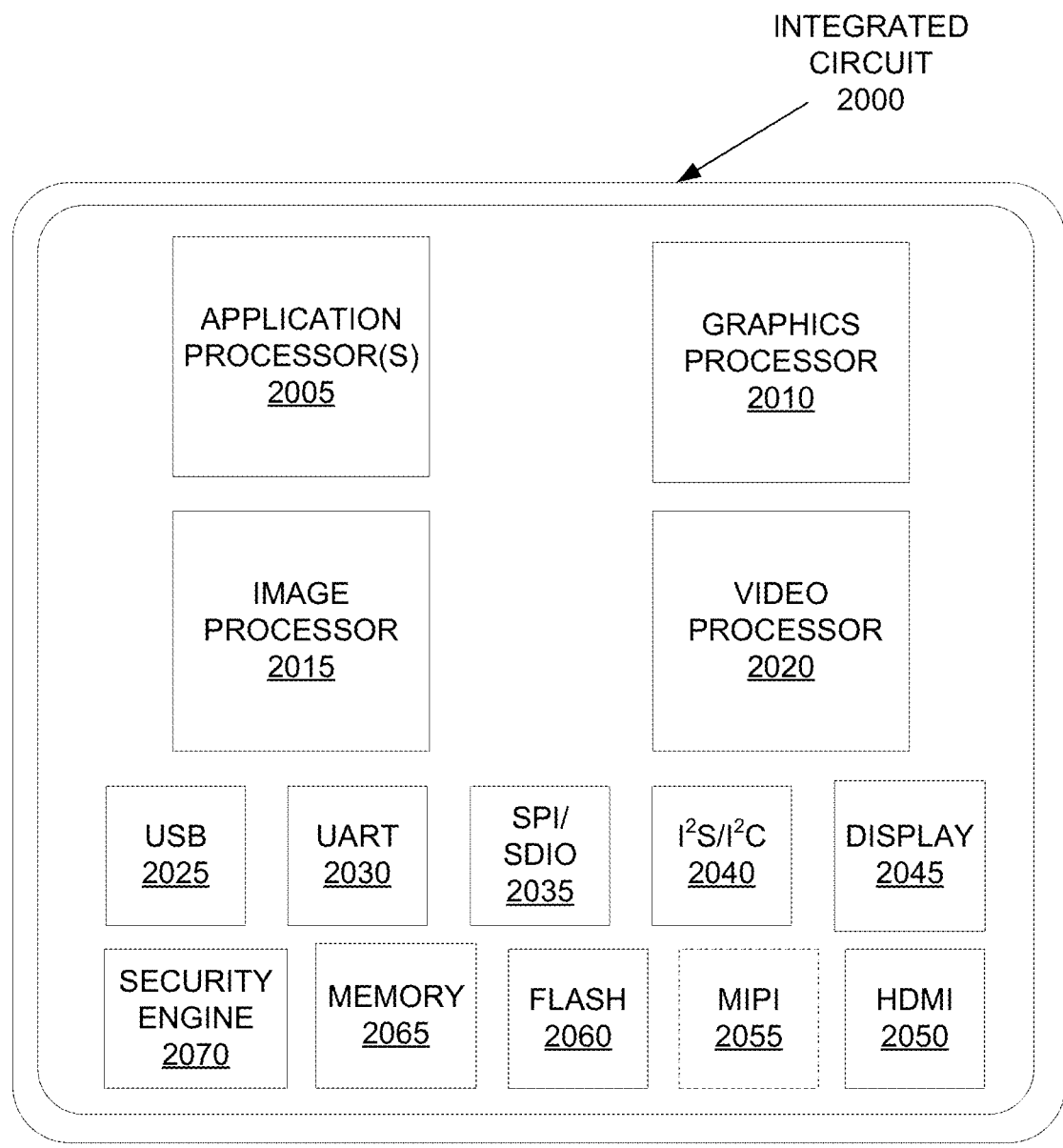
FIG. 20 illustrates an exemplary integrated circuit, in accordance with at least one embodiment.

FIG. 20 illustrates an exemplary integrated circuit 2000, in accordance with at least one embodiment. In at least one embodiment, exemplary integrated circuit 2000 is an SoC that may be fabricated using one or more IP cores. In at least one embodiment, integrated circuit 2000 includes one or more application processor(s) 2005 CPUs), at least one graphics processor 2010, and may additionally include an image processor 2015 and/or a video processor 2020, any of which may be a modular IP core. In at least one embodiment, integrated circuit 2000 includes peripheral or bus logic including a USB controller 2025, a UART controller 2030, an SPI/SDIO controller 2035, and an I$^2$S/I$^2$C controller 2040. In at least one embodiment, integrated circuit 2000 can include a display device 2045 coupled to one or more of a high-definition multimedia interface ("HDMI") controller 2050 and a mobile industry processor interface ("MIPI") display interface 2055. In at least one embodiment, storage may be provided by a flash memory subsystem 2060 including flash memory and a flash memory controller. In at least one embodiment, a memory interface may be provided via a memory controller 2065 for access to SDRAM or SRAM memory devices. In at least one embodiment, some integrated circuits additionally include an embedded security engine 2070.

Figure 21:
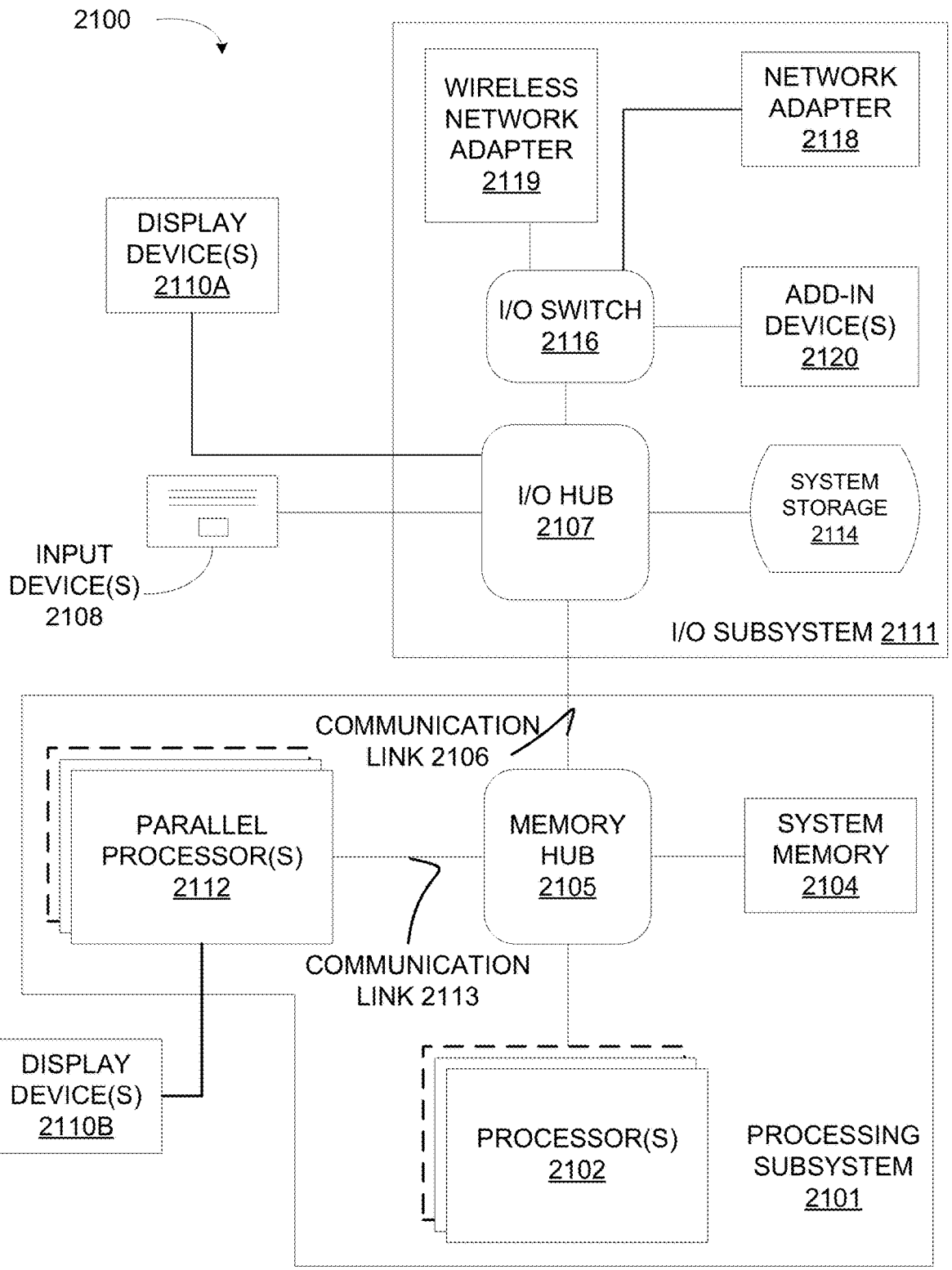
FIG. 21 illustrates a computing system, according to at least one embodiment.

FIG. 21 illustrates a computing system 2100, according to at least one embodiment; In at least one embodiment, computing system 2100 includes a processing subsystem 2101 having one or more processor(s) 2102 and a system memory 2104 communicating via an interconnection path that may include a memory hub 2105. In at least one embodiment, memory hub 2105 may be a separate component within a chipset component or may be integrated within one or more processor(s) 2102. In at least one embodiment, memory hub 2105 couples with an I/O subsystem 2111 via a communication link 2106. In at least one embodiment, I/O subsystem 2111 includes an I/O hub 2107 that can enable computing system 2100 to receive input from one or more input device(s) 2108. In at least one embodiment, I/O hub 2107 can enable a display controller, which may be included in one or more processor(s) 2102, to provide outputs to one or more display device(s) 2110A. In at least one embodiment, one or more display device(s) 2110A coupled with I/O hub 2107 can include a local, internal, or embedded display device.

In at least one embodiment, processing subsystem 2101 includes one or more parallel processor(s) 2112 coupled to memory hub 2105 via a bus or other communication link 2113. In at least one embodiment, communication link 2113 may be one of any number of standards based communication link technologies or protocols, such as, but not limited to PCIe, or may be a vendor specific communications interface or communications fabric. In at least one embodiment, one or more parallel processor(s) 2112 form a computationally focused parallel or vector processing system that can include a large number of processing cores and/or processing clusters, such as a many integrated core processor. In at least one embodiment, one or more parallel processor(s) 2112 form a graphics processing subsystem that can output pixels to one of one or more display device(s) 2110A coupled via I/O Hub 2107. In at least one embodiment, one or more parallel processor(s) 2112 can also include a display controller and display interface (not shown) to enable a direct connection to one or more display device(s) 2110B.

In at least one embodiment, a system storage unit 2114 can connect to I/O hub 2107 to provide a storage mechanism for computing system 2100. In at least one embodiment, an I/O switch 2116 can be used to provide an interface mechanism to enable connections between I/O hub 2107 and other components, such as a network adapter 2118 and/or wireless network adapter 2119 that may be integrated into a platform, and various other devices that can be added via one or more add-in device(s) 2120. In at least one embodiment, network adapter 2118 can be an Ethernet adapter or another wired network adapter. In at least one embodiment, wireless network adapter 2119 can include one or more of a Wi-Fi, Bluetooth, NFC, or other network device that includes one or more wireless radios.

In at least one embodiment, computing system 2100 can include other components not explicitly shown, including USB or other port connections, optical storage drives, video capture devices, and the like, that may also be connected to I/O hub 2107. In at least one embodiment, communication paths interconnecting various components in FIG. 21 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 2112 incorporate circuitry optimized for graphics and video processing, including, for example, video output circuitry, and constitutes a graphics processing unit ("GPU"). In at least one embodiment, one or more parallel processor(s) 2112 incorporate circuitry optimized for general purpose processing. In at least embodiment, components of computing system 2100 may be integrated with one or more other system elements on a single integrated circuit. For example, in at least one embodiment, one or more parallel processor(s) 2112, memory hub 2105, processor(s) 2102, and I/O hub 2107 can be integrated into an SoC integrated circuit. In at least one embodiment, components of computing system 2100 can be integrated into a single package to form a system in package ("SIP") configuration. In at least one embodiment, at least a portion of the components of computing system 2100 can be integrated into a multi-chip module ("MCM"), which can be interconnected with other multi-chip modules into a modular computing system. In at least one embodiment, I/O subsystem 2111 and display devices 2110B are omitted from computing system 2100.

Processing Systems

The following FIGS. set forth, without limitation, exemplary processing systems that can be used to implement at least one embodiment.

Figure 22:
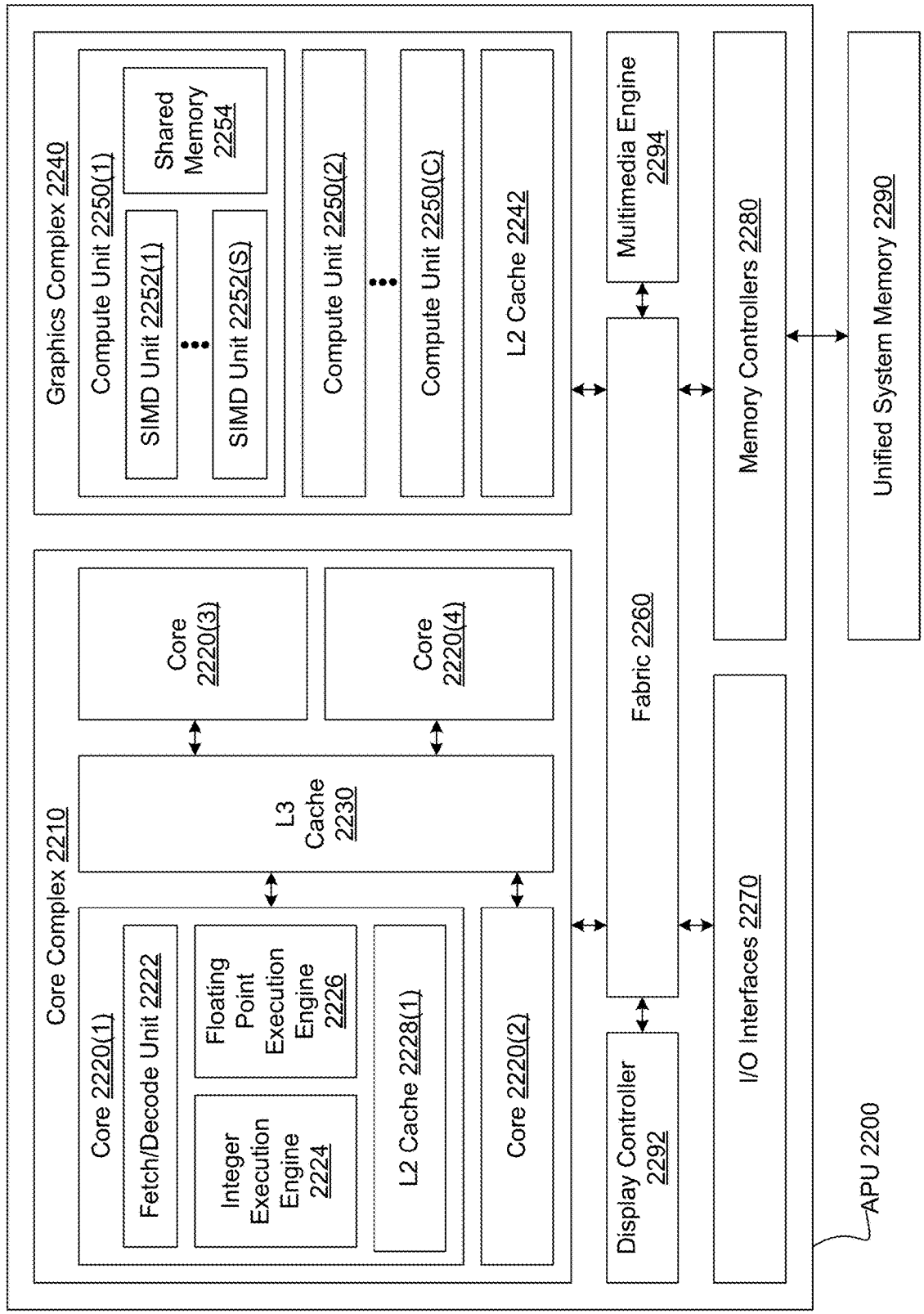
FIG. 22 illustrates an APU, in accordance with at least one embodiment.

FIG. 22 illustrates an accelerated processing unit ("APU") 2200, in accordance with at least one embodiment. In at least one embodiment, APU 2200 is developed by AMD Corporation of Santa Clara, Calif. In at least one embodiment, APU 2200 can be configured to execute an application program, such as a CUDA program. In at least one embodiment, APU 2200 includes, without limitation, a core complex 2210, a graphics complex 2240, fabric 2260, I/O interfaces 2270, memory controllers 2280, a display controller 2292, and a multimedia engine 2294. In at least one embodiment, APU 2200 may include, without limitation, any number of core complexes 2210, any number of graphics complexes 2250, any number of display controllers 2292, and any number of multimedia engines 2294 in any combination. For explanatory purposes, multiple instances of like objects are denoted herein with reference numbers identifying the object and parenthetical numbers identifying the instance where needed.

In at least one embodiment, core complex 2210 is a CPU, graphics complex 2240 is a GPU, and APU 2200 is a processing unit that integrates, without limitation, 2210 and 2240 onto a single chip. In at least one embodiment, some tasks may be assigned to core complex 2210 and other tasks may be assigned to graphics complex 2240. In at least one embodiment, core complex 2210 is configured to execute main control software associated with APU 2200, such as an operating system. In at least one embodiment, core complex 2210 is the master processor of APU 2200, controlling and coordinating operations of other processors. In at least one embodiment, core complex 2210 issues commands that control the operation of graphics complex 2240. In at least one embodiment, core complex 2210 can be configured to execute host executable code derived from CUDA source code, and graphics complex 2240 can be configured to execute device executable code derived from CUDA source code.

In at least one embodiment, core complex 2210 includes, without limitation, cores 2220(1)-2220(4) and an L3 cache 2230. In at least one embodiment, core complex 2210 may include, without limitation, any number of cores 2220 and any number and type of caches in any combination. In at least one embodiment, cores 2220 are configured to execute instructions of a particular instruction set architecture ("ISA"). In at least one embodiment, each core 2220 is a CPU core.

In at least one embodiment, each core 2220 includes, without limitation, a fetch/decode unit 2222, an integer execution engine 2224, a floating point execution engine 2226, and an L2 cache 2228. In at least one embodiment, fetch/decode unit 2222 fetches instructions, decodes such instructions, generates micro-operations, and dispatches separate micro-instructions to integer execution engine 2224 and floating point execution engine 2226. In at least one embodiment, fetch/decode unit 2222 can concurrently dispatch one micro-instruction to integer execution engine 2224 and another micro-instruction to floating point execution engine 2226. In at least one embodiment, integer execution engine 2224 executes, without limitation, integer and memory operations. In at least one embodiment, floating point engine 2226 executes, without limitation, floating point and vector operations. In at least one embodiment, fetch-decode unit 2222 dispatches micro-instructions to a single execution engine that replaces both integer execution engine 2224 and floating point execution engine 2226.

In at least one embodiment, each core 2220($i$), where i is an integer representing a particular instance of core 2220, may access L2 cache 2228($i$) included in core 2220($i$). In at least one embodiment, each core 2220 included in core complex 2210($j$), where j is an integer representing a particular instance of core complex 2210, is connected to other cores 2220 included in core complex 2210($j$) via L3 cache 2230($j$) included in core complex 2210($j$). In at least one embodiment, cores 2220 included in core complex 2210($j$), where j is an integer representing a particular instance of core complex 2210, can access all of L3 cache 2230($j$) included in core complex 2210($j$). In at least one embodiment, L3 cache 2230 may include, without limitation, any number of slices.

In at least one embodiment, graphics complex 2240 can be configured to perform compute operations in a highly-parallel fashion. In at least one embodiment, graphics complex 2240 is configured to execute graphics pipeline operations such as draw commands, pixel operations, geometric computations, and other operations associated with rendering an image to a display. In at least one embodiment, graphics complex 2240 is configured to execute operations unrelated to graphics. In at least one embodiment, graphics complex 2240 is configured to execute both operations related to graphics and operations unrelated to graphics.

In at least one embodiment, graphics complex 2240 includes, without limitation, any number of compute units 2250(1), 2250(2), and/or 2250(C), and an L2 cache 2242. In at least one embodiment, compute units 2250 share L2 cache 2242. In at least one embodiment, L2 cache 2242 is partitioned. In at least one embodiment, graphics complex 2240 includes, without limitation, any number of compute units 2250 and any number (including zero) and type of caches. In at least one embodiment, graphics complex 2240 includes, without limitation, any amount of dedicated graphics hardware.

In at least one embodiment, each compute unit 2250 includes, without limitation, any number of SIMD units 2252(1)-2252(S) and a shared memory 2254. In at least one embodiment, each SIMD unit implements a SIMD architecture and is configured to perform operations in parallel. In at least one embodiment, each compute unit 2250 may execute any number of thread blocks, but each thread block executes on a single compute unit 2250. In at least one embodiment, a thread block includes, without limitation, any number of threads of execution. In at least one embodiment, a workgroup is a thread block. In at least one embodiment, each SIMD unit executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 2254.

In at least one embodiment, fabric 2260 is a system interconnect that facilitates data and control transmissions across core complex 2210, graphics complex 2240, I/O interfaces 2270, memory controllers 2280, display controller 2292, and multimedia engine 2294. In at least one embodiment, APU 2200 may include, without limitation, any amount and type of system interconnect in addition to or instead of fabric 2260 that facilitates data and control transmissions across any number and type of directly or indirectly linked components that may be internal or external to APU 2200. In at least one embodiment, I/O interfaces 2270 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 2270 In at least one embodiment, peripheral devices that are coupled to I/O interfaces 2270 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 240 includes, without limitation, any amount and type of circuitry that is related to multimedia, such as a video decoder, a video encoder, an image signal processor, etc. In at least one embodiment, memory controllers 2280 facilitate data transfers between APU 2200 and a unified system memory 2290. In at least one embodiment, core complex 2210 and graphics complex 2240 share unified system memory 2290.

In at least one embodiment, APU 2200 implements a memory subsystem that includes, without limitation, any amount and type of memory controllers 2280 and memory devices (e.g., shared memory 2254) that may be dedicated to one component or shared among multiple components. In at least one embodiment, APU 2200 implements a cache subsystem that includes, without limitation, one or more cache memories (e.g., L2 caches 2328, L3 cache 2230, and L2 cache 2242) that may each be private to or shared between any number of components (e.g., cores 2220, core complex 2210, SIMD units 2252, compute units 2250, and graphics complex 2240).

Figure 23:
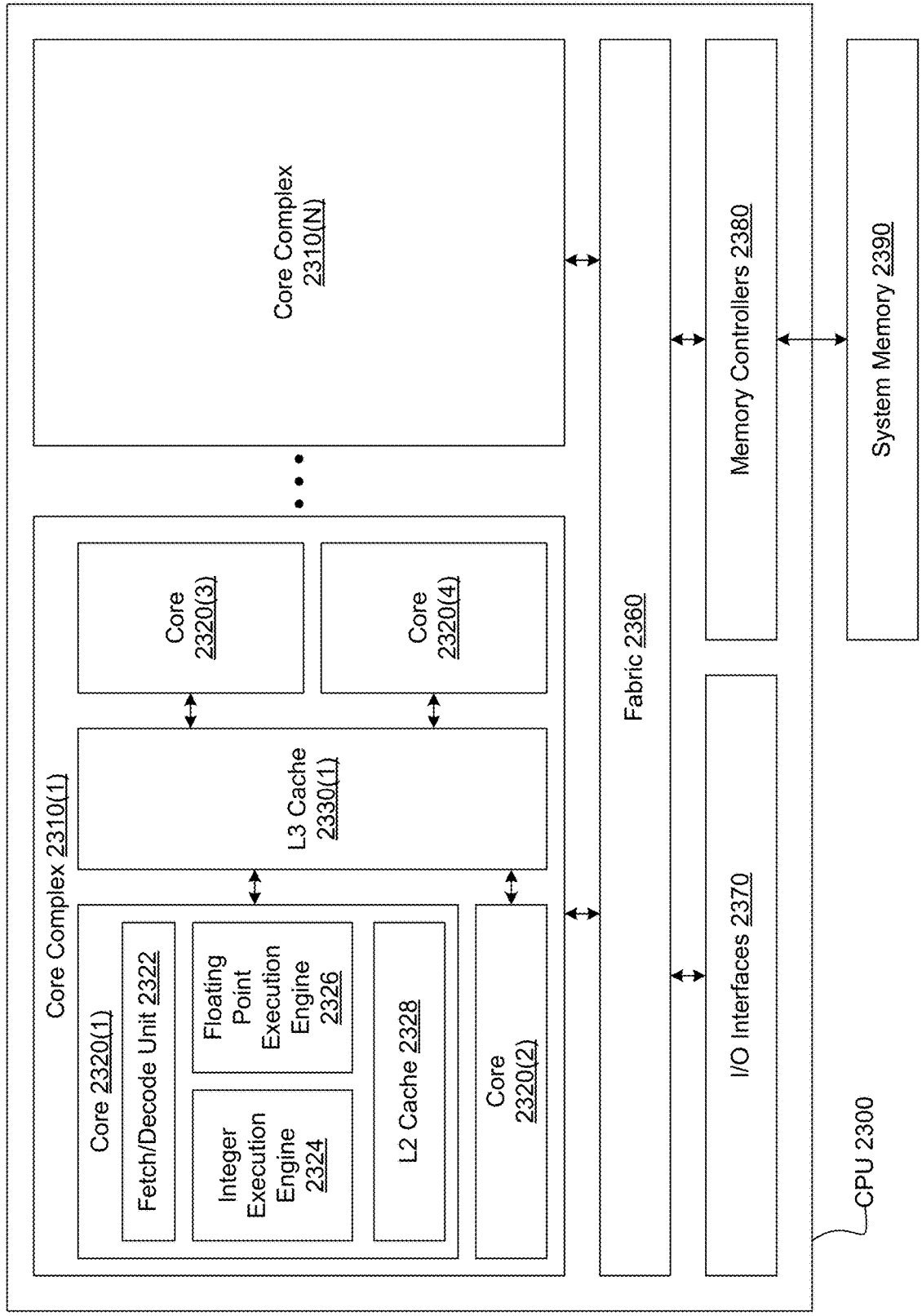
FIG. 23 illustrates a CPU, in accordance with at least one embodiment.

FIG. 23 illustrates a CPU 2300, in accordance with at least one embodiment. In at least one embodiment, CPU 2300 is developed by AMD Corporation of Santa Clara, Calif. In at least one embodiment, CPU 2300 can be configured to execute an application program. In at least one embodiment, CPU 2300 is configured to execute main control software, such as an operating system. In at least one embodiment, CPU 2300 issues commands that control the operation of an external GPU (not shown). In at least one embodiment, CPU 2300 can be configured to execute host executable code derived from CUDA source code, and an external GPU can be configured to execute device executable code derived from such CUDA source code. In at least one embodiment, CPU 2300 includes, without limitation, any number of core complexes 2310, fabric 2360, I/O interfaces 2370, and memory controllers 2380.

In at least one embodiment, core complex 2310 includes, without limitation, cores 2320(1)-2320(4) and an L3 cache 2330. In at least one embodiment, core complex 2310 may include, without limitation, any number of cores 2320 and any number and type of caches in any combination. In at least one embodiment, cores 2320 are configured to execute instructions of a particular ISA. In at least one embodiment, each core 2320 is a CPU core.

In at least one embodiment, each core 2320 includes, without limitation, a fetch/decode unit 2322, an integer execution engine 2324, a floating point execution engine 2326, and an L2 cache 2328. In at least one embodiment, fetch/decode unit 2322 fetches instructions, decodes such instructions, generates micro-operations, and dispatches separate micro-instructions to integer execution engine 2324 and floating point execution engine 2326. In at least one embodiment, fetch/decode unit 2322 can concurrently dispatch one micro-instruction to integer execution engine 2324 and another micro-instruction to floating point execution engine 2326. In at least one embodiment, integer execution engine 2324 executes, without limitation, integer and memory operations. In at least one embodiment, floating point engine 2326 executes, without limitation, floating point and vector operations. In at least one embodiment, fetch-decode unit 2322 dispatches micro-instructions to a single execution engine that replaces both integer execution engine 2324 and floating point execution engine 2326.

In at least one embodiment, each core 2320($i$), where i is an integer representing a particular instance of core 2320, may access L2 cache 2328($i$) included in core 2320($i$). In at least one embodiment, each core 2320 included in core complex 2310($j$), where j is an integer representing a particular instance of core complex 2310, is connected to other cores 2320 in core complex 2310($j$) via L3 cache 2330($j$) included in core complex 2310($j$). In at least one embodiment, cores 2320 included in core complex 2310($j$), where j is an integer representing a particular instance of core complex 2310, can access all of L3 cache 2330($j$) included in core complex 2310($j$). In at least one embodiment, L3 cache 2330 may include, without limitation, any number of slices.

In at least one embodiment, fabric 2360 is a system interconnect that facilitates data and control transmissions across core complexes 2310(1)-2310(N) (where N is an integer greater than zero), I/O interfaces 2370, and memory controllers 2380. In at least one embodiment, CPU 2300 may include, without limitation, any amount and type of system interconnect in addition to or instead of fabric 2360 that facilitates data and control transmissions across any number and type of directly or indirectly linked components that may be internal or external to CPU 2300. In at least one embodiment, I/O interfaces 2370 are representative of any number and type of I/O interfaces (e.g., PCI, PCI-X, PCIe, GBE, USB, etc.). In at least one embodiment, various types of peripheral devices are coupled to I/O interfaces 2370 In at least one embodiment, peripheral devices that are coupled to I/O interfaces 2370 may include, without limitation, displays, keyboards, mice, printers, scanners, joysticks or other types of game controllers, media recording devices, external storage devices, network interface cards, and so forth.

In at least one embodiment, memory controllers 2380 facilitate data transfers between CPU 2300 and a system memory 2390. In at least one embodiment, core complex 2310 and graphics complex 2340 share system memory 2390. In at least one embodiment, CPU 2300 implements a memory subsystem that includes, without limitation, any amount and type of memory controllers 2380 and memory devices that may be dedicated to one component or shared among multiple components. In at least one embodiment, CPU 2300 implements a cache subsystem that includes, without limitation, one or more cache memories (e.g., L2 caches 2328 and L3 caches 2330) that may each be private to or shared between any number of components (e.g., cores 2320 and core complexes 2310).

Figure 24:
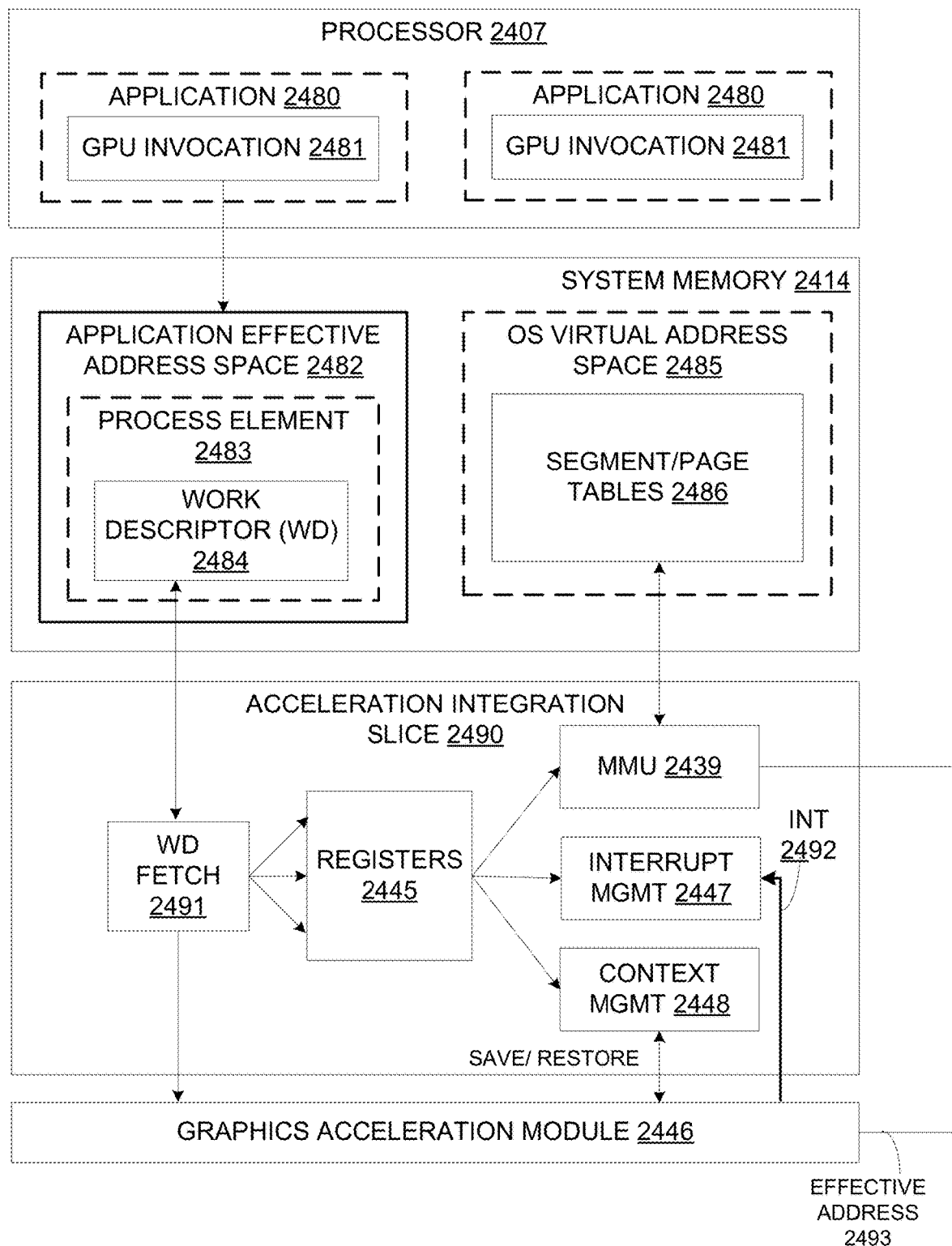
FIG. 24 illustrates an exemplary accelerator integration slice, in accordance with at least one embodiment.

FIG. 24 illustrates an exemplary accelerator integration slice 2490, in accordance with at least one embodiment. As used herein, a "slice" comprises a specified portion of processing resources of an accelerator integration circuit. In at least one embodiment, the accelerator integration circuit provides cache management, memory access, context management, and interrupt management services on behalf of multiple graphics processing engines included in a graphics acceleration module. The graphics processing engines may each comprise a separate GPU. Alternatively, the graphics processing engines may comprise different types of graphics processing engines within a GPU such as graphics execution units, media processing engines (e.g., video encoders/decoders), samplers, and blit engines. In at least one embodiment, the graphics acceleration module may be a GPU with multiple graphics processing engines. In at least one embodiment, the graphics processing engines may be individual GPUs integrated on a common package, line card, or chip.

An application effective address space 2482 within system memory 2414 stores process elements 2483. In one embodiment, process elements 2483 are stored in response to GPU invocations 2481 from applications 2480 executed on processor 2407. A process element 2483 contains process state for corresponding application 2480. A work descriptor ("WD") 2484 contained in process element 2483 can be a single job requested by an application or may contain a pointer to a queue of jobs. In at least one embodiment, WD 2484 is a pointer to a job request queue in application effective address space 2482.

Graphics acceleration module 2446 and/or individual graphics processing engines can be shared by all or a subset of processes in a system. In at least one embodiment, an infrastructure for setting up process state and sending WD 2484 to graphics acceleration module 2446 to start a job in a virtualized environment may be included.

In at least one embodiment, a dedicated-process programming model is implementation-specific. In this model, a single process owns graphics acceleration module 2446 or an individual graphics processing engine. Because graphics acceleration module 2446 is owned by a single process, a hypervisor initializes an accelerator integration circuit for an owning partition and an operating system initializes accelerator integration circuit for an owning process when graphics acceleration module 2446 is assigned.

In operation, a WD fetch unit 2491 in accelerator integration slice 2490 fetches next WD 2484 which includes an indication of work to be done by one or more graphics processing engines of graphics acceleration module 2446. Data from WD 2484 may be stored in registers 2445 and used by a memory management unit ("MMU") 2439, interrupt management circuit 2447 and/or context management circuit 2448 as illustrated. For example, one embodiment of MMU 2439 includes segment/page walk circuitry for accessing segment/page tables 2486 within OS virtual address space 2485. Interrupt management circuit 2447 may process interrupt events ("INT") 2492 received from graphics acceleration module 2446. When performing graphics operations, an effective address 2493 generated by a graphics processing engine is translated to a real address by MMU 2439.

In one embodiment, a same set of registers 2445 are duplicated for each graphics processing engine and/or graphics acceleration module 2446 and may be initialized by a hypervisor or operating system. Each of these duplicated registers may be included in accelerator integration slice 2490. Exemplary registers that may be initialized by a hypervisor are shown in Table 1.

TABLE 1

| | Hypervisor Initialized Registers |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |

TABLE 1-continued

| | Hypervisor Initialized Registers |
|---|---|
| 8 | Real address (RA) Hypervisor Accelerator Utilization Record Pointer |
| 9 | Storage Description Register |

Exemplary registers that may be initialized by an operating system are shown in Table 2.

TABLE 2

| | Operating System Initialized Registers |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 2484 is specific to a particular graphics acceleration module 2446 and/or a particular graphics processing engine. It contains all information required by a graphics processing engine to do work or it can be a pointer to a memory location where an application has set up a command queue of work to be completed.

Figure 25A:
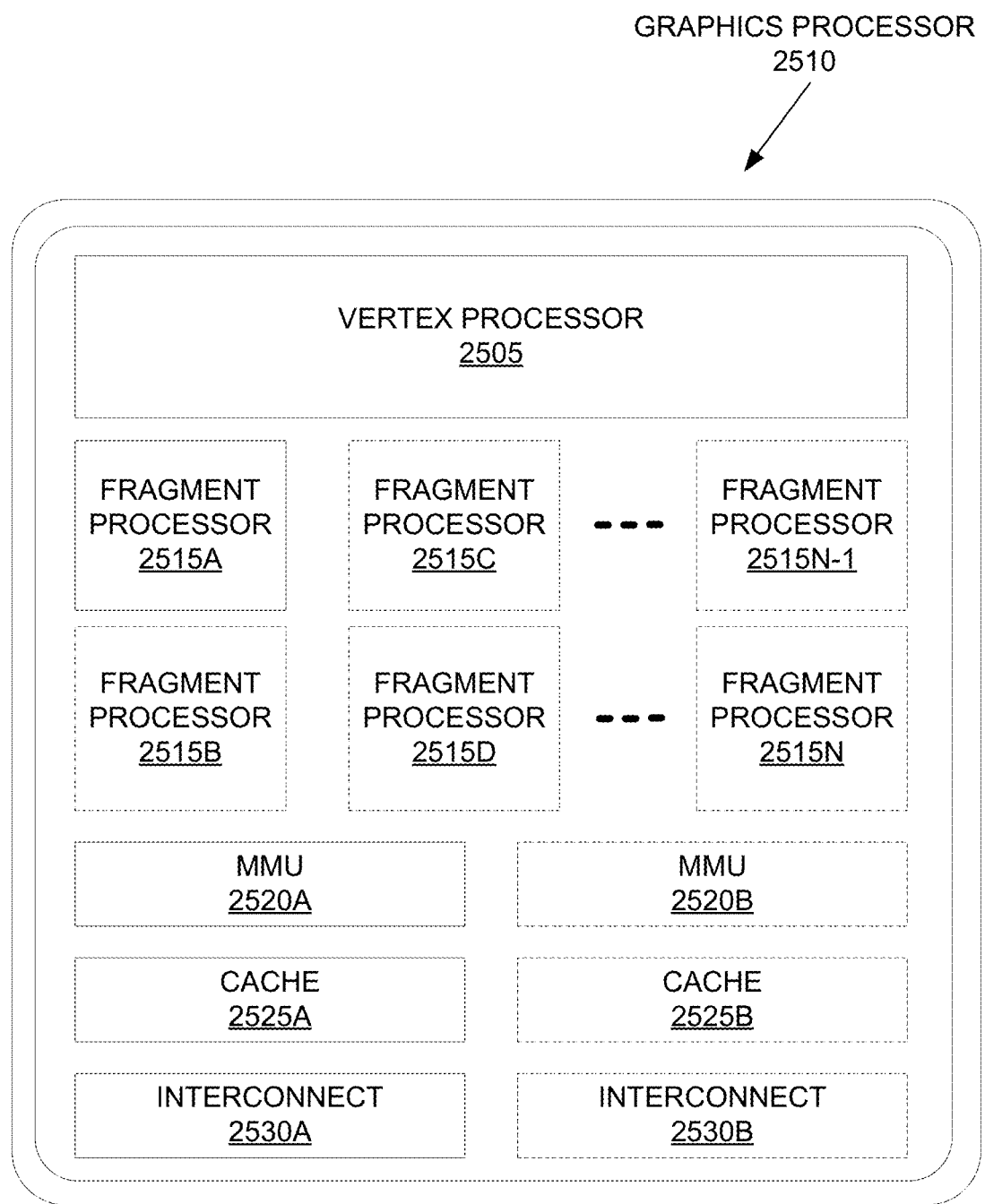
FIGS. 25A and 25B illustrate exemplary graphics processors, in accordance with at least one embodiment.
Figure 25B:
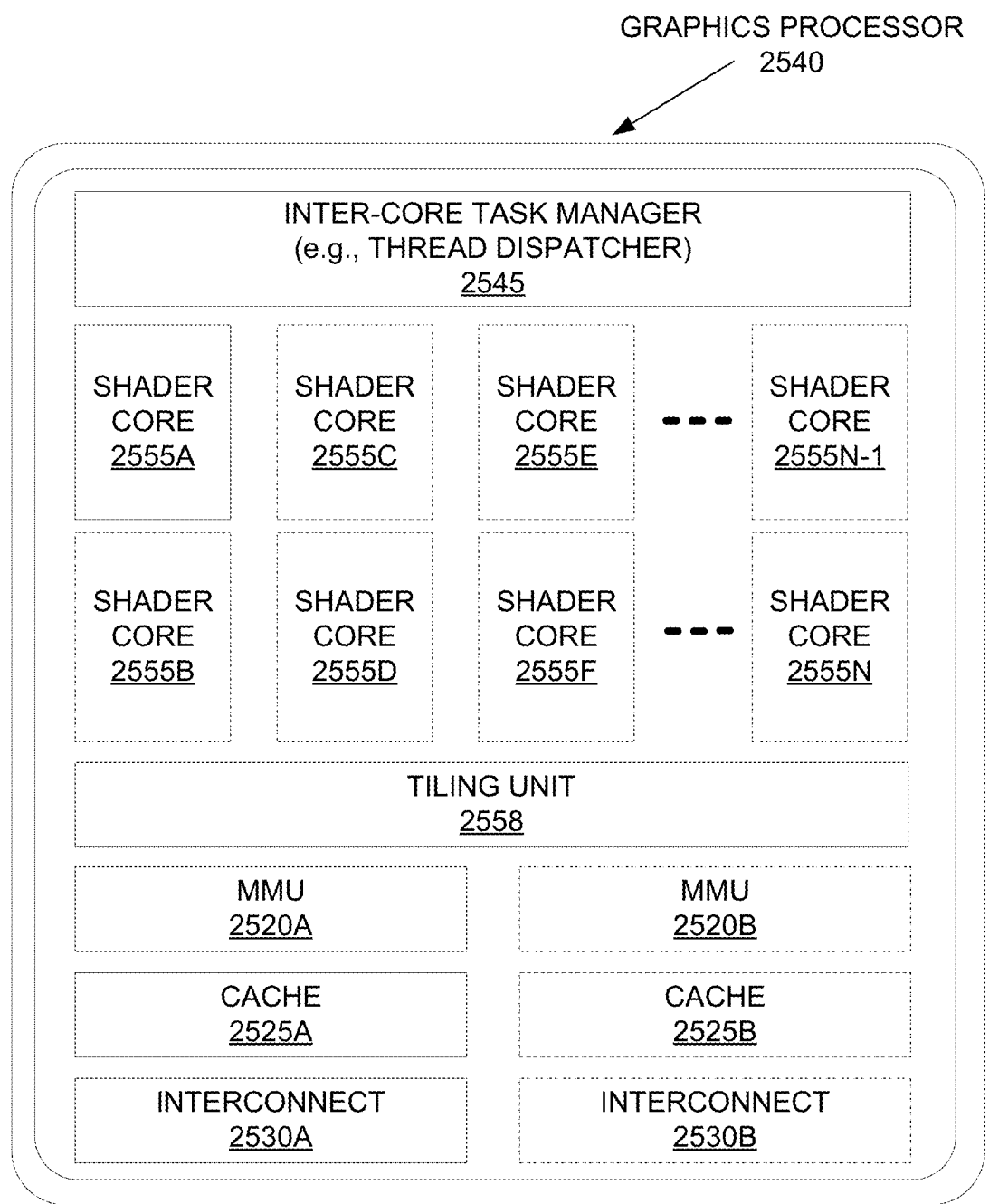

FIGS. 25A-25B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 25A illustrates an exemplary graphics processor 2510 of an SoC integrated circuit that may be fabricated using one or more IP cores, in accordance with at least one embodiment. FIG. 25B illustrates an additional exemplary graphics processor 2540 of an SoC integrated circuit that may be fabricated using one or more IP cores, in accordance with at least one embodiment. In at least one embodiment, graphics processor 2510 of FIG. 25A is a low power graphics processor core. In at least one embodiment, graphics processor 2540 of FIG. 25B is a higher performance graphics processor core. In at least one embodiment, each of graphics processors 2510, 2540 can be variants of graphics processor 2010 of FIG. 20.

In at least one embodiment, graphics processor 2510 includes a vertex processor 2505 and one or more fragment processor(s) 2515A-2515N (e.g., 2515A, 2515B, 2515C, 2515D, through 2515N-1, and 2515N). In at least one embodiment, graphics processor 2510 can execute different shader programs via separate logic, such that vertex processor 2505 is optimized to execute operations for vertex shader programs, while one or more fragment processor(s) 2515A-2515N execute fragment (e.g., pixel) shading operations for fragment or pixel shader programs. In at least one embodiment, vertex processor 2505 performs a vertex processing stage of a 3D graphics pipeline and generates primitives and vertex data. In at least one embodiment, fragment processor(s) 2515A-2515N use primitive and vertex data generated by vertex processor 2505 to produce a framebuffer that is displayed on a display device. In at least one embodiment, fragment processor(s) 2515A-2515N are optimized to execute fragment shader programs as provided for in an OpenGL API, which may be used to perform similar operations as a pixel shader program as provided for in a Direct 3D API.

In at least one embodiment, graphics processor 2510 additionally includes one or more MMU(s) 2520A-2520B, cache(s) 2525A-2525B, and circuit interconnect(s) 2530A-2530B. In at least one embodiment, one or more MMU(s) 2520A-2520B provide for virtual to physical address mapping for graphics processor 2510, including for vertex processor 2505 and/or fragment processor(s) 2515A-2515N, which may reference vertex or image/texture data stored in memory, in addition to vertex or image/texture data stored in one or more cache(s) 2525A-2525B. In at least one embodiment, one or more MMU(s) 2520A-2520B may be synchronized with other MMUs within a system, including one or more MMUs associated with one or more application processor(s) 2005, image processors 2015, and/or video processors 2020 of FIG. 20, such that each processor 2005-2020 can participate in a shared or unified virtual memory system. In at least one embodiment, one or more circuit interconnect(s) 2530A-2530B enable graphics processor 2510 to interface with other IP cores within an SoC, either via an internal bus of the SoC or via a direct connection.

In at least one embodiment, graphics processor 2540 includes one or more MMU(s) 2520A-2520B, caches 2525A-2525B, and circuit interconnects 2530A-2530B of graphics processor 2510 of FIG. 25A. In at least one embodiment, graphics processor 2540 includes one or more shader core(s) 2555A-2555N (e.g., 2555A, 2555B, 2555C, 2555D, 2555E, 2555F, through 2555N-1, and 2555N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 2540 includes an inter-core task manager 2545, which acts as a thread dispatcher to dispatch execution threads to one or more shader cores 2555A-2555N and a tiling unit 2558 to accelerate tiling operations for tile-based rendering, in which rendering operations for a scene are subdivided in image space, for example to exploit local spatial coherence within a scene or to optimize use of internal caches.

Figure 26A:
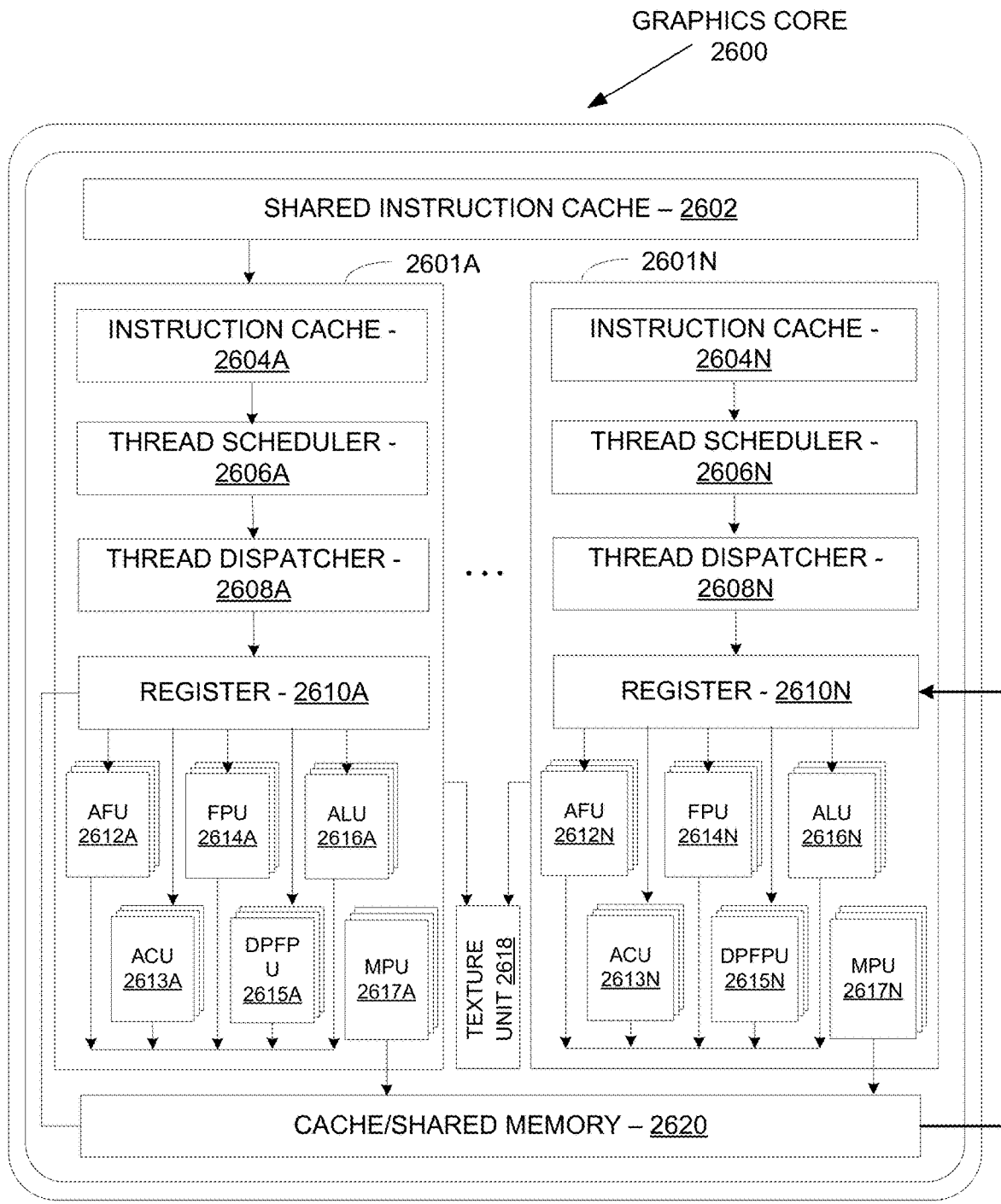
FIG. 26A illustrates a graphics core, in accordance with at least one embodiment.

FIG. 26A illustrates a graphics core 2600, in accordance with at least one embodiment. In at least one embodiment, graphics core 2600 may be included within graphics processor 2010 of FIG. 20. In at least one embodiment, graphics core 2600 may be a unified shader core 2555A-2555N as in FIG. 25B. In at least one embodiment, graphics core 2600 includes a shared instruction cache 2602, a texture unit 2618, and a cache/shared memory 2620 that are common to execution resources within graphics core 2600. In at least one embodiment, graphics core 2600 can include multiple slices 2601A-2601N or partition for each core, and a graphics processor can include multiple instances of graphics core 2600. Slices 2601A-2601N can include support logic including a local instruction cache 2604A-2604N, a thread scheduler 2606A-2606N, a thread dispatcher 2608A-2608N, and a set of registers 2610A-2610N. In at least one embodiment, slices 2601A-2601N can include a set of additional function units ("AFUs") 2612A-2612N, floating-point units ("FPUs") 2614A-2614N, integer arithmetic logic units ("ALUs") 2616A-2616N, address computational units ("ACUs") 2613A-2613N, double-precision floating-point units ("DPFPUs") 2615A-2615N, and matrix processing units ("MPUs") 2617A-2617N.

In at least one embodiment, FPUs 2614A-2614N can perform single-precision (32-bit) and half-precision (16-bit) floating point operations, while DPFPUs 2615A-2615N perform double precision (64-bit) floating point operations. In at least one embodiment, ALUs 2616A-2616N can perform variable precision integer operations at 8-bit, 16-bit, and 32-bit precision, and can be configured for mixed precision operations. In at least one embodiment, MPUs 2617A-2617N can also be configured for mixed precision matrix operations, including half-precision floating point and 8-bit integer operations. In at least one embodiment, MPUs 2617-2617N can perform a variety of matrix operations to accelerate CUDA programs, including enabling support for accelerated general matrix to matrix multiplication ("GEMM"). In at least one embodiment, AFUs 2612A-2612N can perform additional logic operations not supported by floating-point or integer units, including trigonometric operations (e.g., Sine, Cosine, etc.).

Figure 26B:
FIG. 26B illustrates a GPGPU, in accordance with at least one embodiment.

FIG. 26B illustrates a general-purpose graphics processing unit ("GPGPU") 2630, in accordance with at least one embodiment. In at least one embodiment, GPGPU 2630 is highly-parallel and suitable for deployment on a multi-chip module. In at least one embodiment, GPGPU 2630 can be configured to enable highly-parallel compute operations to be performed by an array of GPUs. In at least one embodiment, GPGPU 2630 can be linked directly to other instances of GPGPU 2630 to create a multi-GPU cluster to improve execution time for CUDA programs. In at least one embodiment, GPGPU 2630 includes a host interface 2632 to enable a connection with a host processor. In at least one embodiment, host interface 2632 is a PCIe interface. In at least one embodiment, host interface 2632 can be a vendor specific communications interface or communications fabric. In at least one embodiment, GPGPU 2630 receives commands from a host processor and uses a global scheduler 2634 to distribute execution threads associated with those commands to a set of compute clusters 2636A-2636H. In at least one embodiment, compute clusters 2636A-2636H share a cache memory 2638. In at least one embodiment, cache memory 2638 can serve as a higher-level cache for cache memories within compute clusters 2636A-2636H.

In at least one embodiment, GPGPU 2630 includes memory 2644A-2644B coupled with compute clusters 2636A-2636H via a set of memory controllers 2642A-2642B. In at least one embodiment, memory 2644A-2644B can include various types of memory devices including DRAM or graphics random access memory, such as synchronous graphics random access memory ("SGRAM"), including graphics double data rate ("GDDR") memory.

In at least one embodiment, compute clusters 2636A-2636H each include a set of graphics cores, such as graphics core 2600 of FIG. 26A, which can include multiple types of integer and floating point logic units that can perform computational operations at a range of precisions including suited for computations associated with CUDA programs. For example, in at least one embodiment, at least a subset of floating point units in each of compute clusters 2636A-2636H can be configured to perform 16-bit or 32-bit floating point operations, while a different subset of floating point units can be configured to perform 64-bit floating point operations.

In at least one embodiment, multiple instances of GPGPU 2630 can be configured to operate as a compute cluster. Compute clusters 2636A-2636H may implement any technically feasible communication techniques for synchronization and data exchange. In at least one embodiment, multiple instances of GPGPU 2630 communicate over host interface 2632. In at least one embodiment, GPGPU 2630 includes an I/O hub 2639 that couples GPGPU 2630 with a GPU link 2640 that enables a direct connection to other instances of GPGPU 2630. In at least one embodiment, GPU link 2640 is coupled to a dedicated GPU-to-GPU bridge that enables communication and synchronization between multiple instances of GPGPU 2630. In at least one embodiment GPU link 2640 couples with a high speed interconnect to transmit and receive data to other GPGPUs 2630 or parallel processors. In at least one embodiment, multiple instances of GPGPU 2630 are located in separate data processing systems and communicate via a network device that is accessible via host interface 2632. In at least one embodiment GPU link 2640 can be configured to enable a connection to a host processor in addition to or as an alternative to host interface 2632. In at least one embodiment, GPGPU 2630 can be configured to execute a CUDA program.

Figure 27A:
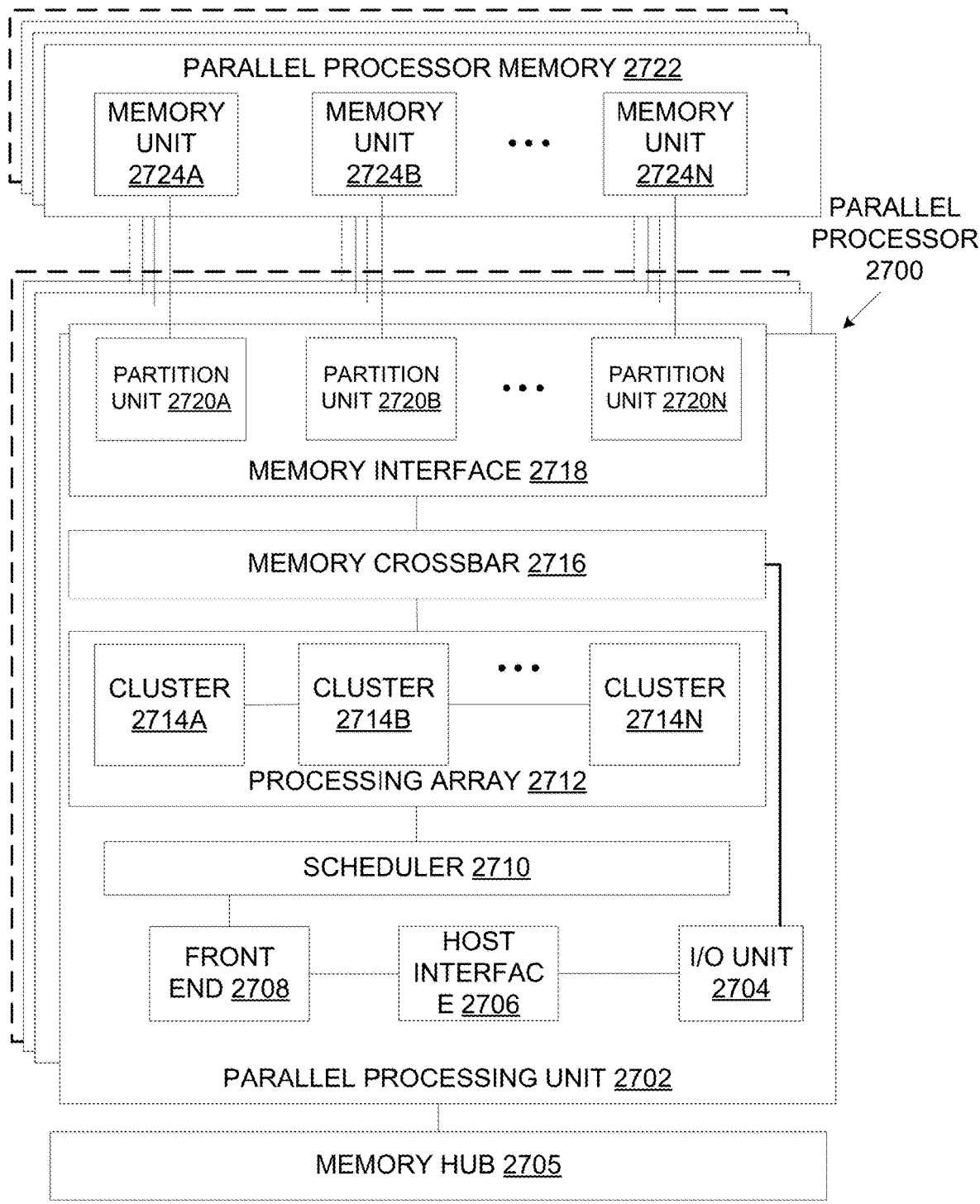
FIG. 27A illustrates a parallel processor, in accordance with at least one embodiment.

FIG. 27A illustrates a parallel processor 2700, in accordance with at least one embodiment. In at least one embodiment, various components of parallel processor 2700 may be implemented using one or more integrated circuit devices, such as programmable processors, application specific integrated circuits ("ASICs"), or FPGAs.

In at least one embodiment, parallel processor 2700 includes a parallel processing unit 2702. In at least one embodiment, parallel processing unit 2702 includes an I/O unit 2704 that enables communication with other devices, including other instances of parallel processing unit 2702. In at least one embodiment, I/O unit 2704 may be directly connected to other devices. In at least one embodiment, I/O unit 2704 connects with other devices via use of a hub or switch interface, such as memory hub 2705. In at least one embodiment, connections between memory hub 2705 and I/O unit 2704 form a communication link. In at least one embodiment, I/O unit 2704 connects with a host interface 2706 and a memory crossbar 2716, where host interface 2706 receives commands directed to performing processing operations and memory crossbar 2716 receives commands directed to performing memory operations.

In at least one embodiment, when host interface 2706 receives a command buffer via I/O unit 2704, host interface 2706 can direct work operations to perform those commands to a front end 2708. In at least one embodiment, front end 2708 couples with a scheduler 2710, which is configured to distribute commands or other work items to a processing array 2712. In at least one embodiment, scheduler 2710 ensures that processing array 2712 is properly configured and in a valid state before tasks are distributed to processing array 2712. In at least one embodiment, scheduler 2710 is implemented via firmware logic executing on a microcontroller. In at least one embodiment, microcontroller implemented scheduler 2710 is configurable to perform complex scheduling and work distribution operations at coarse and fine granularity, enabling rapid preemption and context switching of threads executing on processing array 2712. In at least one embodiment, host software can prove workloads for scheduling on processing array 2712 via one of multiple graphics processing doorbells. In at least one embodiment, workloads can then be automatically distributed across processing array 2712 by scheduler 2710 logic within a microcontroller including scheduler 2710.

In at least one embodiment, processing array 2712 can include up to "N" clusters (e.g., cluster 2714A, cluster 2714B, through cluster 2714N). In at least one embodiment, each cluster 2714A-2714N of processing array 2712 can execute a large number of concurrent threads. In at least one embodiment, scheduler 2710 can allocate work to clusters 2714A-2714N of processing array 2712 using various scheduling and/or work distribution algorithms, which may vary depending on the workload arising for each type of program or computation. In at least one embodiment, scheduling can be handled dynamically by scheduler 2710, or can be assisted in part by compiler logic during compilation of program logic configured for execution by processing array 2712. In at least one embodiment, different clusters 2714A-2714N of processing array 2712 can be allocated for processing different types of programs or for performing different types of computations.

In at least one embodiment, processing array 2712 can be configured to perform various types of parallel processing operations. In at least one embodiment, processing array 2712 is configured to perform general-purpose parallel compute operations. For example, in at least one embodiment, processing array 2712 can include logic to execute processing tasks including filtering of video and/or audio data, performing modeling operations, including physics operations, and performing data transformations.

In at least one embodiment, processing array 2712 is configured to perform parallel graphics processing operations. In at least one embodiment, processing array 2712 can include additional logic to support execution of such graphics processing operations, including, but not limited to texture sampling logic to perform texture operations, as well as tessellation logic and other vertex processing logic. In at least one embodiment, processing array 2712 can be configured to execute graphics processing related shader programs such as, but not limited to vertex shaders, tessellation shaders, geometry shaders, and pixel shaders. In at least one embodiment, parallel processing unit 2702 can transfer data from system memory via I/O unit 2704 for processing. In at least one embodiment, during processing, transferred data can be stored to on-chip memory (e.g., a parallel processor memory 2722) during processing, then written back to system memory.

In at least one embodiment, when parallel processing unit 2702 is used to perform graphics processing, scheduler 2710 can be configured to divide a processing workload into approximately equal sized tasks, to better enable distribution of graphics processing operations to multiple clusters 2714A-2714N of processing array 2712. In at least one embodiment, portions of processing array 2712 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2714A-2714N may be stored in buffers to allow intermediate data to be transmitted between clusters 2714A-2714N for further processing.

In at least one embodiment, processing array 2712 can receive processing tasks to be executed via scheduler 2710, which receives commands defining processing tasks from front end 2708. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 2710 may be configured to fetch indices corresponding to tasks or may receive indices from front end 2708. In at least one embodiment, front end 2708 can be configured to ensure processing array 2712 is configured to a valid state before a workload specified by incoming command buffers batch-buffers, push buffers, etc.) is initiated.

In at least one embodiment, each of one or more instances of parallel processing unit 2702 can couple with parallel processor memory 2722. In at least one embodiment, parallel processor memory 2722 can be accessed via memory crossbar 2716, which can receive memory requests from processing array 2712 as well as I/O unit 2704. In at least one embodiment, memory crossbar 2716 can access parallel processor memory 2722 via a memory interface 2718. In at least one embodiment, memory interface 2718 can include multiple partition units (e.g., a partition unit 2720A, partition unit 2720B, through partition unit 2720N) that can each couple to a portion (e.g., memory unit) of parallel processor memory 2722. In at least one embodiment, a number of partition units 2720A-2720N is configured to be equal to a number of memory units, such that a first partition unit 2720A has a corresponding first memory unit 2724A, a second partition unit 2720B has a corresponding memory unit 2724B, and an Nth partition unit 2720N has a corresponding Nth memory unit 2724N. In at least one embodiment, a number of partition units 2720A-2720N may not be equal to a number of memory devices.

In at least one embodiment, memory units 2724A-2724N can include various types of memory devices, including DRAM or graphics random access memory, such as SGRAM, including GDDR memory. In at least one embodiment, memory units 2724A-2724N may also include 3D stacked memory, including but not limited to high bandwidth memory ("HBM"). In at least one embodiment, render targets, such as frame buffers or texture maps may be stored across memory units 2724A-2724N, allowing partition units 2720A-2720N to write portions of each render target in parallel to efficiently use available bandwidth of parallel processor memory 2722. In at least one embodiment, a local instance of parallel processor memory 2722 may be excluded in favor of a unified memory design that utilizes system memory in conjunction with local cache memory.

In at least one embodiment, any one of clusters 2714A-2714N of processing array 2712 can process data that will be written to any of memory units 2724A-2724N within parallel processor memory 2722. In at least one embodiment, memory crossbar 2716 can be configured to transfer an output of each cluster 2714A-2714N to any partition unit 2720A-2720N or to another cluster 2714A-2714N, which can perform additional processing operations on an output. In at least one embodiment, each cluster 2714A-2714N can communicate with memory interface 2718 through memory crossbar 2716 to read from or write to various external memory devices. In at least one embodiment, memory crossbar 2716 has a connection to memory interface 2718 to communicate with I/O unit 2704, as well as a connection to a local instance of parallel processor memory 2722, enabling processing units within different clusters 2714A-2714N to communicate with system memory or other memory that is not local to parallel processing unit 2702. In at least one embodiment, memory crossbar 2716 can use virtual channels to separate traffic streams between clusters 2714A-2714N and partition units 2720A-2720N.

In at least one embodiment, multiple instances of parallel processing unit 2702 can be provided on a single add-in card, or multiple add-in cards can be interconnected. In at least one embodiment, different instances of parallel processing unit 2702 can be configured to inter-operate even if different instances have different numbers of processing cores, different amounts of local parallel processor memory, and/or other configuration differences. For example, in at least one embodiment, some instances of parallel processing unit 2702 can include higher precision floating point units relative to other instances. In at least one embodiment, systems incorporating one or more instances of parallel processing unit 2702 or parallel processor 2700 can be implemented in a variety of configurations and form factors, including but not limited to desktop, laptop, or handheld personal computers, servers, workstations, game consoles, and/or embedded systems.

Figure 27B:
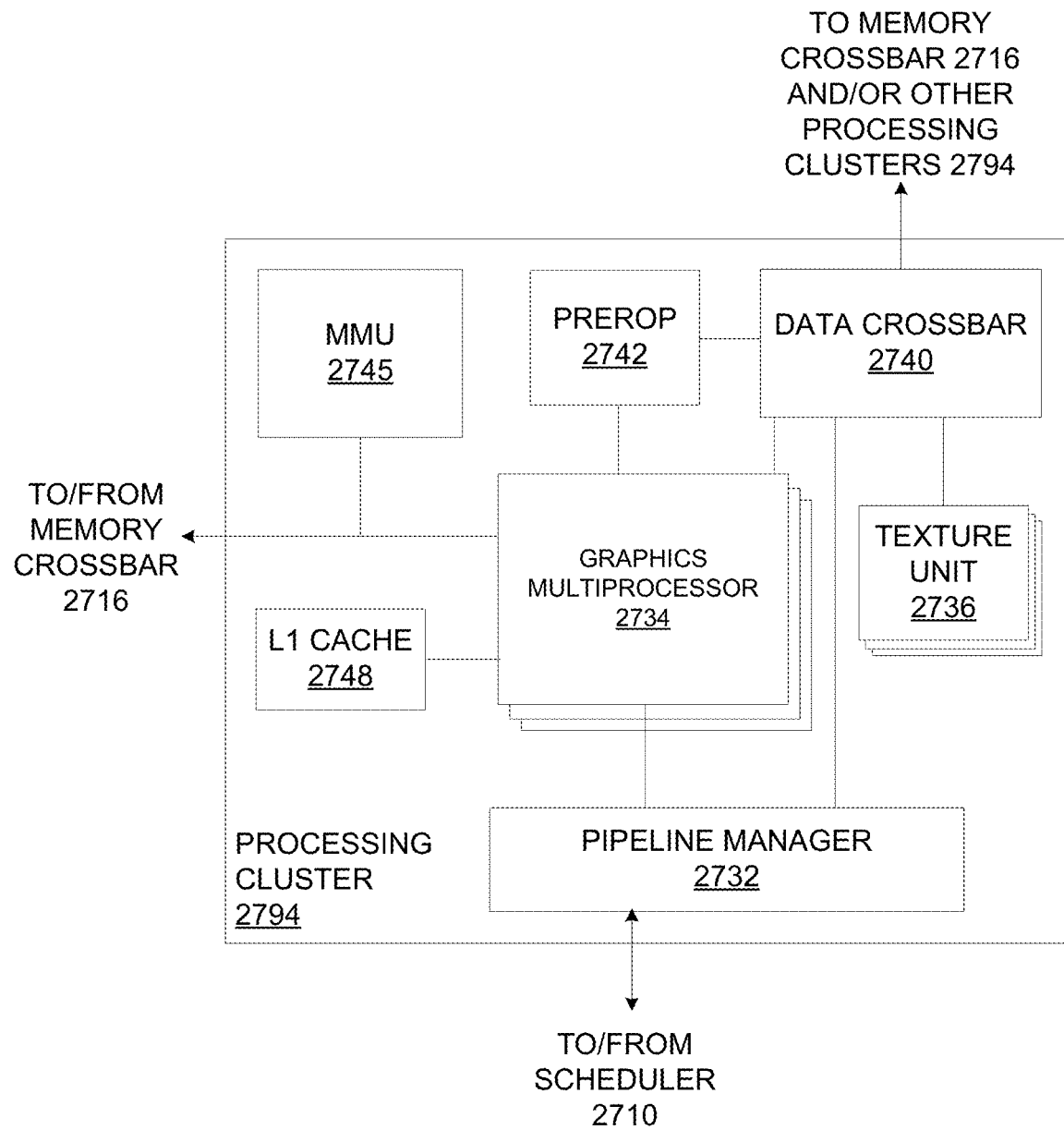
FIG. 27B illustrates a processing cluster, in accordance with at least one embodiment.

FIG. 27B illustrates a processing cluster 2794, in accordance with at least one embodiment. In at least one embodiment, processing cluster 2794 is included within a parallel processing unit. In at least one embodiment, processing cluster 2794 is one of processing clusters 2714A-2714N of FIG. 27. In at least one embodiment, processing cluster 2794 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 2794.

In at least one embodiment, operation of processing cluster 2794 can be controlled via a pipeline manager 2732 that distributes processing tasks to SIMT parallel processors. In at least one embodiment, pipeline manager 2732 receives instructions from scheduler 2710 of FIG. 27 and manages execution of those instructions via a graphics multiprocessor 2734 and/or a texture unit 2736. In at least one embodiment, graphics multiprocessor 2734 is an exemplary instance of a SIMT parallel processor. However, in at least one embodiment, various types of SIMT parallel processors of differing architectures may be included within processing cluster 2794. In at least one embodiment, one or more instances of graphics multiprocessor 2734 can be included within processing cluster 2794. In at least one embodiment, graphics multiprocessor 2734 can process data and a data crossbar 2740 can be used to distribute processed data to one of multiple possible destinations, including other shader units. In at least one embodiment, pipeline manager 2732 can facilitate distribution of processed data by specifying destinations for processed data to be distributed via data crossbar 2740.

In at least one embodiment, each graphics multiprocessor 2734 within processing cluster 2794 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2794 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 2734. In at least one embodiment, a thread group may include fewer threads than a number of processing engines within graphics multiprocessor 2734. In at least one embodiment, when a thread group includes fewer threads than a number of processing engines, one or more of the processing engines may be idle during cycles in which that thread group is being processed. In at least one embodiment, a thread group may also include more threads than a number of processing engines within graphics multiprocessor 2734. In at least one embodiment, when a thread group includes more threads than the number of processing engines within graphics multiprocessor 2734, processing can be performed over consecutive clock cycles. In at least one embodiment, multiple thread groups can be executed concurrently on graphics multiprocessor 2734.

In at least one embodiment, graphics multiprocessor 2734 includes an internal cache memory to perform load and store operations. In at least one embodiment, graphics multiprocessor 2734 can forego an internal cache and use a cache memory L1 cache 2748) within processing cluster 2794. In at least one embodiment, each graphics multiprocessor 2734 also has access to Level 2 ("L2") caches within partition units (e.g., partition units 2720A-2720N of FIG. 27A) that are shared among all processing clusters 2794 and may be used to transfer data between threads. In at least one embodiment, graphics multiprocessor 2734 may also access off-chip global memory, which can include one or more of local parallel processor memory and/or system memory. In at least one embodiment, any memory external to parallel processing unit 2702 may be used as global memory. In at least one embodiment, processing cluster 2794 includes multiple instances of graphics multiprocessor 2734 that can share common instructions and data, which may be stored in L1 cache 2748.

In at least one embodiment, each processing cluster 2794 may include an MMU 2745 that is configured to map virtual addresses into physical addresses. In at least one embodiment, one or more instances of MMU 2745 may reside within memory interface 2718 of FIG. 27. In at least one embodiment, MMU 2745 includes a set of page table entries ("PTEs") used to map a virtual address to a physical address of a tile and optionally a cache line index. In at least one embodiment, MMU 2745 may include address translation lookaside buffers ("TLBs") or caches that may reside within graphics multiprocessor 2734 or L1 cache 2748 or processing cluster 2794. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 2794 may be configured such that each graphics multiprocessor 2734 is coupled to a texture unit 2736 for performing texture mapping operations, e.g., determining texture sample positions, reading texture data, and filtering texture data. In at least one embodiment, texture data is read from an internal texture L1 cache (not shown) or from an L1 cache within graphics multiprocessor 2734 and is fetched from an L2 cache, local parallel processor memory, or system memory, as needed. In at least one embodiment, each graphics multiprocessor 2734 outputs a processed task to data crossbar 2740 to provide the processed task to another processing cluster 2794 for further processing or to store the processed task in an L2 cache, a local parallel processor memory, or a system memory via memory crossbar 2716. In at least one embodiment, a pre-raster operations unit ("preROP") 2742 is configured to receive data from graphics multiprocessor 2734, direct data to ROP units, which may be located with partition units as described herein (e.g., partition units 2720A-2720N of FIG. 27). In at least one embodiment, PreROP 2742 can perform optimizations for color blending, organize pixel color data, and perform address translations.

Figure 27C:
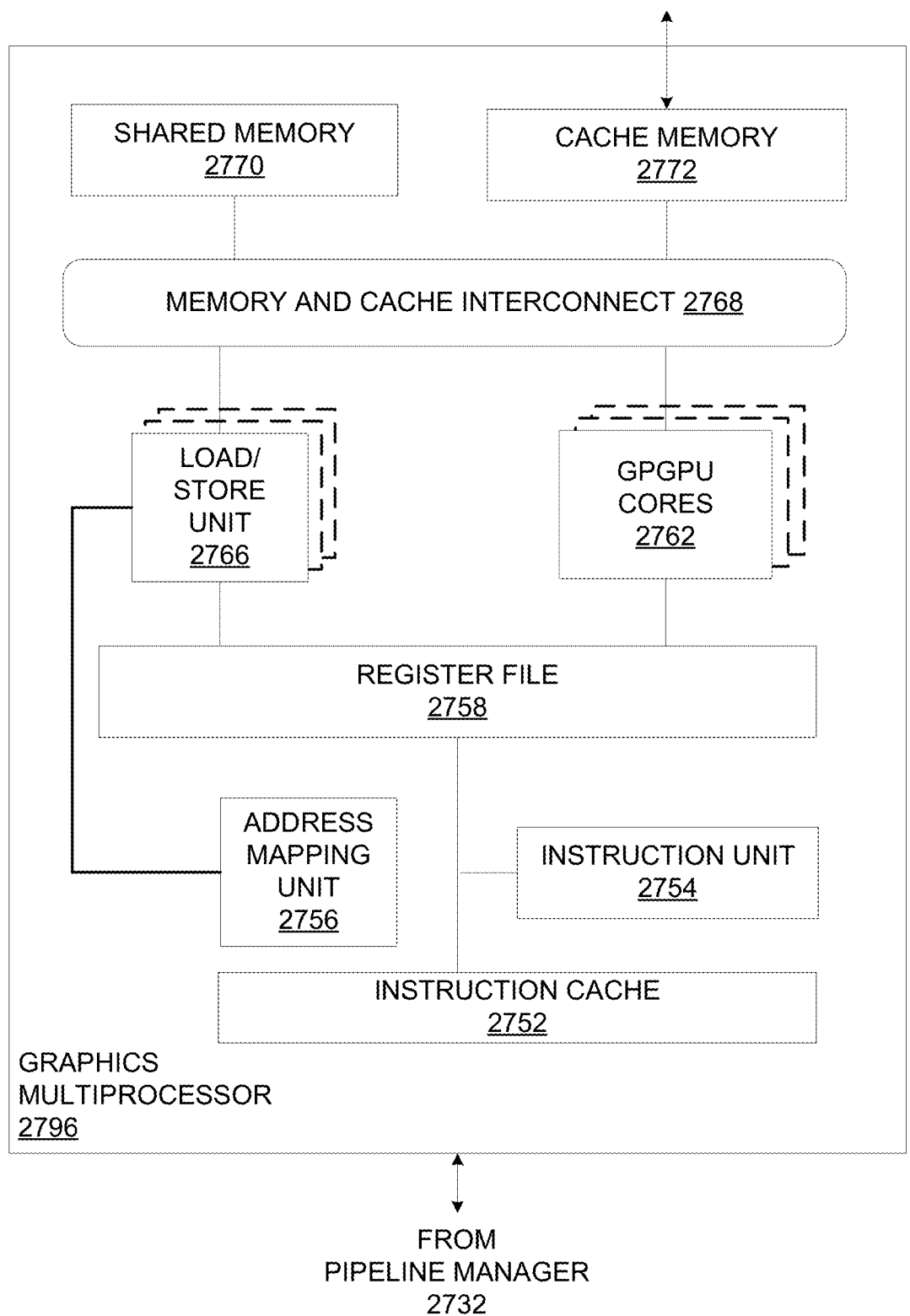
FIG. 27C illustrates a graphics multiprocessor, in accordance with at least one embodiment.

FIG. 27C illustrates a graphics multiprocessor 2796, in accordance with at least one embodiment. In at least one embodiment, graphics multiprocessor 2796 is graphics multiprocessor 2734 of FIG. 27B. In at least one embodiment, graphics multiprocessor 2796 couples with pipeline manager 2732 of processing cluster 2794. In at least one embodiment, graphics multiprocessor 2796 has an execution pipeline including but not limited to an instruction cache 2752, an instruction unit 2754, an address mapping unit 2756, a register file 2758, one or more GPGPU cores 2762, and one or more LSUs 2766. GPGPU cores 2762 and LSUs 2766 are coupled with cache memory 2772 and shared memory 2770 via a memory and cache interconnect 2768.

In at least one embodiment, instruction cache 2752 receives a stream of instructions to execute from pipeline manager 2732. In at least one embodiment, instructions are cached in instruction cache 2752 and dispatched for execution by instruction unit 2754. In at least one embodiment, instruction unit 2754 can dispatch instructions as thread groups (e.g., warps), with each thread of a thread group assigned to a different execution unit within GPGPU core 2762. In at least one embodiment, an instruction can access any of a local, shared, or global address space by specifying an address within a unified address space. In at least one embodiment, address mapping unit 2756 can be used to translate addresses in a unified address space into a distinct memory address that can be accessed by LSUs 2766.

In at least one embodiment, register file 2758 provides a set of registers for functional units of graphics multiprocessor 2796. In at least one embodiment, register file 2758 provides temporary storage for operands connected to data paths of functional units (e.g., GPGPU cores 2762, LSUs 2766) of graphics multiprocessor 2796. In at least one embodiment, register file 2758 is divided between each of functional units such that each functional unit is allocated a dedicated portion of register file 2758. In at least one embodiment, register file 2758 is divided between different thread groups being executed by graphics multiprocessor 2796.

In at least one embodiment, GPGPU cores 2762 can each include FPUs and/or integer ALUs that are used to execute instructions of graphics multiprocessor 2796. GPGPU cores 2762 can be similar in architecture or can differ in architecture. In at least one embodiment, a first portion of GPGPU cores 2762 include a single precision FPU and an integer ALU while a second portion of GPGPU cores 2762 include a double precision FPU. In at least one embodiment, FPUs can implement IEEE 754-2008 standard for floating point arithmetic or enable variable precision floating point arithmetic. In at least one embodiment, graphics multiprocessor 2796 can additionally include one or more fixed function or special function units to perform specific functions such as copy rectangle or pixel blending operations. In at least one embodiment one or more of GPGPU cores 2762 can also include fixed or special function logic.

In at least one embodiment, GPGPU cores 2762 include SIMD logic capable of performing a single instruction on multiple sets of data. In at least one embodiment GPGPU cores 2762 can physically execute SIMD4, SIMD8, and SIMD16 instructions and logically execute SIMD1, SIMD2, and SIMD32 instructions. In at least one embodiment, SIMD instructions for GPGPU cores 2762 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 2768 is an interconnect network that connects each functional unit of graphics multiprocessor 2796 to register file 2758 and to shared memory 2770. In at least one embodiment, memory and cache interconnect 2768 is a crossbar interconnect that allows LSU 2766 to implement load and store operations between shared memory 2770 and register file 2758. In at least one embodiment, register file 2758 can operate at a same frequency as GPGPU cores 2762, thus data transfer between GPGPU cores 2762 and register file 2758 is very low latency. In at least one embodiment, shared memory 2770 can be used to enable communication between threads that execute on functional units within graphics multiprocessor 2796. In at least one embodiment, cache memory 2772 can be used as a data cache for example, to cache texture data communicated between functional units and texture unit 2736. In at least one embodiment, shared memory 2770 can also be used as a program managed cached. In at least one embodiment, threads executing on GPGPU cores 2762 can programmatically store data within shared memory in addition to automatically cached data that is stored within cache memory 2772.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on the same package or chip as cores and communicatively coupled to cores over a processor bus/interconnect that is internal to a package or a chip. In at least one embodiment, regardless of the manner in which a GPU is connected, processor cores may allocate work to the GPU in the form of sequences of commands/instructions contained in a WD. In at least one embodiment, the GPU then uses dedicated circuitry/logic for efficiently processing these commands/instructions.

Figure 28:
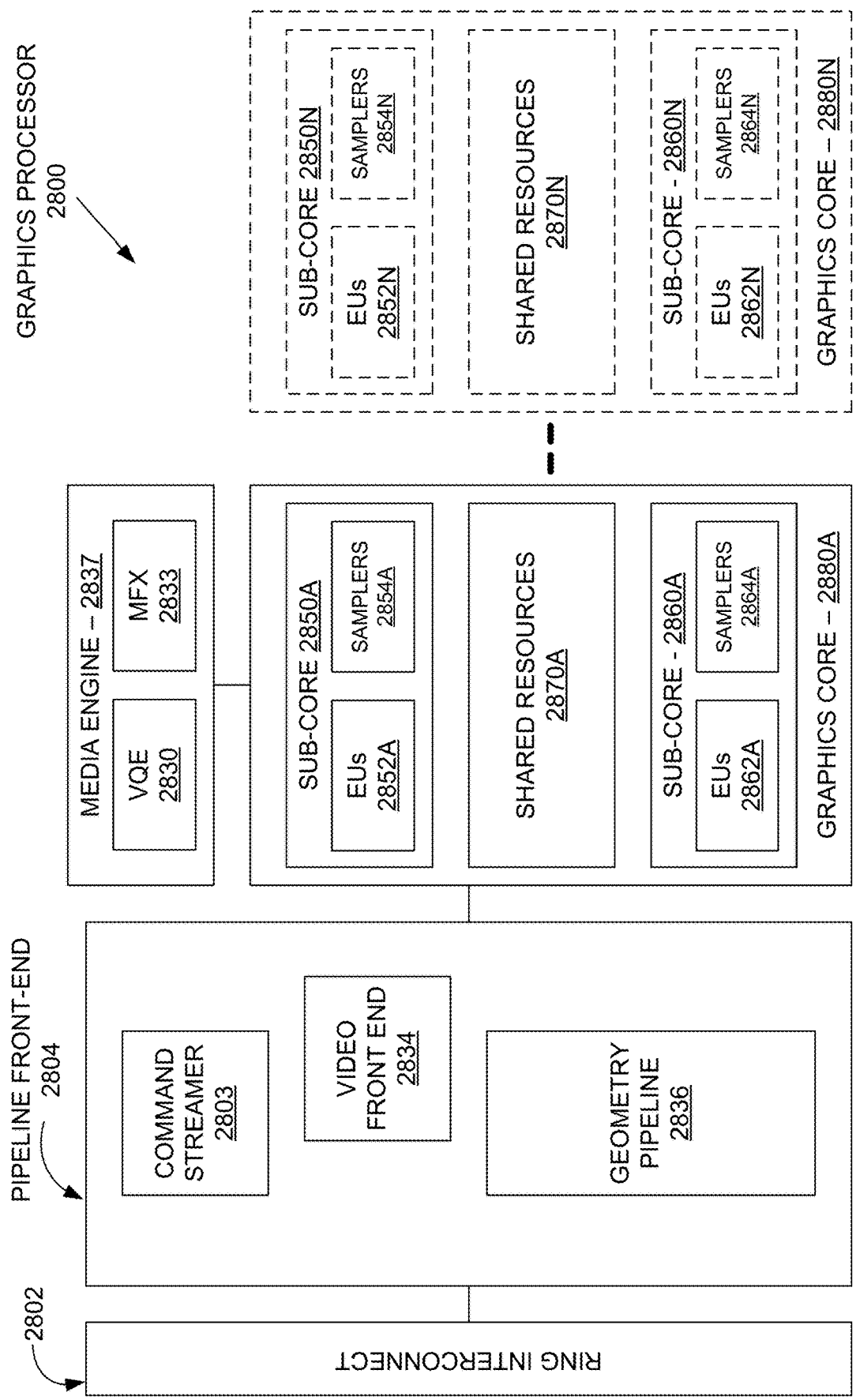
FIG. 28 illustrates a graphics processor, in accordance with at least one embodiment.

FIG. 28 illustrates a graphics processor 2800, in accordance with at least one embodiment. In at least one embodiment, graphics processor 2800 includes a ring interconnect 2802, a pipeline front-end 2804, a media engine 2837, and graphics cores 2880A-2880N. In at least one embodiment, ring interconnect 2802 couples graphics processor 2800 to other processing units, including other graphics processors or one or more general-purpose processor cores. In at least one embodiment, graphics processor 2800 is one of many processors integrated within a multi-core processing system.

In at least one embodiment, graphics processor 2800 receives batches of commands via ring interconnect 2802. In at least one embodiment, incoming commands are interpreted by a command streamer 2803 in pipeline front-end 2804. In at least one embodiment, graphics processor 2800 includes scalable execution logic to perform 3D geometry processing and media processing via graphics core(s) 2880A-2880N. In at least one embodiment, for 3D geometry processing commands, command streamer 2803 supplies commands to geometry pipeline 2836. In at least one embodiment, for at least some media processing commands, command streamer 2803 supplies commands to a video front end 2834, which couples with a media engine 2837. In at least one embodiment, media engine 2837 includes a Video Quality Engine ("VQE") 2830 for video and image post-processing and a multi-format encode/decode ("MFX") engine 2833 to provide hardware-accelerated media data encode and decode. In at least one embodiment, geometry pipeline 2836 and media engine 2837 each generate execution threads for thread execution resources provided by at least one graphics core 2880A.

In at least one embodiment, graphics processor 2800 includes scalable thread execution resources featuring modular graphics cores 2880A-2880N (sometimes referred to as core slices), each having multiple sub-cores 2850A-2850N, 2860A-2860N (sometimes referred to as core sub-slices). In at least one embodiment, graphics processor 2800 can have any number of graphics cores 2880A through 2880N. In at least one embodiment, graphics processor 2800 includes a graphics core 2880A having at least a first sub-core 2850A and a second sub-core 2860A. In at least one embodiment, graphics processor 2800 is a low power processor with a single sub-core (e.g., sub-core 2850A). In at least one embodiment, graphics processor 2800 includes multiple graphics cores 2880A-2880N, each including a set of first sub-cores 2850A-2850N and a set of second sub-cores 2860A-2860N. In at least one embodiment, each sub-core in first sub-cores 2850A-2850N includes at least a first set of execution units ("EUs") 2852A-2852N and media/texture samplers 2854A-2854N. In at least one embodiment, each sub-core in second sub-cores 2860A-2860N includes at least a second set of execution units 2862A-2862N and samplers 2864A-2864N. In at least one embodiment, each sub-core 2850A-2850N, 2860A-2860N shares a set of shared resources 2870A-2870N. In at least one embodiment, shared resources 2870 include shared cache memory and pixel operation logic.

Figure 29:
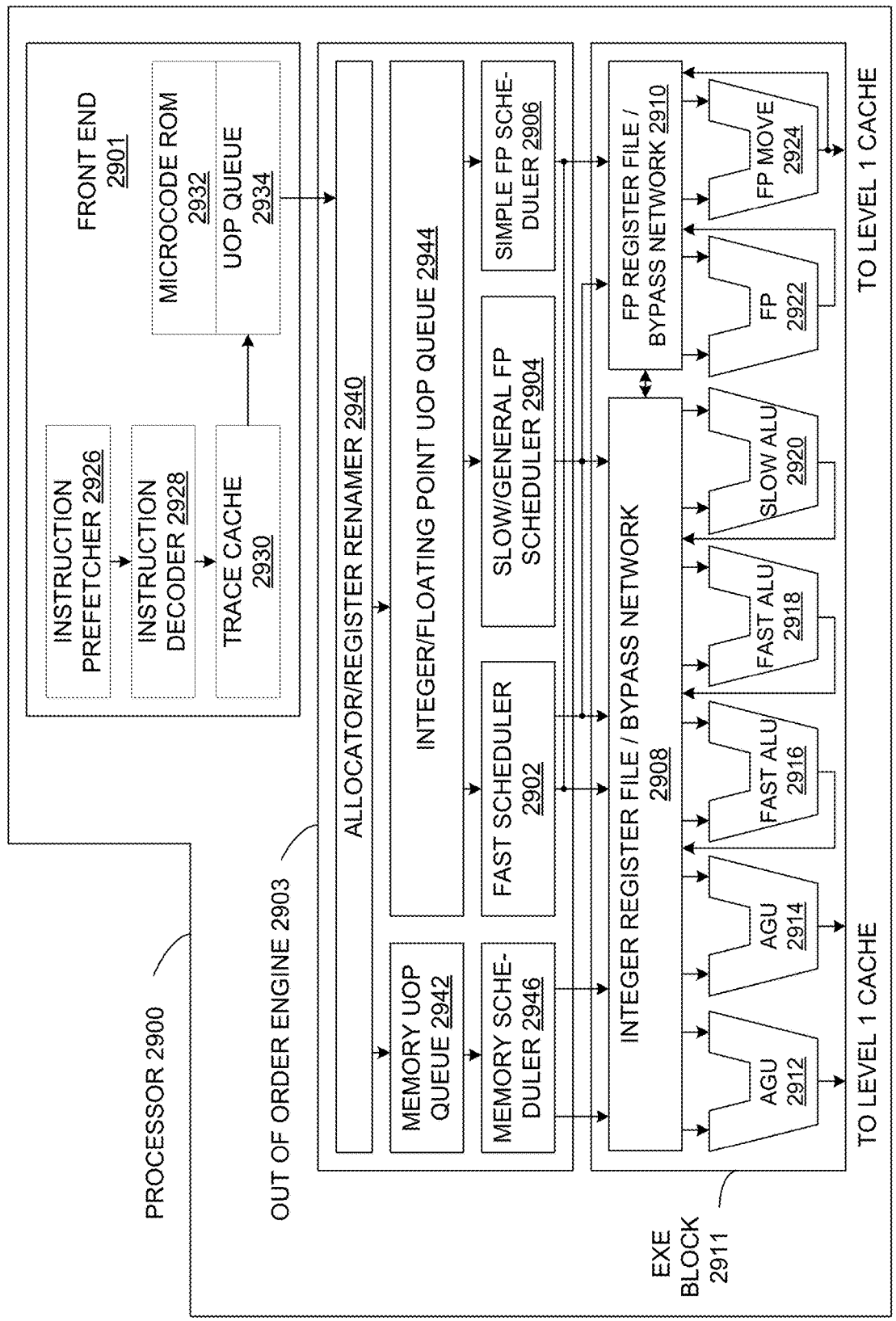
FIG. 29 illustrates a processor, in accordance with at least one embodiment.

FIG. 29 illustrates a processor 2900, in accordance with at least one embodiment. In at least one embodiment, processor 2900 may include, without limitation, logic circuits to perform instructions. In at least one embodiment, processor 2900 may perform instructions, including x86 instructions, ARM instructions, specialized instructions for ASICs, etc. In at least one embodiment, processor 2910 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany SIMD and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 2910 may perform instructions to accelerate CUDA programs.

In at least one embodiment, processor 2900 includes an in-order front end ("front end") 2901 to fetch instructions to be executed and prepare instructions to be used later in processor pipeline. In at least one embodiment, front end 2901 may include several units. In at least one embodiment, an instruction prefetcher 2926 fetches instructions from memory and feeds instructions to an instruction decoder 2928 which in turn decodes or interprets instructions. For example, in at least one embodiment, instruction decoder 2928 decodes a received instruction into one or more operations called "micro-instructions" or "micro-operations" (also called "micro ops" or "uops") for execution. In at least one embodiment, instruction decoder 2928 parses instruction into an opcode and corresponding data and control fields that may be used by micro-architecture to perform operations. In at least one embodiment, a trace cache 2930 may assemble decoded uops into program ordered sequences or traces in a uop queue 2934 for execution. In at least one embodiment, when trace cache 2930 encounters a complex instruction, a microcode ROM 2932 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 2928 may access microcode ROM 2932 to perform instruction. In at least one embodiment, an instruction may be decoded into a small number of micro-ops for processing at instruction decoder 2928. In at least one embodiment, an instruction may be stored within microcode ROM 2932 should a number of micro-ops be needed to accomplish operation. In at least one embodiment, trace cache 2930 refers to an entry point programmable logic array ("PLA") to determine a correct micro-instruction pointer for reading microcode sequences to complete one or more instructions from microcode ROM 2932. In at least one embodiment, after microcode ROM 2932 finishes sequencing micro-ops for an instruction, front end 2901 of machine may resume fetching micro-ops from trace cache 2930.

In at least one embodiment, out-of-order execution engine ("out of order engine") 2903 may prepare instructions for execution. In at least one embodiment, out-of-order execution logic has a number of buffers to smooth out and re-order the flow of instructions to optimize performance as they go down a pipeline and get scheduled for execution. Out-of-order execution engine 2903 includes, without limitation, an allocator/register renamer 2940, a memory uop queue 2942, an integer/floating point uop queue 2944, a memory scheduler 2946, a fast scheduler 2902, a slow/general floating point scheduler ("slow/general FP scheduler") 2904, and a simple floating point scheduler ("simple FP scheduler") 2906. In at least one embodiment, fast schedule 2902, slow/general floating point scheduler 2904, and simple floating point scheduler 2906 are also collectively referred to herein as "uop schedulers 2902, 2904, 2906." Allocator/register renamer 2940 allocates machine buffers and resources that each uop needs in order to execute. In at least one embodiment, allocator/register renamer 2940 renames logic registers onto entries in a register file. In at least one embodiment, allocator/register renamer 2940 also allocates an entry for each uop in one of two uop queues, memory uop queue 2942 for memory operations and integer/floating point uop queue 2944 for non-memory operations, in front of memory scheduler 2946 and uop schedulers 2902, 2904, 2906. In at least one embodiment, uop schedulers 2902, 2904, 2906, determine when a uop is ready to execute based on readiness of their dependent input register operand sources and availability of execution resources uops need to complete their operation. In at least one embodiment, fast scheduler 2902 of at least one embodiment may schedule on each half of main clock cycle while slow/general floating point scheduler 2904 and simple floating point scheduler 2906 may schedule once per main processor clock cycle. In at least one embodiment, uop schedulers 2902, 2904, 2906 arbitrate for dispatch ports to schedule uops for execution.

In at least one embodiment, execution block 2911 includes, without limitation, an integer register file/bypass network 2908, a floating point register file/bypass network ("FP register file/bypass network") 2910, address generation units ("AGUs") 2912 and 2914, fast ALUs 2916 and 2918, a slow ALU 2920, a floating point ALU ("FP") 2922, and a floating point move unit ("FP move") 2924. In at least one embodiment, integer register file/bypass network 2908 and floating point register file/bypass network 2910 are also referred to herein as "register files 2908, 2910." In at least one embodiment, AGUSs 2912 and 2914, fast ALUs 2916 and 2918, slow ALU 2920, floating point ALU 2922, and floating point move unit 2924 are also referred to herein as "execution units 2912, 2914, 2916, 2918, 2920, 2922, and 2924." In at least one embodiment, an execution block may include, without limitation, any number (including zero) and type of register files, bypass networks, address generation units, and execution units, in any combination.

In at least one embodiment, register files 2908, 2910 may be arranged between uop schedulers 2902, 2904, 2906, and execution units 2912, 2914, 2916, 2918, 2920, 2922, and 2924. In at least one embodiment, integer register file/bypass network 2908 performs integer operations. In at least one embodiment, floating point register file/bypass network 2910 performs floating point operations. In at least one embodiment, each of register files 2908, 2910 may include, without limitation, a bypass network that may bypass or forward just completed results that have not yet been written into register file to new dependent uops. In at least one embodiment, register files 2908, 2910 may communicate data with each other. In at least one embodiment, integer register file/bypass network 2908 may include, without limitation, two separate register files, one register file for low-order thirty-two bits of data and a second register file for high order thirty-two bits of data. In at least one embodiment, floating point register file/bypass network 2910 may include, without limitation, 128-bit wide entries because floating point instructions typically have operands from 64 to 128 bits in width.

In at least one embodiment, execution units 2912, 2914, 2916, 2918, 2920, 2922, 2924 may execute instructions. In at least one embodiment, register files 2908, 2910 store integer and floating point data operand values that microinstructions need to execute. In at least one embodiment, processor 2900 may include, without limitation, any number and combination of execution units 2912, 2914, 2916, 2918, 2920, 2922, 2924. In at least one embodiment, floating point ALU 2922 and floating point move unit 2924 may execute floating point, MMX, SIMD, AVX and SSE, or other operations. In at least one embodiment, floating point ALU 2922 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 2916, 2918. In at least one embodiment, fast ALUS 2916, 2918 may execute fast operations with an effective latency of half a clock cycle. In at least one embodiment, most complex integer operations go to slow ALU 2920 as slow ALU 2920 may include, without limitation, integer execution hardware for long-latency type of operations, such as a multiplier, shifts, flag logic, and branch processing. In at least one embodiment, memory load/store operations may be executed by AGUs 2912, 2914. In at least one embodiment, fast ALU 2916, fast ALU 2918, and slow ALU 2920 may perform integer operations on 64-bit data operands. In at least one embodiment, fast ALU 2916, fast ALU 2918, and slow ALU 2920 may be implemented to support a variety of data bit sizes including sixteen, thirty-two, 128, 256, etc. In at least one embodiment, floating point ALU 2922 and floating point move unit 2924 may be implemented to support a range of operands having bits of various widths. In at least one embodiment, floating point ALU 2922 and floating point move unit 2924 may operate on 128-bit wide packed data operands in conjunction with SIMD and multimedia instructions.

In at least one embodiment, uop schedulers 2902, 2904, 2906 dispatch dependent operations before parent load has finished executing. In at least one embodiment, as uops may be speculatively scheduled and executed in processor 2900, processor 2900 may also include logic to handle memory misses. In at least one embodiment, if a data load misses in a data cache, there may be dependent operations in flight in pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanisms of at least one embodiment of a processor may also be designed to catch instruction sequences for text string comparison operations.

In at least one embodiment, the term "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Figure 30:
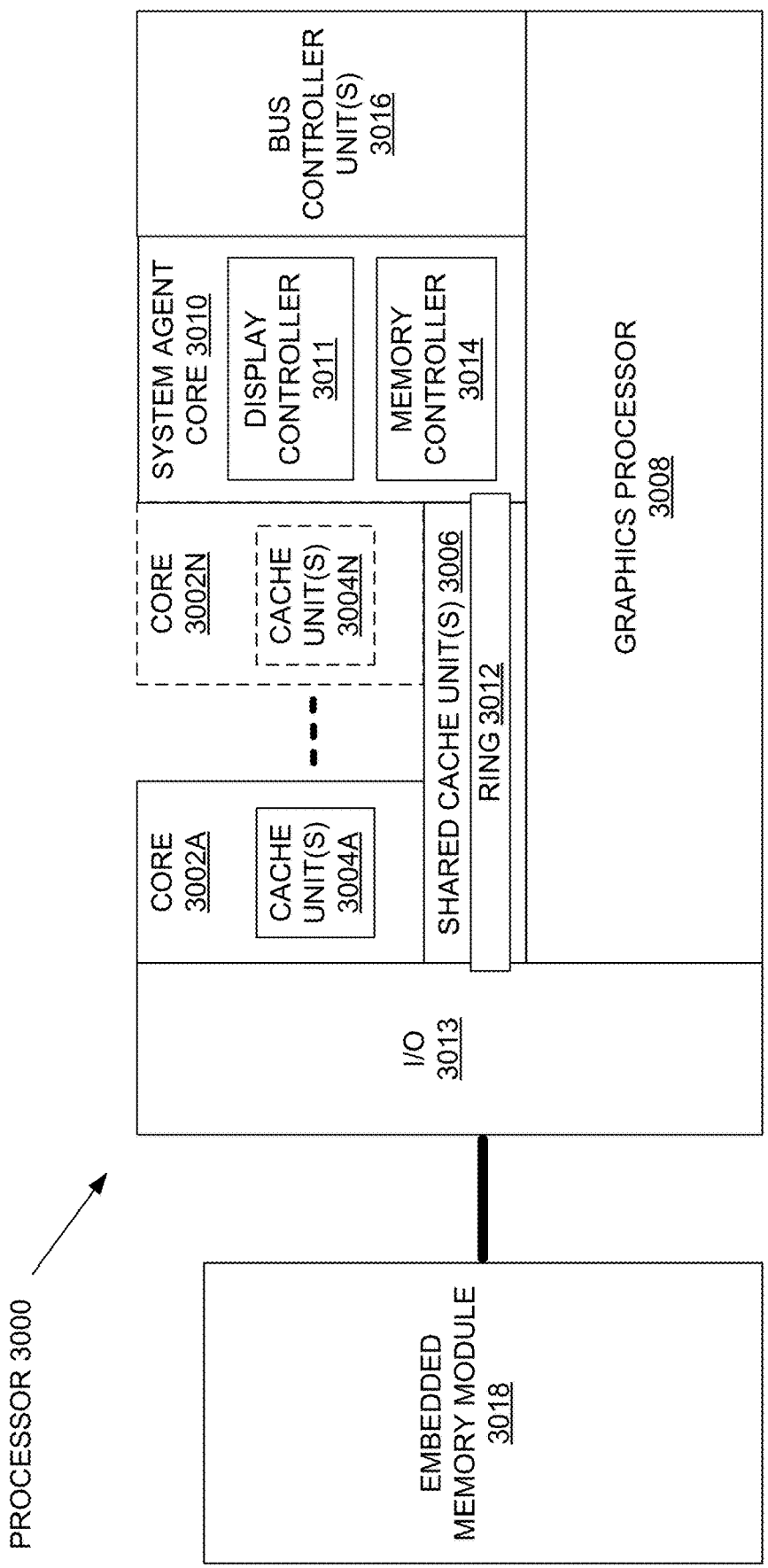
FIG. 30 illustrates a processor, in accordance with at least one embodiment.

FIG. 30 illustrates a processor 3000, in accordance with at least one embodiment. In at least one embodiment, processor 3000 includes, without limitation, one or more processor cores ("cores") 3002A-3002N, an integrated memory controller 3014, and an integrated graphics processor 3008. In at least one embodiment, processor 3000 can include additional cores up to and including additional processor core 3002N represented by dashed lined boxes. In at least one embodiment, each of processor cores 3002A-3002N includes one or more internal cache units 3004A-3004N. In at least one embodiment, each processor core also has access to one or more shared cached units 3006.

In at least one embodiment, internal cache units 3004A-3004N and shared cache units 3006 represent a cache memory hierarchy within processor 3000. In at least one embodiment, cache memory units 3004A-3004N may include at least one level of instruction and data cache within each processor core and one or more levels of shared mid-level cache, such as an L2, L3, Level 4 ("L4"), or other levels of cache, where a highest level of cache before external memory is classified as an LLC. In at least one embodiment, cache coherency logic maintains coherency between various cache units 3006 and 3004A-3004N.

In at least one embodiment, processor 3000 may also include a set of one or more bus controller units 3016 and a system agent core 3010. In at least one embodiment, one or more bus controller units 3016 manage a set of peripheral buses, such as one or more PCI or PCI express buses. In at least one embodiment, system agent core 3010 provides management functionality for various processor components. In at least one embodiment, system agent core 3010 includes one or more integrated memory controllers 3014 to manage access to various external memory devices (not shown).

In at least one embodiment, one or more of processor cores 3002A-3002N include support for simultaneous multi-threading. In at least one embodiment, system agent core 3010 includes components for coordinating and operating processor cores 3002A-3002N during multi-threaded processing. In at least one embodiment, system agent core 3010 may additionally include a power control unit ("PCU"), which includes logic and components to regulate one or more power states of processor cores 3002A-3002N and graphics processor 3008.

In at least one embodiment, processor 3000 additionally includes graphics processor 3008 to execute graphics processing operations. In at least one embodiment, graphics processor 3008 couples with shared cache units 3006, and system agent core 3010, including one or more integrated memory controllers 3014. In at least one embodiment, system agent core 3010 also includes a display controller 3011 to drive graphics processor output to one or more coupled displays. In at least one embodiment, display controller 3011 may also be a separate module coupled with graphics processor 3008 via at least one interconnect, or may be integrated within graphics processor 3008.

In at least one embodiment, a ring based interconnect unit 3012 is used to couple internal components of processor 3000. In at least one embodiment, an alternative interconnect unit may be used, such as a point-to-point interconnect, a switched interconnect, or other techniques. In at least one embodiment, graphics processor 3008 couples with ring interconnect 3012 via an I/O link 3013.

In at least one embodiment, I/O link 3013 represents at least one of multiple varieties of I/O interconnects, including an on package I/O interconnect which facilitates communication between various processor components and a high-performance embedded memory module 3018, such as an eDRAM module. In at least one embodiment, each of processor cores 3002A-3002N and graphics processor 3008 use embedded memory modules 3018 as a shared LLC.

In at least one embodiment, processor cores 3002A-3002N are homogeneous cores executing a common instruction set architecture. In at least one embodiment, processor cores 3002A-3002N are heterogeneous in terms of ISA, where one or more of processor cores 3002A-3002N execute a common instruction set, while one or more other cores of processor cores 3002A-30-02N executes a subset of a common instruction set or a different instruction set. In at least one embodiment, processor cores 3002A-3002N are heterogeneous in terms of microarchitecture, where one or more cores having a relatively higher power consumption couple with one or more cores having a lower power consumption. In at least one embodiment, processor 3000 can be implemented on one or more chips or as an SoC integrated circuit.

Figure 31:
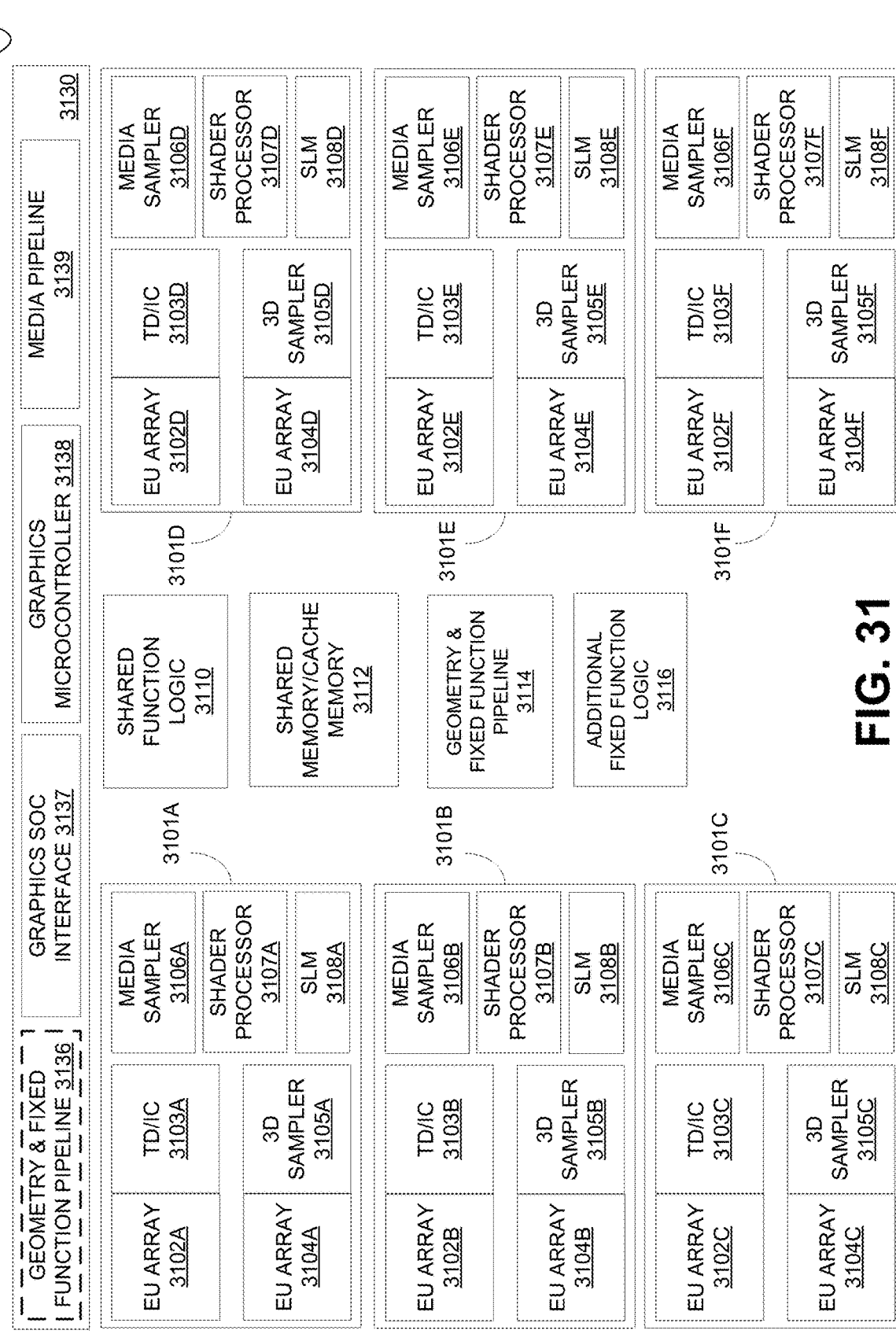
FIG. 31 illustrates a graphics processor core, in accordance with at least one embodiment.

FIG. 31 illustrates a graphics processor core 3100, in accordance with at least one embodiment described. In at least one embodiment, graphics processor core 3100 is included within a graphics core array. In at least one embodiment, graphics processor core 3100, sometimes referred to as a core slice, can be one or multiple graphics cores within a modular graphics processor. In at least one embodiment, graphics processor core 3100 is exemplary of one graphics core slice, and a graphics processor as described herein may include multiple graphics core slices based on target power and performance envelopes. In at least one embodiment, each graphics core 3100 can include a fixed function block 3130 coupled with multiple sub-cores 3101A-3101F, also referred to as sub-slices, that include modular blocks of general-purpose and fixed function logic.

In at least one embodiment, fixed function block 3130 includes a geometry/fixed function pipeline 3136 that can be shared by all sub-cores in graphics processor 3100, for example, in lower performance and/or lower power graphics processor implementations. In at least one embodiment, geometry/fixed function pipeline 3136 includes a 3D fixed function pipeline, a video front-end unit, a thread spawner and thread dispatcher, and a unified return buffer manager, which manages unified return buffers.

In at least one embodiment, fixed function block 3130 also includes a graphics SoC interface 3137, a graphics microcontroller 3138, and a media pipeline 3139. Graphics SoC interface 3137 provides an interface between graphics core 3100 and other processor cores within an SoC integrated circuit. In at least one embodiment, graphics microcontroller 3138 is a programmable sub-processor that is configurable to manage various functions of graphics processor 3100, including thread dispatch, scheduling, and pre-emption. In at least one embodiment, media pipeline 3139 includes logic to facilitate decoding, encoding, pre-processing, and/or post-processing of multimedia data, including image and video data. In at least one embodiment, media pipeline 3139 implements media operations via requests to compute or sampling logic within sub-cores 3101-3101F.

In at least one embodiment, SoC interface 3137 enables graphics core 3100 to communicate with general-purpose application processor cores (e.g., CPUs) and/or other components within an SoC, including memory hierarchy elements such as a shared LLC memory, system RAM, and/or embedded on-chip or on-package DRAM. In at least one embodiment, SoC interface 3137 can also enable communication with fixed function devices within an SoC, such as camera imaging pipelines, and enables use of and/or implements global memory atomics that may be shared between graphics core 3100 and CPUs within an SoC. In at least one embodiment, SoC interface 3137 can also implement power management controls for graphics core 3100 and enable an interface between a clock domain of graphic core 3100 and other clock domains within an SoC. In at least one embodiment, SoC interface 3137 enables receipt of command buffers from a command streamer and global thread dispatcher that are configured to provide commands and instructions to each of one or more graphics cores within a graphics processor. In at least one embodiment, commands and instructions can be dispatched to media pipeline 3139, when media operations are to be performed, or a geometry and fixed function pipeline (e.g., geometry and fixed function pipeline 3136, geometry and fixed function pipeline 3114) when graphics processing operations are to be performed.

In at least one embodiment, graphics microcontroller 3138 can be configured to perform various scheduling and management tasks for graphics core 3100. In at least one embodiment, graphics microcontroller 3138 can perform graphics and/or compute workload scheduling on various graphics parallel engines within execution unit (EU) arrays 3102A-3102F, 3104A-3104F within sub-cores 3101A-3101F. In at least one embodiment, host software executing on a CPU core of an SoC including graphics core 3100 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 3138 can also facilitate low-power or idle states for graphics core 3100, providing graphics core 3100 with an ability to save and restore registers within graphics core 3100 across low-power state transitions independently from an operating system and/or graphics driver software on a system.

In at least one embodiment, graphics core 3100 may have greater than or fewer than illustrated sub-cores 3101A-3101F, up to N modular sub-cores. For each set of N sub-cores, in at least one embodiment, graphics core 3100 can also include shared function logic 3110, shared and/or cache memory 3112, a geometry/fixed function pipeline 3114, as well as additional fixed function logic 3116 to accelerate various graphics and compute processing operations. In at least one embodiment, shared function logic 3110 can include logic units (e.g., sampler, math, and/or inter-thread communication logic) that can be shared by each N sub-cores within graphics core 3100. Shared and/or cache memory 3112 can be an LLC for N sub-cores 3101A-3101F within graphics core 3100 and can also serve as shared memory that is accessible by multiple sub-cores. In at least one embodiment, geometry/fixed function pipeline 3114 can be included instead of geometry/fixed function pipeline 3136 within fixed function block 3130 and can include same or similar logic units.

In at least one embodiment, graphics core 3100 includes additional fixed function logic 3116 that can include various fixed function acceleration logic for use by graphics core 3100. In at least one embodiment, additional fixed function logic 3116 includes an additional geometry pipeline for use in position only shading. In position-only shading, at least two geometry pipelines exist, whereas in a full geometry pipeline within geometry/fixed function pipeline 3116, 3136, and a cull pipeline, which is an additional geometry pipeline which may be included within additional fixed function logic 3116. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 3116 can execute position shaders in parallel with a main application and generally generates critical results faster than a full pipeline, as a cull pipeline fetches and shades position attribute of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 3116 can also include general purpose processing acceleration logic, such as fixed function matrix multiplication logic, for accelerating CUDA programs.

In at least one embodiment, each graphics sub-core 3101A-3101F includes a set of execution resources that may be used to perform graphics, media, and compute operations in response to requests by graphics pipeline, media pipeline, or shader programs. In at least one embodiment, graphics sub-cores 3101A-3101F include multiple EU arrays 3102A-3102F, 3104A-3104F, thread dispatch and inter-thread communication ("TD/IC") logic 3103A-3103F, a 3D (e.g., texture) sampler 3105A-3105F, a media sampler 3106A-3106F, a shader processor 3107A-3107F, and shared local memory ("SLM") 3108A-3108F. EU arrays 3102A-3102F, 3104A-3104F each include multiple execution units, which are GPGPUs capable of performing floating-point and integer/fixed-point logic operations in service of a graphics, media, or compute operation, including graphics, media, or compute shader programs. In at least one embodiment, TD/IC logic 3103A-3103F performs local thread dispatch and thread control operations for execution units within a sub-core and facilitate communication between threads executing on execution units of a sub-core. In at least one embodiment, 3D sampler 3105A-3105F can read texture or other 3D graphics related data into memory. In at least one embodiment, 3D sampler can read texture data differently based on a configured sample state and texture format associated with a given texture. In at least one embodiment, media sampler 3106A-3106F can perform similar read operations based on a type and format associated with media data. In at least one embodiment, each graphics sub-core 3101A-3101F can alternately include a unified 3D and media sampler. In at least one embodiment, threads executing on execution units within each of sub-cores 3101A-3101F can make use of shared local memory 3108A-3108F within each sub-core, to enable threads executing within a thread group to execute using a common pool of on-chip memory.

Figure 32:
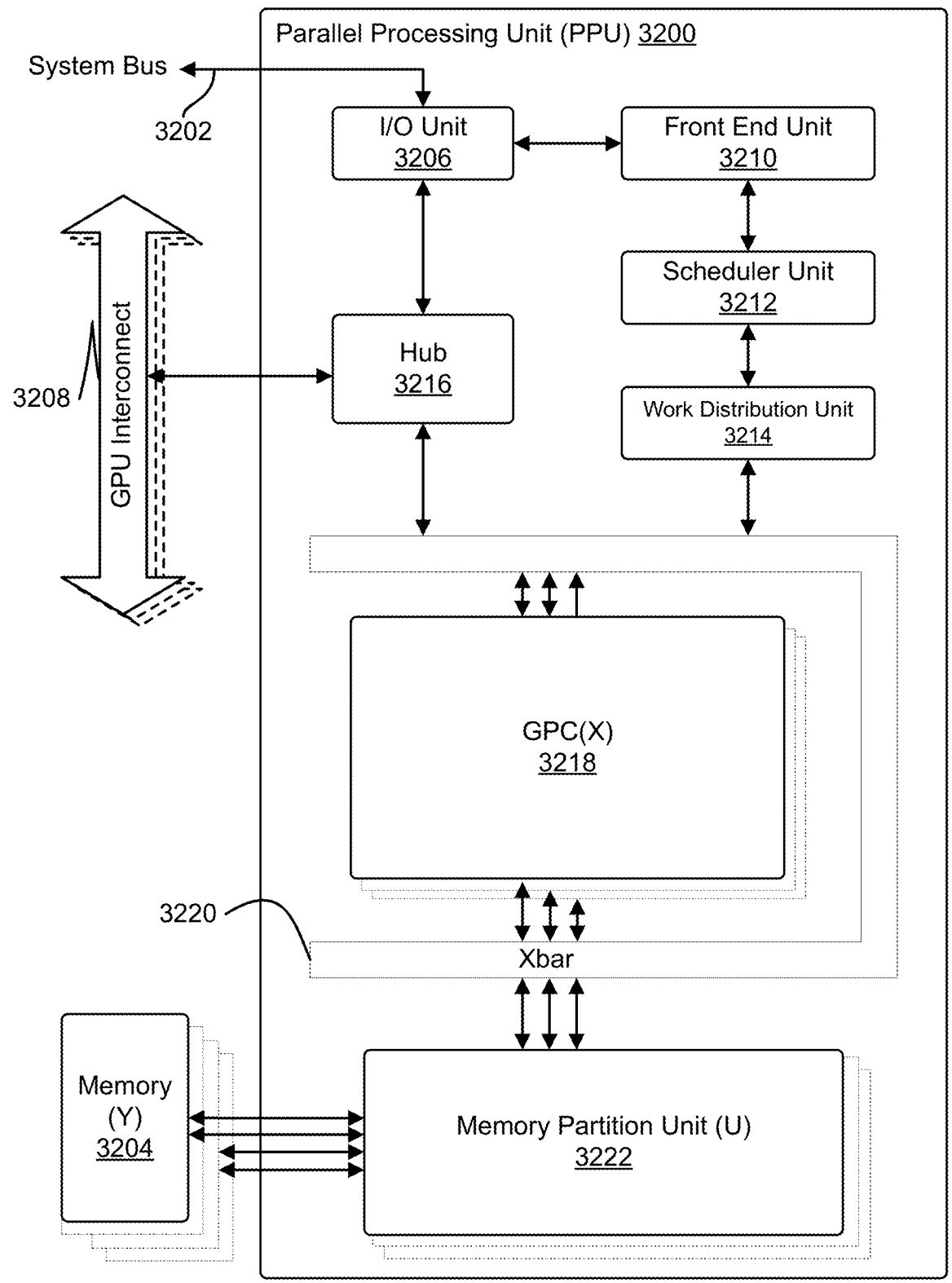
FIG. 32 illustrates a PPU, in accordance with at least one embodiment.

FIG. 32 illustrates a parallel processing unit ("PPU") 3200, in accordance with at least one embodiment. In at least one embodiment, PPU 3200 is configured with machine-readable code that, if executed by PPU 3200, causes PPU 3200 to perform some or all of processes and techniques described herein. In at least one embodiment, PPU 3200 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 3200. In at least one embodiment, PPU 3200 is a GPU configured to implement a graphics rendering pipeline for processing three-dimensional ("3D") graphics data in order to generate two-dimensional ("2D") image data for display on a display device such as an LCD device. In at least one embodiment, PPU 3200 is utilized to perform computations such as linear algebra operations and machine-learning operations. FIG. 32 illustrates an example parallel processor for illustrative purposes only and should be construed as a non-limiting example of a processor architecture that may be implemented in at least one embodiment.

In at least one embodiment, one or more PPUs 3200 are configured to accelerate High Performance Computing ("HPC"), data center, and machine learning applications. In at least one embodiment, one or more PPUs 3200 are configured to accelerate CUDA programs. In at least one embodiment, PPU 3200 includes, without limitation, an I/O unit 3206, a front-end unit 3210, a scheduler unit 3212, a work distribution unit 3214, a hub 3216, a crossbar ("Xbar") 3220, one or more general processing clusters ("GPCs") 3218, and one or more partition units ("memory partition units") 3222. In at least one embodiment, PPU 3200 is connected to a host processor or other PPUs 3200 via one or more high-speed GPU interconnects ("GPU interconnects") 3208. In at least one embodiment, PPU 3200 is connected to a host processor or other peripheral devices via a system bus or interconnect 3202. In at least one embodiment, PPU 3200 is connected to a local memory comprising one or more memory devices ("memory") 3204. In at least one embodiment, memory devices 3204 include, without limitation, one or more dynamic random access memory (DRAM) devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 3208 may refer to a wire-based multi-lane communications link that is used by systems to scale and include one or more PPUs 3200 combined with one or more CPUs, supports cache coherence between PPUs 3200 and CPUs, and CPU mastering. In at least one embodiment, data and/or commands are transmitted by high-speed GPU interconnect 3208 through hub 3216 to/from other units of PPU 3200 such as one or more copy engines, video encoders, video decoders, power management units, and other components which may not be explicitly illustrated in FIG. 32.

In at least one embodiment, I/O unit 3206 is configured to transmit and receive communications (e.g., commands, data) from a host processor (not illustrated in FIG. 32) over system bus 3202. In at least one embodiment, I/O unit 3206 communicates with host processor directly via system bus 3202 or through one or more intermediate devices such as a memory bridge. In at least one embodiment, I/O unit 3206 may communicate with one or more other processors, such as one or more of PPUs 3200 via system bus 3202. In at least one embodiment, I/O unit 3206 implements a PCIe interface for communications over a PCIe bus. In at least one embodiment, I/O unit 3206 implements interfaces for communicating with external devices.

In at least one embodiment, I/O unit 3206 decodes packets received via system bus 3202. In at least one embodiment, at least some packets represent commands configured to cause PPU 3200 to perform various operations. In at least one embodiment, I/O unit 3206 transmits decoded commands to various other units of PPU 3200 as specified by commands. In at least one embodiment, commands are transmitted to front-end unit 3210 and/or transmitted to hub 3216 or other units of PPU 3200 such as one or more copy engines, a video encoder, a video decoder, a power management unit, etc. (not explicitly illustrated in FIG. 32). In at least one embodiment, I/O unit 3206 is configured to route communications between and among various logical units of PPU 3200.

In at least one embodiment, a program executed by host processor encodes a command stream in a buffer that provides workloads to PPU 3200 for processing. In at least one embodiment, a workload comprises instructions and data to be processed by those instructions. In at least one embodiment, buffer is a region in a memory that is accessible read/write) by both a host processor and PPU 3200—a host interface unit may be configured to access buffer in a system memory connected to system bus 3202 via memory requests transmitted over system bus 3202 by I/O unit 3206. In at least one embodiment, a host processor writes a command stream to a buffer and then transmits a pointer to the start of the command stream to PPU 3200 such that front-end unit 3210 receives pointers to one or more command streams and manages one or more command streams, reading commands from command streams and forwarding commands to various units of PPU 3200.

In at least one embodiment, front-end unit 3210 is coupled to scheduler unit 3212 that configure s various GPCs 3218 to process tasks defined by one or more command streams. In at least one embodiment, scheduler unit 3212 is configured to track state information related to various tasks managed by scheduler unit 3212 where state information may indicate which of GPCs 3218 a task is assigned to, whether task is active or inactive, a priority level associated with task, and so forth. In at least one embodiment, scheduler unit 3212 manages execution of a plurality of tasks on one or more of GPCs 3218.

In at least one embodiment, scheduler unit 3212 is coupled to work distribution unit 3214 that is configured to dispatch tasks for execution on GPCs 3218. In at least one embodiment, work distribution unit 3214 tracks a number of scheduled tasks received from scheduler unit 3212 and work distribution unit 3214 manages a pending task pool and an active task pool for each of GPCs 3218. In at least one embodiment, pending task pool comprises a number of slots (e.g., 32 slots) that contain tasks assigned to be processed by a particular GPC 3218; active task pool may comprise a number of slots (e.g., 4 slots) for tasks that are actively being processed by GPCs 3218 such that as one of GPCs 3218 completes execution of a task, that task is evicted from active task pool for GPC 3218 and one of other tasks from pending task pool is selected and scheduled for execution on GPC 3218. In at least one embodiment, if an active task is idle on GPC 3218, such as while waiting for a data dependency to be resolved, then the active task is evicted from GPC 3218 and returned to a pending task pool while another task in the pending task pool is selected and scheduled for execution on GPC 3218.

In at least one embodiment, work distribution unit 3214 communicates with one or more GPCs 3218 via XBar 3220. In at least one embodiment, XBar 3220 is an interconnect network that couples many units of PPU 3200 to other units of PPU 3200 and can be configured to couple work distribution unit 3214 to a particular GPC 3218. In at least one embodiment, one or more other units of PPU 3200 may also be connected to XBar 3220 via hub 3216.

In at least one embodiment, tasks are managed by scheduler unit 3212 and dispatched to one of GPCs 3218 by work distribution unit 3214. GPC 3218 is configured to process task and generate results. In at least one embodiment, results may be consumed by other tasks within GPC 3218, routed to a different GPC 3218 via XBar 3220, or stored in memory 3204. In at least one embodiment, results can be written to memory 3204 via partition units 3222, which implement a memory interface for reading and writing data to/from memory 3204. In at least one embodiment, results can be transmitted to another PPU 3204 or CPU via high-speed GPU interconnect 3208. In at least one embodiment, PPU 3200 includes, without limitation, a number U of partition units 3222 that is equal to number of separate and distinct memory devices 3204 coupled to PPU 3200.

In at least one embodiment, a host processor executes a driver kernel that implements an application programming interface ("API") that enables one or more applications executing on host processor to schedule operations for execution on PPU 3200. In at least one embodiment, multiple compute applications are simultaneously executed by PPU 3200 and PPU 3200 provides isolation, quality of service ("QoS"), and independent address spaces for multiple compute applications. In at least one embodiment, an application generates instructions (e.g., in the form of API calls) that cause a driver kernel to generate one or more tasks for execution by PPU 3200 and the driver kernel outputs tasks to one or more streams being processed by PPU 3200. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform a task and that exchange data through shared memory.

Figure 33:
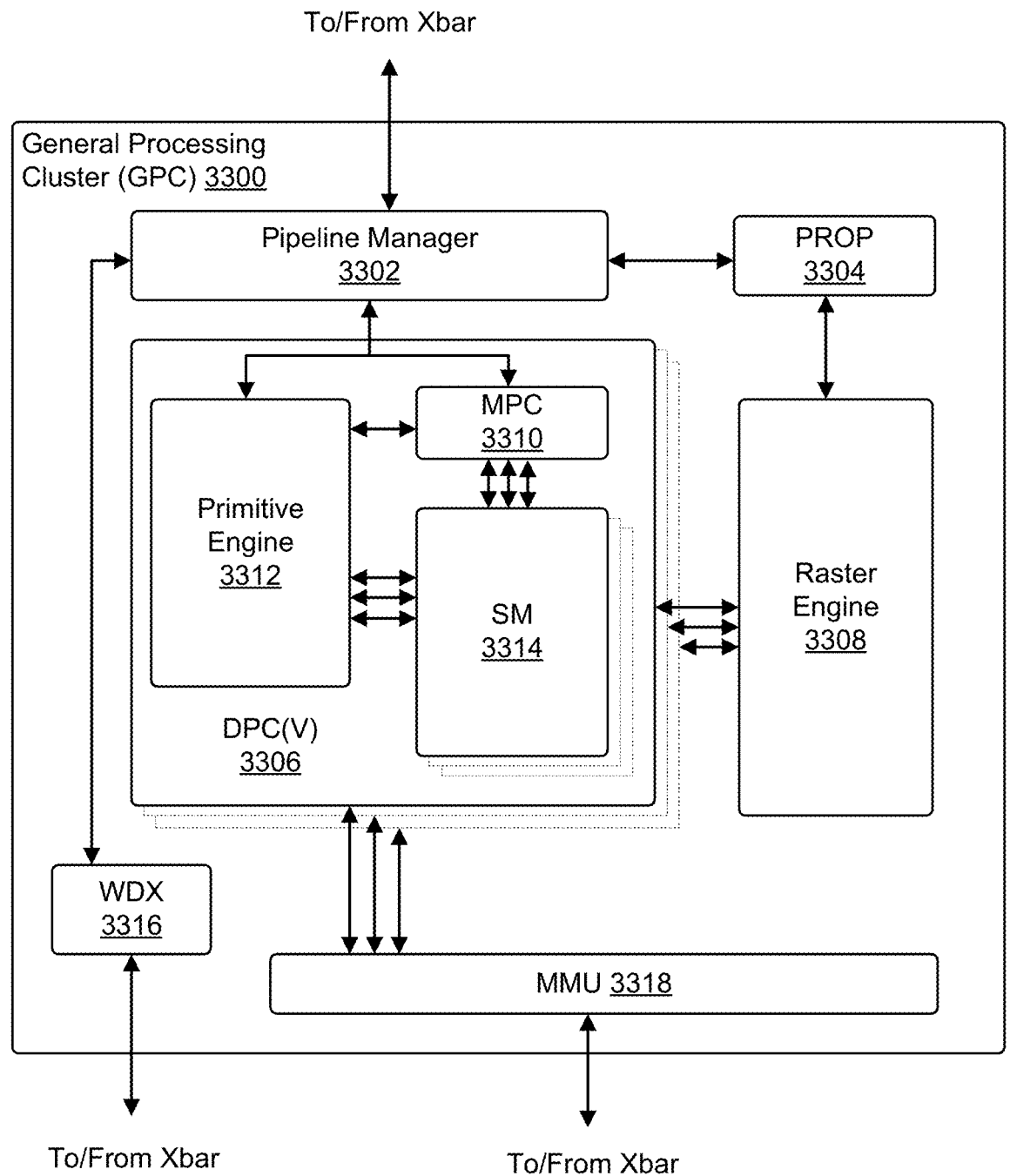
FIG. 33 illustrates a GPC, in accordance with at least one embodiment.

FIG. 33 illustrates a GPC 3300, in accordance with at least one embodiment. In at least one embodiment, GPC 3300 is GPC 3218 of FIG. 32. In at least one embodiment, each GPC 3300 includes, without limitation, a number of hardware units for processing tasks and each GPC 3300 includes, without limitation, a pipeline manager 3302, a pre-raster operations unit ("PROP") 3304, a raster engine 3308, a work distribution crossbar ("WDX") 3316, an MMU 3318, one or more Data Processing Clusters ("DPCs") 3306, and any suitable combination of parts.

In at least one embodiment, operation of GPC 3300 is controlled by pipeline manager 3302. In at least one embodiment, pipeline manager 3302 manages configuration of one or more DPCs 3306 for processing tasks allocated to GPC 3300. In at least one embodiment, pipeline manager 3302 configure s at least one of one or more DPCs 3306 to implement at least a portion of a graphics rendering pipeline. In at least one embodiment, DPC 3306 is configured to execute a vertex shader program on a programmable streaming multiprocessor ("SM") 3314. In at least one embodiment, pipeline manager 3302 is configured to route packets received from a work distribution unit to appropriate logical units within GPC 3300 and, in at least one embodiment, some packets may be routed to fixed function hardware units in PROP 3304 and/or raster engine 3308 while other packets may be routed to DPCs 3306 for processing by a primitive engine 3312 or SM 3314. In at least one embodiment, pipeline manager 3302 configure s at least one of DPCs 3306 to implement a computing pipeline. In at least one embodiment, pipeline manager 3302 configure s at least one of DPCs 3306 to execute at least a portion of a CUDA program.

In at least one embodiment, PROP unit 3304 is configured to route data generated by raster engine 3308 and DPCs 3306 to a Raster Operations ("ROP") unit in a partition unit, such as memory partition unit 3222 described in more detail above in conjunction with FIG. 32. In at least one embodiment, PROP unit 3304 is configured to perform optimizations for color blending, organize pixel data, perform address translations, and more. In at least one embodiment, raster engine 3308 includes, without limitation, a number of fixed function hardware units configured to perform various raster operations and, in at least one embodiment, raster engine 3308 includes, without limitation, a setup engine, a coarse raster engine, a culling engine, a clipping engine, a fine raster engine, a tile coalescing engine, and any suitable combination thereof. In at least one embodiment, a setup engine receives transformed vertices and generates plane equations associated with geometric primitive defined by vertices; plane equations are transmitted to a coarse raster engine to generate coverage information (e.g., an x, y coverage mask for a tile) for a primitive; the output of the coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, the output of raster engine 3308 comprises fragments to be processed by any suitable entity such as by a fragment shader implemented within DPC 3306.

In at least one embodiment, each DPC 3306 included in GPC 3300 comprise, without limitation, an M-Pipe Controller ("MPC") 3310; primitive engine 3312; one or more SMs 3314; and any suitable combination thereof. In at least one embodiment, MPC 3310 controls operation of DPC 3306, routing packets received from pipeline manager 3302 to appropriate units in DPC 3306. In at least one embodiment, packets associated with a vertex are routed to primitive engine 3312, which is configured to fetch vertex attributes associated with vertex from memory; in contrast, packets associated with a shader program may be transmitted to SM 3314.

In at least one embodiment, SM 3314 comprises, without limitation, a programmable streaming processor that is configured to process tasks represented by a number of threads. In at least one embodiment, SM 3314 is multi-threaded and configured to execute a plurality of threads (e.g., 32 threads) from a particular group of threads concurrently and implements a SIMD architecture where each thread in a group of threads (e.g., a warp) is configured to process a different set of data based on same set of instructions. In at least one embodiment, all threads in group of threads execute same instructions. In at least one embodiment, SM 3314 implements a SIMT architecture wherein each thread in a group of threads is configured to process a different set of data based on same set of instructions, but where individual threads in group of threads are allowed to diverge during execution. In at least one embodiment, a program counter, a call stack, and an execution state is maintained for each warp, enabling concurrency between warps and serial execution within warps when threads within a warp diverge. In another embodiment, a program counter, a call stack, and an execution state is maintained for each individual thread, enabling equal concurrency between all threads, within and between warps. In at least one embodiment, an execution state is maintained for each individual thread and threads executing the same instructions may be converged and executed in parallel for better efficiency. At least one embodiment of SM 3314 is described in more detail in conjunction with FIG. 34.

In at least one embodiment, MMU 3318 provides an interface between GPC 3300 and a memory partition unit (e.g., partition unit 3222 of FIG. 32) and MMU 3318 provides translation of virtual addresses into physical addresses, memory protection, and arbitration of memory requests. In at least one embodiment, MMU 3318 provides one or more translation lookaside buffers (TLBs) for performing translation of virtual addresses into physical addresses in memory.

Figure 34:
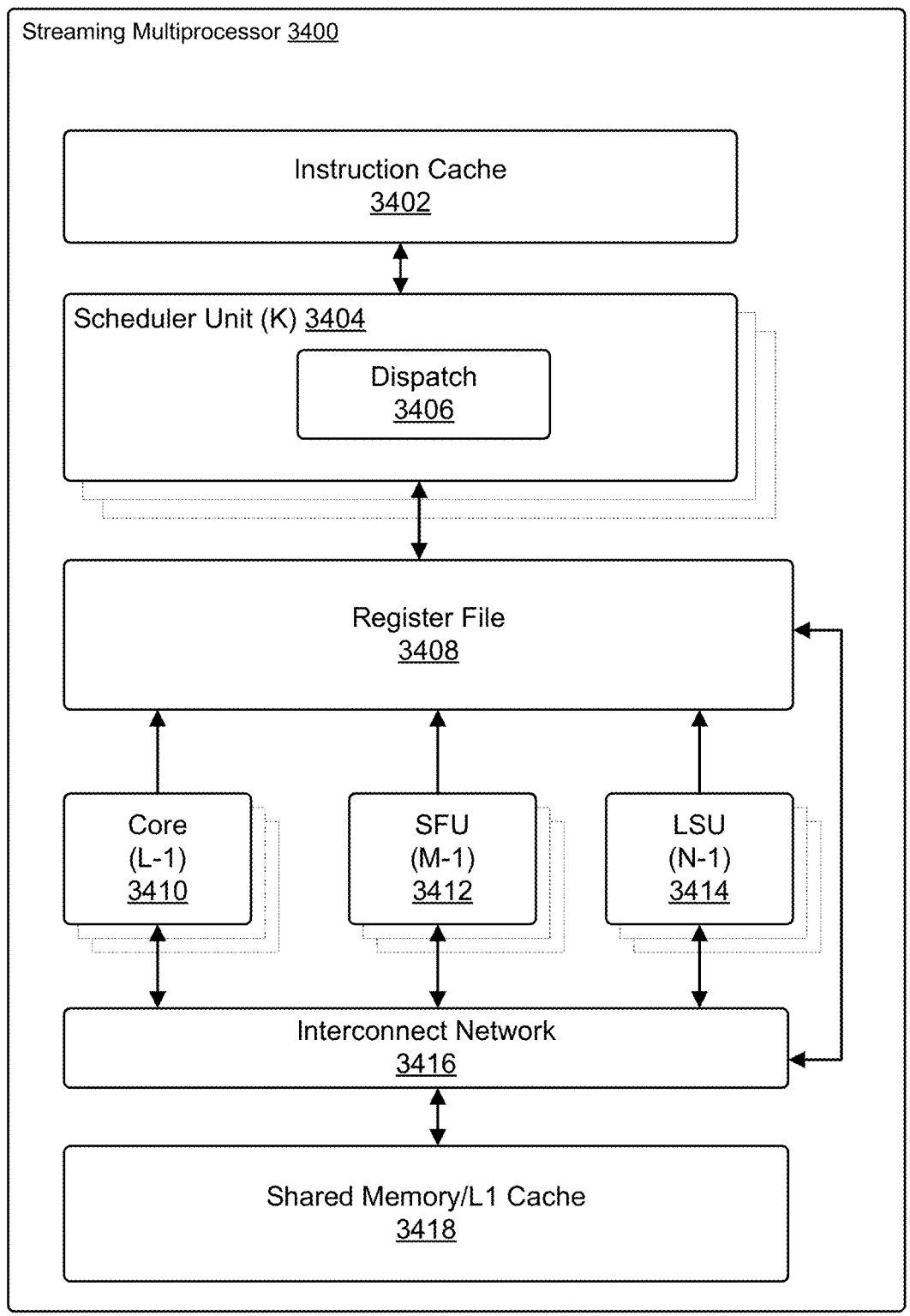
FIG. 34 illustrates a streaming multiprocessor, in accordance with at least one embodiment.

FIG. 34 illustrates a streaming multiprocessor ("SM") 3400, in accordance with at least one embodiment. In at least one embodiment, SM 3400 is SM 3314 of FIG. 33. In at least one embodiment, SM 3400 includes, without limitation, an instruction cache 3402; one or more scheduler units 3404; a register file 3408; one or more processing cores ("cores") 3410; one or more special function units ("SFUs") 3412; one or more LSUs 3414; an interconnect network 3416; a shared memory/L1 cache 3418; and any suitable combination thereof. In at least one embodiment, a work distribution unit dispatches tasks for execution on GPCs of parallel processing units (PPUs) and each task is allocated to a particular Data Processing Cluster (DPC) within a GPC and, if a task is associated with a shader program, then the task is allocated to one of SMs 3400. In at least one embodiment, scheduler unit 3404 receives tasks from a work distribution unit and manages instruction scheduling for one or more thread blocks assigned to SM 3400. In at least one embodiment, scheduler unit 3404 schedules thread blocks for execution as warps of parallel threads, wherein each thread block is allocated at least one warp. In at least one embodiment, each warp executes threads. In at least one embodiment, scheduler unit 3404 manages a plurality of different thread blocks, allocating warps to different thread blocks and then dispatching instructions from a plurality of different cooperative groups to various functional units (e.g., processing cores 3410, SFUs 3412, and LSUs 3414) during each clock cycle.

In at least one embodiment, "cooperative groups" may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, APIs of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in the form of collective group-wide function interfaces. In at least one embodiment, cooperative groups enable programmers to define groups of threads explicitly at sub-block and multi-block granularities, and to perform collective operations such as synchronization on threads in a cooperative group. In at least one embodiment, a sub-block granularity is as small as a single thread. In at least one embodiment, a programming model supports clean composition across software boundaries, so that libraries and utility functions can synchronize safely within their local context without having to make assumptions about convergence. In at least one embodiment, cooperative group primitives enable new patterns of cooperative parallelism, including, without limitation, producer-consumer parallelism, opportunistic parallelism, and global synchronization across an entire grid of thread blocks.

In at least one embodiment, a dispatch unit 3406 is configured to transmit instructions to one or more of functional units and scheduler unit 3404 includes, without limitation, two dispatch units 3406 that enable two different instructions from same warp to be dispatched during each clock cycle. In at least one embodiment, each scheduler unit 3404 includes a single dispatch unit 3406 or additional dispatch units 3406.

In at least one embodiment, each SM 3400, in at least one embodiment, includes, without limitation, register file 3408 that provides a set of registers for functional units of SM 3400. In at least one embodiment, register file 3408 is divided between each of the functional units such that each functional unit is allocated a dedicated portion of register file 3408. In at least one embodiment, register file 3408 is divided between different warps being executed by SM 3400 and register file 3408 provides temporary storage for operands connected to data paths of functional units. In at least one embodiment, each SM 3400 comprises, without limitation, a plurality of L processing cores 3410. In at least one embodiment, SM 3400 includes, without limitation, a large number (e.g., 128 or more) of distinct processing cores 3410. In at least one embodiment, each processing core 3410 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 3410 include, without limitation, 64 single-precision (32-bit) floating point cores, 64 integer cores, 32 double-precision (64-bit) floating point cores, and 8 tensor cores.

In at least one embodiment, tensor cores are configured to perform matrix operations. In at least one embodiment, one or more tensor cores are included in processing cores 3410. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA-C++ API, exposes specialized matrix load, matrix multiply and accumulate, and matrix store operations to efficiently use tensor cores from a CUDA-C++ program. In at least one embodiment, at the CUDA level, a warp-level interface assumes 16×16 size matrices spanning all 32 threads of a warp.

In at least one embodiment, each SM 3400 comprises, without limitation, M SFUs 3412 that perform special functions (e.g., attribute evaluation, reciprocal square root, and like). In at least one embodiment, SFUs 3412 include, without limitation, a tree traversal unit configured to traverse a hierarchical tree data structure. In at least one embodiment, SFUs 3412 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 3400. In at least one embodiment, texture maps are stored in shared memory/L1 cache 3418. In at least one embodiment, texture units implement texture operations such as filtering operations using mip-maps (e.g., texture maps of varying levels of detail). In at least one embodiment, each SM 3400 includes, without limitation, two texture units.

In at least one embodiment, each SM 3400 comprises, without limitation, N LSUs 3414 that implement load and store operations between shared memory/L1 cache 3418 and register file 3408. In at least one embodiment, each SM 3400 includes, without limitation, interconnect network 3416 that connects each of the functional units to register file 3408 and LSU 3414 to register file 3408 and shared memory/L1 cache 3418. In at least one embodiment, interconnect network 3416 is a crossbar that can be configured to connect any of the functional units to any of the registers in register file 3408 and connect LSUs 3414 to register file 3408 and memory locations in shared memory/L1 cache 3418.

In at least one embodiment, shared memory/L1 cache 3418 is an array of on-chip memory that allows for data storage and communication between SM 3400 and a primitive engine and between threads in SM 3400. In at least one embodiment, shared memory/L1 cache 3418 comprises, without limitation, 128 KB of storage capacity and is in a path from SM 3400 to a partition unit. In at least one embodiment, shared memory/L1 cache 3418 is used to cache reads and writes. In at least one embodiment, one or more of shared memory/L1 cache 3418, L2 cache, and memory are backing stores.

In at least one embodiment, combining data cache and shared memory functionality into a single memory block provides improved performance for both types of memory accesses. In at least one embodiment, capacity is used or is usable as a cache by programs that do not use shared memory, such as if shared memory is configured to use half of capacity, texture and load/store operations can use remaining capacity. In at least one embodiment, integration within shared memory/L1 cache 3418 enables shared memory/L1 cache 3418 to function as a high-throughput conduit for streaming data while simultaneously providing high-bandwidth and low-latency access to frequently reused data. In at least one embodiment, when configured for general purpose parallel computation, a simpler configuration can be used compared with graphics processing. In at least one embodiment, fixed function GPUs are bypassed, creating a much simpler programming model. In at least one embodiment and in a general purpose parallel computation configuration, a work distribution unit assigns and distributes blocks of threads directly to DPCs. In at least one embodiment, threads in a block execute the same program, using a unique thread ID in a calculation to ensure each thread generates unique results, using SM 3400 to execute a program and perform calculations, shared memory/L1 cache 3418 to communicate between threads, and LSU 3414 to read and write global memory through shared memory/L1 cache 3418 and a memory partition unit. In at least one embodiment, when configured for general purpose parallel computation, SM 3400 writes commands that scheduler unit 3404 can use to launch new work on DPCs.

In at least one embodiment, PPU is included in or coupled to a desktop computer, a laptop computer, a tablet computer, servers, supercomputers, a smart-phone (e.g., a wireless, hand-held device), a PDA, a digital camera, a vehicle, a head mounted display, a hand-held electronic device, and more. In at least one embodiment, PPU is embodied on a single semiconductor substrate. In at least one embodiment, PPU is included in an SoC along with one or more other devices such as additional PPUs, memory, a RISC CPU, an MMU, a digital-to-analog converter ("DAC"), and like.

In at least one embodiment, PPU may be included on a graphics card that includes one or more memory devices. In at least one embodiment, a graphics card may be configured to interface with a PCIe slot on a motherboard of a desktop computer. In at least one embodiment, PPU may be an integrated GPU ("iGPU") included in chipset of motherboard.

Software Constructions for General-Purpose Computing

The following FIGS. set forth, without limitation, exemplary software constructs for implementing at least one embodiment.

Figure 35:
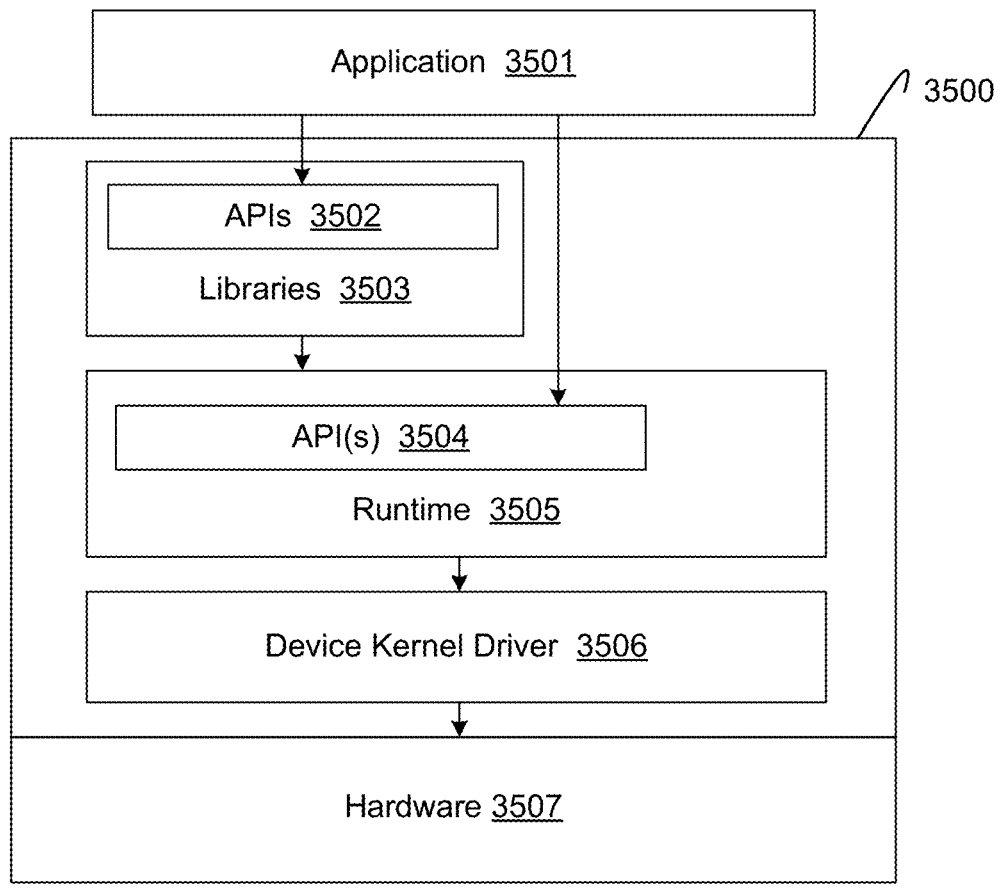
FIG. 35 illustrates a software stack of a programming platform, in accordance with at least one embodiment.

FIG. 35 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 3500 of a programming platform provides an execution environment for an application 3501. In at least one embodiment, application 3501 may include any computer software capable of being launched on software stack 3500. In at least one embodiment, application 3501 may include, but is not limited to, an artificial intelligence ("AI")/machine learning ("ML") application, a high performance computing ("HPC") application, a virtual desktop infrastructure ("VDI"), or a data center workload.

In at least one embodiment, application 3501 and software stack 3500 run on hardware 3507. Hardware 3507 may include one or more GPUs, CPUs, FPGAs, AI engines, and/or other types of compute devices that support a programming platform, in at least one embodiment. In at least one embodiment, such as with CUDA, software stack 3500 may be vendor specific and compatible with only devices from particular vendor(s). In at least one embodiment, such as in with OpenCL, software stack 3500 may be used with devices from different vendors. In at least one embodiment, hardware 3507 includes a host connected to one more devices that can be accessed to perform computational tasks via application programming interface ("API") calls. A device within hardware 3507 may include, but is not limited to, a GPU, FPGA, AI engine, or other compute device (but may also include a CPU) and its memory, as opposed to a host within hardware 3507 that may include, but is not limited to, a CPU (but may also include a compute device) and its memory, in at least one embodiment.

In at least one embodiment, software stack 3500 of a programming platform includes, without limitation, a number of libraries 3503, a runtime 3505, and a device kernel driver 3506. Each of libraries 3503 may include data and programming code that can be used by computer programs and leveraged during software development, in at least one embodiment. In at least one embodiment, libraries 3503 may include, but are not limited to, pre-written code and subroutines, classes, values, type specifications, configuration data, documentation, help data, and/or message templates. In at least one embodiment, libraries 3503 include functions that are optimized for execution on one or more types of devices. In at least one embodiment, libraries 3503 may include, but are not limited to, functions for performing mathematical, deep learning, and/or other types of operations on devices. In at least one embodiment, libraries 3503 are associated with corresponding APIs 3502, which may include one or more APIs, that expose functions implemented in libraries 3503.

In at least one embodiment, application 3501 is written as source code that is compiled into executable code, as discussed in greater detail below in conjunction with FIGS. 40-42. Executable code of application 3501 may run, at least in part, on an execution environment provided by software stack 3500, in at least one embodiment. In at least one embodiment, during execution of application 3501, code may be reached that needs to run on a device, as opposed to a host. In such a case, runtime 3505 may be called to load and launch requisite code on the device, in at least one embodiment. In at least one embodiment, runtime 3505 may include any technically feasible runtime system that is able to support execution of application S01.

In at least one embodiment, runtime 3505 is implemented as one or more runtime libraries associated with corresponding APIs, which are shown as API(s) 3504. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 3504 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 3506 is configured to facilitate communication with an underlying device. In at least one embodiment, device kernel driver 3506 may provide low-level functionalities upon which APIs, such as API(s) 3504, and/or other software relies. In at least one embodiment, device kernel driver 3506 may be configured to compile intermediate representation ("IR") code into binary code at runtime. For CUDA, device kernel driver 3506 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 3506 to compile IR code at runtime.

Figure 36:
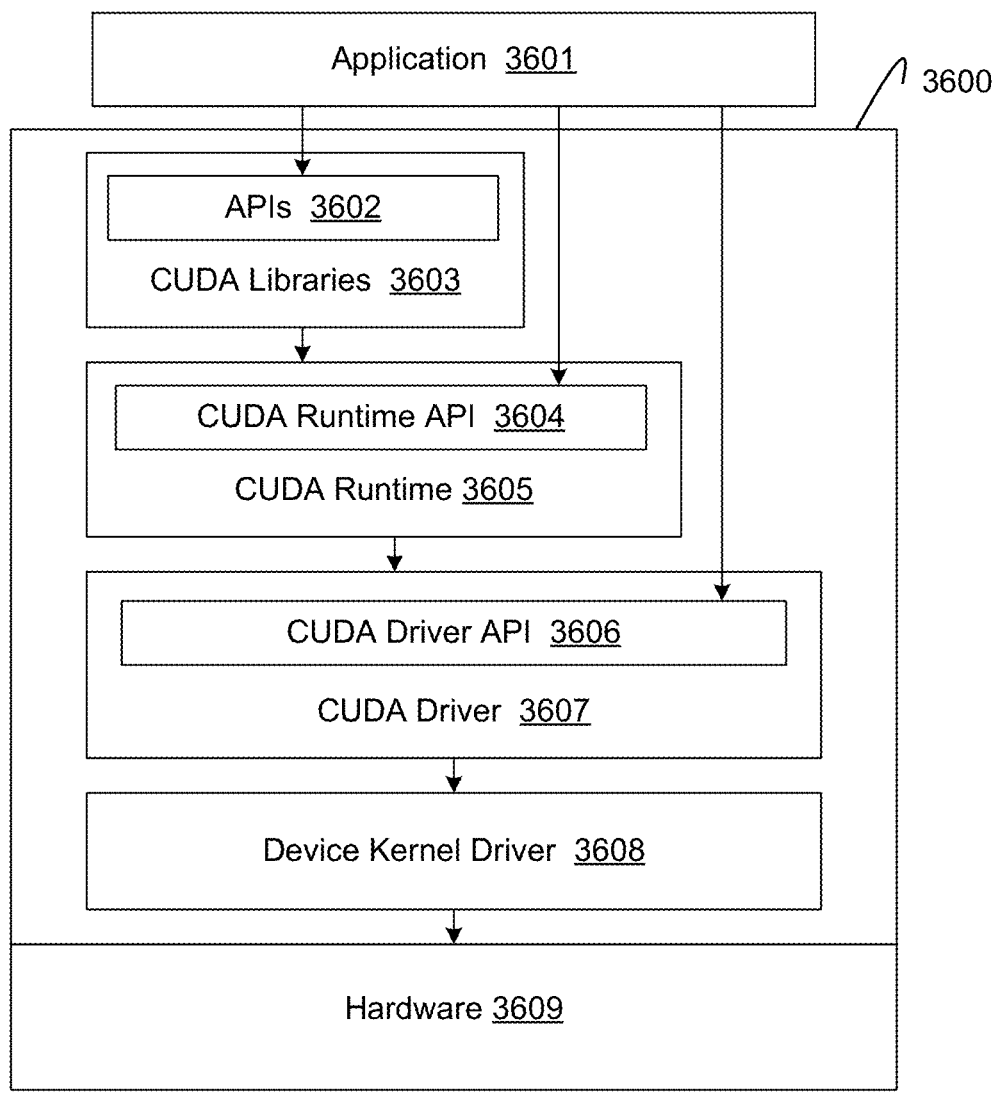
FIG. 36 illustrates a CUDA implementation of a software stack of FIG. 35, in accordance with at least one embodiment.

FIG. 36 illustrates a CUDA implementation of software stack 3500 of FIG. 35, in accordance with at least one embodiment. In at least one embodiment, a CUDA software stack 3600, on which an application 3601 may be launched, includes APIs 3602, CUDA libraries 3603, a CUDA runtime 3605, a CUDA driver 3607, and a device kernel driver 3608. In at least one embodiment, CUDA software stack 3600 executes on hardware 3609, which may include a GPU that supports CUDA and is developed by NVIDIA Corporation of Santa Clara, CA.

In at least one embodiment, application 3601, CUDA runtime 3605, and device kernel driver 3608 may perform similar functionalities as application 3501, runtime 3505, and device kernel driver 3506, respectively, which are described above in conjunction with FIG. 35. In at least one embodiment, CUDA driver 3607 includes a library (libcuda.so) that implements a CUDA driver API 3606. Similar to a CUDA runtime API 3604 implemented by a CUDA runtime library (cudart), CUDA driver API 3606 may, without limitation, expose functions for memory management, execution control, device management, error handling, synchronization, and/or graphics interoperability, among other things, in at least one embodiment. In at least one embodiment, CUDA driver API 3606 differs from CUDA runtime API 3604 in that CUDA runtime API 3604 simplifies device code management by providing implicit initialization, context (analogous to a process) management, and module (analogous to dynamically loaded libraries) management. In contrast to high-level CUDA runtime API 3604, CUDA driver API 3606 is a low-level API providing more fine-grained control of the device, particularly with respect to contexts and module loading, in at least one embodiment. In at least one embodiment, CUDA driver API 3606 may expose functions for context management that are not exposed by CUDA runtime API 3604. In at least one embodiment, CUDA driver API 3606 is also language-independent and supports, e.g., OpenCL in addition to CUDA runtime API 3604. Further, in at least one embodiment, development libraries, including CUDA runtime 3605, may be considered as separate from driver components, including user-mode CUDA driver 3607 and kernel-mode device driver 3608 (also sometimes referred to as a "display" driver).

In at least one embodiment, CUDA libraries 3603 may include, but are not limited to, mathematical libraries, deep learning libraries, parallel algorithm libraries, and/or signal/image/video processing libraries, which parallel computing applications such as application 3601 may utilize. In at least one embodiment, CUDA libraries 3603 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 3603 may include deep learning libraries such as a cuDNN library of primitives for deep neural networks and a TensorRT platform for high-performance deep learning inference, among others.

Figure 37:
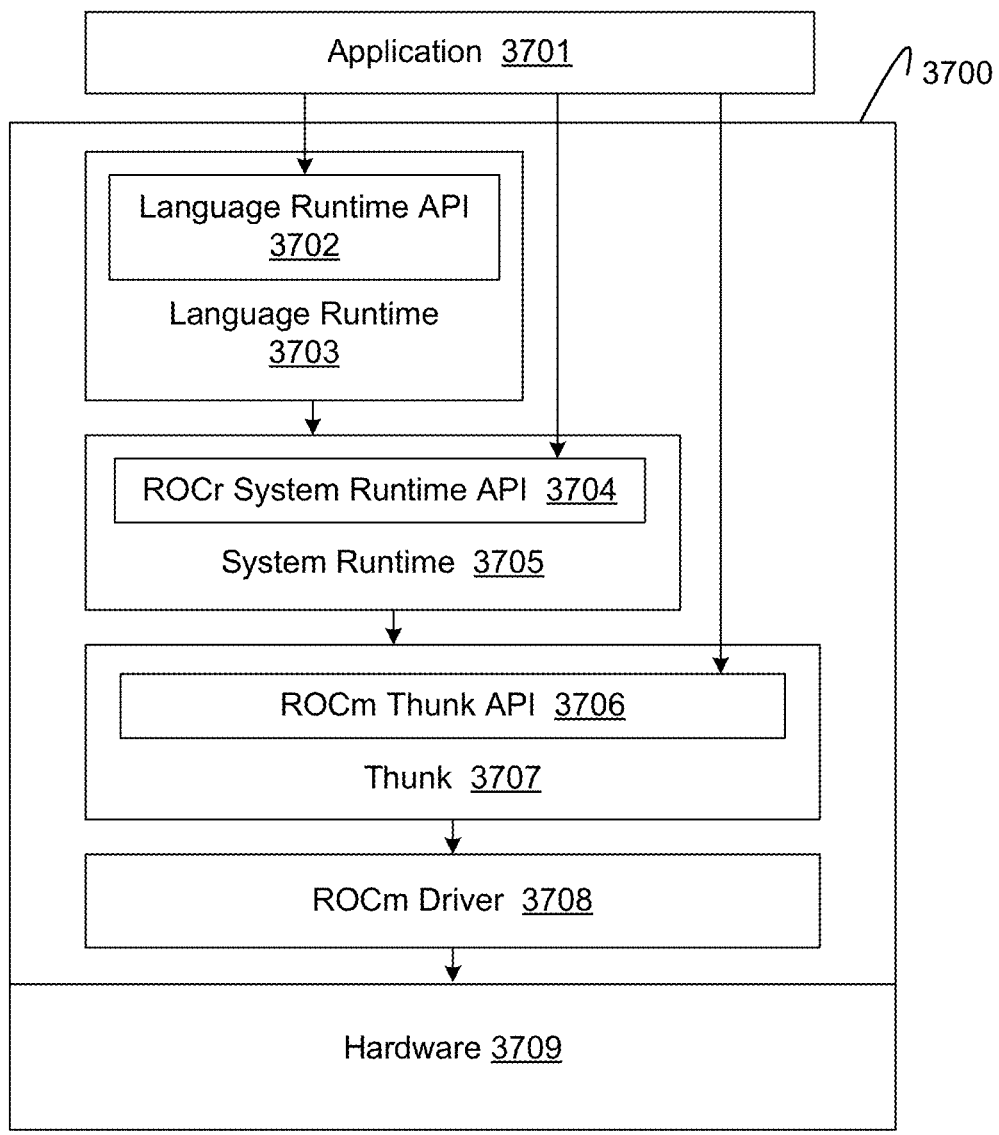
FIG. 37 illustrates a ROCm implementation of a software stack of FIG. 35, in accordance with at least one embodiment.

FIG. 37 illustrates a ROCm implementation of software stack 3500 of FIG. 35, in accordance with at least one embodiment. In at least one embodiment, a ROCm software stack 3700, on which an application 3701 may be launched, includes a language runtime 3703, a system runtime 3705, a thunk 3707, and a ROCm kernel driver 3708. In at least one embodiment, ROCm software stack 3700 executes on hardware 3709, which may include a GPU that supports ROCm and is developed by AMD Corporation of Santa Clara, Calif.

In at least one embodiment, application 3701 may perform similar functionalities as application 3501 discussed above in conjunction with FIG. 35. In addition, language runtime 3703 and system runtime 3705 may perform similar functionalities as runtime 3505 discussed above in conjunction with FIG. 35, in at least one embodiment. In at least one embodiment, language runtime 3703 and system runtime 3705 differ in that system runtime 3705 is a language-independent runtime that implements a ROCr system runtime API 3704 and makes use of a Heterogeneous System Architecture ("HSA") Runtime API. HSA runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 3705, language runtime 3703 is an implementation of a language-specific runtime API 3702 layered on top of ROCr system runtime API 3704, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 3604 discussed above in conjunction with FIG. 36, such as functions for memory management, execution control, device management, error handling, and synchronization, among other things.

In at least one embodiment, thunk (ROCt) 3707 is an interface 3706 that can be used to interact with underlying ROCm driver 3708. In at least one embodiment, ROCm driver 3708 is a ROCk driver, which is a combination of an AMDGPU driver and a HSA kernel driver (amdkfd). In at least one embodiment, AMDGPU driver is a device kernel driver for GPUs developed by AMD that performs similar functionalities as device kernel driver 3506 discussed above in conjunction with FIG. 35. In at least one embodiment, HSA kernel driver is a driver permitting different types of processors to share system resources more effectively via hardware features.

In at least one embodiment, various libraries (not shown) may be included in ROCm software stack 3700 above language runtime 3703 and provide functionality similarity to CUDA libraries 3603, discussed above in conjunction with FIG. 36. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

Figure 38:
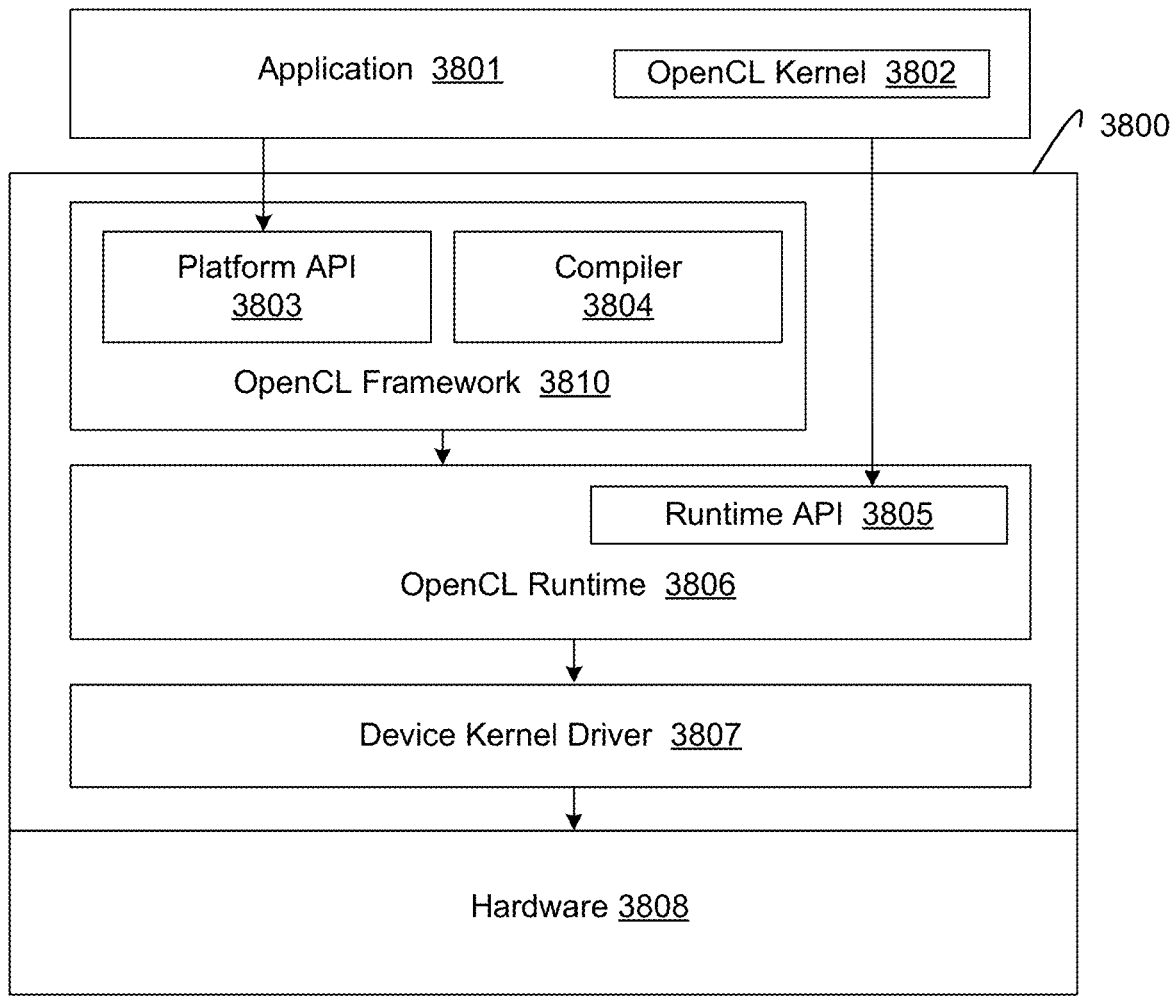
FIG. 38 illustrates an OpenCL implementation of a software stack of FIG. 35, in accordance with at least one embodiment.

FIG. 38 illustrates an OpenCL implementation of software stack 3500 of FIG. 35, in accordance with at least one embodiment. In at least one embodiment, an OpenCL software stack 3800, on which an application 3801 may be launched, includes an OpenCL framework 3810, an OpenCL runtime 3806, and a driver 3807. In at least one embodiment, OpenCL software stack 3800 executes on hardware 3609 that is not vendor-specific. As OpenCL is supported by devices developed by different vendors, specific OpenCL drivers may be required to interoperate with hardware from such vendors, in at least one embodiment.

In at least one embodiment, application 3801, OpenCL runtime 3806, device kernel driver 3807, and hardware 3808 may perform similar functionalities as application 3501, runtime 3505, device kernel driver 3506, and hardware 3507, respectively, that are discussed above in conjunction with FIG. 35. In at least one embodiment, application 3801 further includes an OpenCL kernel 3802 with code that is to be executed on a device.

In at least one embodiment, OpenCL defines a "platform" that allows a host to control devices connected to the host. In at least one embodiment, an OpenCL framework provides a platform layer API and a runtime API, shown as platform API 3803 and runtime API 3805. In at least one embodiment, runtime API 3805 uses contexts to manage execution of kernels on devices. In at least one embodiment, each identified device may be associated with a respective context, which runtime API 3805 may use to manage command queues, program objects, and kernel objects, share memory objects, among other things, for that device. In at least one embodiment, platform API 3803 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 3804 is also included in OpenCL frame-work 3810. Source code may be compiled offline prior to executing an application or online during execution of an application, in at least one embodiment. In contrast to CUDA and ROCm, OpenCL applications in at least one embodiment may be compiled online by compiler 3804, which is included to be representative of any number of compilers that may be used to compile source code and/or IR code, such as Standard Portable Intermediate Representation ("SPIR-V") code, into binary code. Alternatively, in at least one embodiment, OpenCL applications may be compiled offline, prior to execution of such applications.

Figure 39:
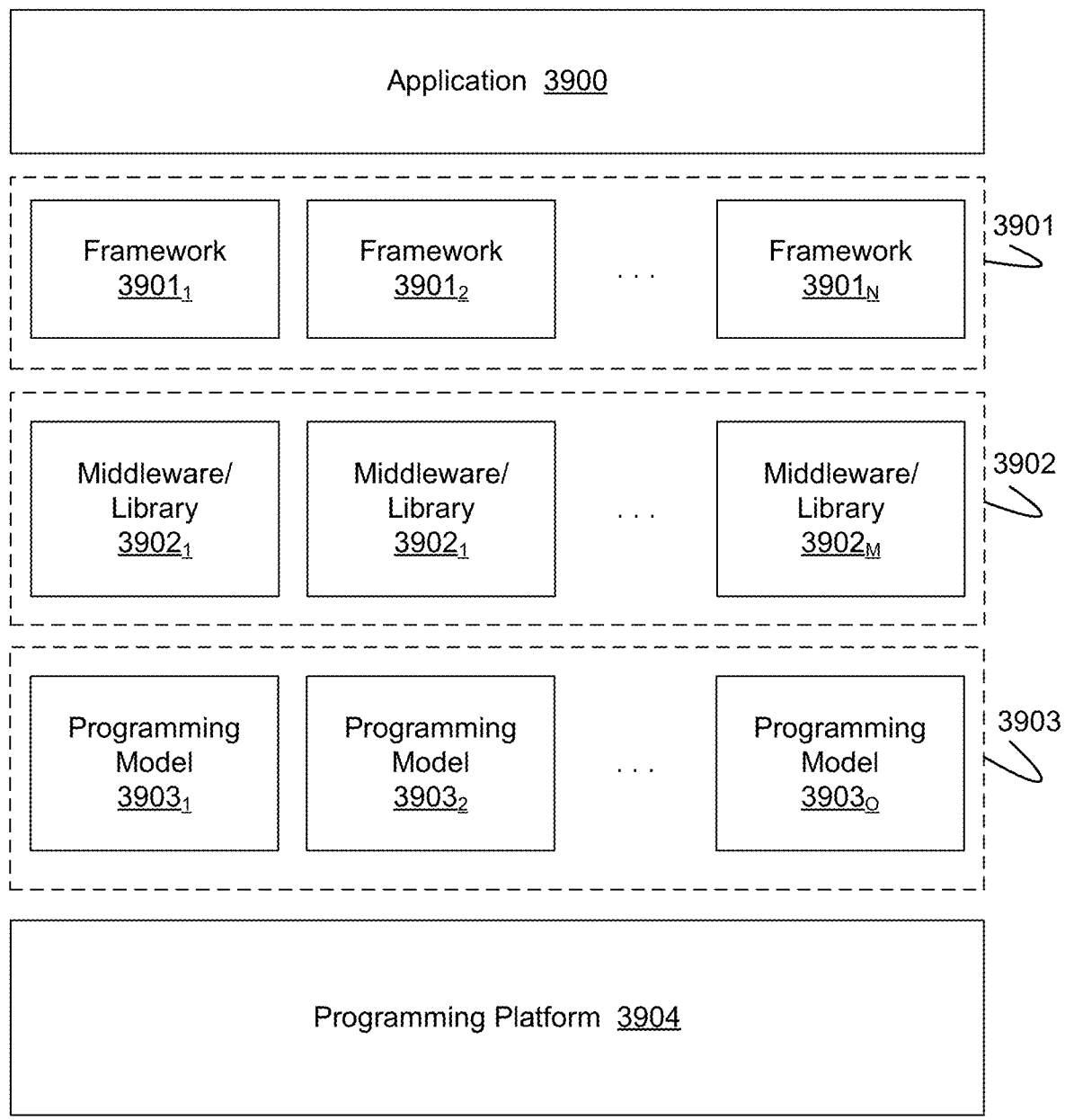
FIG. 39 illustrates software that is supported by a programming platform, in accordance with at least one embodiment.

FIG. 39 illustrates software that is supported by a programming platform, in accordance with at least one embodiment. In at least one embodiment, a programming platform 3904 is configured to support various programming models 3903, middlewares and/or libraries 3902, and frameworks 3901 that an application 3900 may rely upon. In at least one embodiment, application 3900 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDIA Developer Data Loading Library ("DALI") CUDA libraries to provide accelerated computing on underlying hardware.

In at least one embodiment, programming platform 3904 may be one of a CUDA, ROCm, or OpenCL platform described above in conjunction with FIG. 36, FIG. 37, and FIG. 38, respectively. In at least one embodiment, programming platform 3904 supports multiple programming models 3903, which are abstractions of an underlying computing system permitting expressions of algorithms and data structures. Programming models 3903 may expose features of underlying hardware in order to improve performance, in at least one embodiment. In at least one embodiment, programming models 3903 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 3902 provide implementations of abstractions of programming models 3904. In at least one embodiment, such libraries include data and programming code that may be used by computer programs and leveraged during software development. In at least one embodiment, such middlewares include software that provides services to applications beyond those available from programming platform 3904. In at least one embodiment, libraries and/or middlewares 3902 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 3902 may include NCCL and ROCm Communication Collectives Library ("RCCL") libraries providing communication routines for GPUs, a MOOpen library for deep learning acceleration, and/or an Eigen library for linear algebra, matrix and vector operations, geometrical transformations, numerical solvers, and related algorithms.

In at least one embodiment, application frameworks 3901 depend on libraries and/or middlewares 3902. In at least one embodiment, each of application frameworks 3901 is a software framework used to implement a standard structure of application software. Returning to the AWL example discussed above, an AI/ML, application may be implemented using a framework such as Caffe, Caffe2, TensorFlow, Keras, PyTorch, or MxNet deep learning frameworks, in at least one embodiment.

Figure 40:
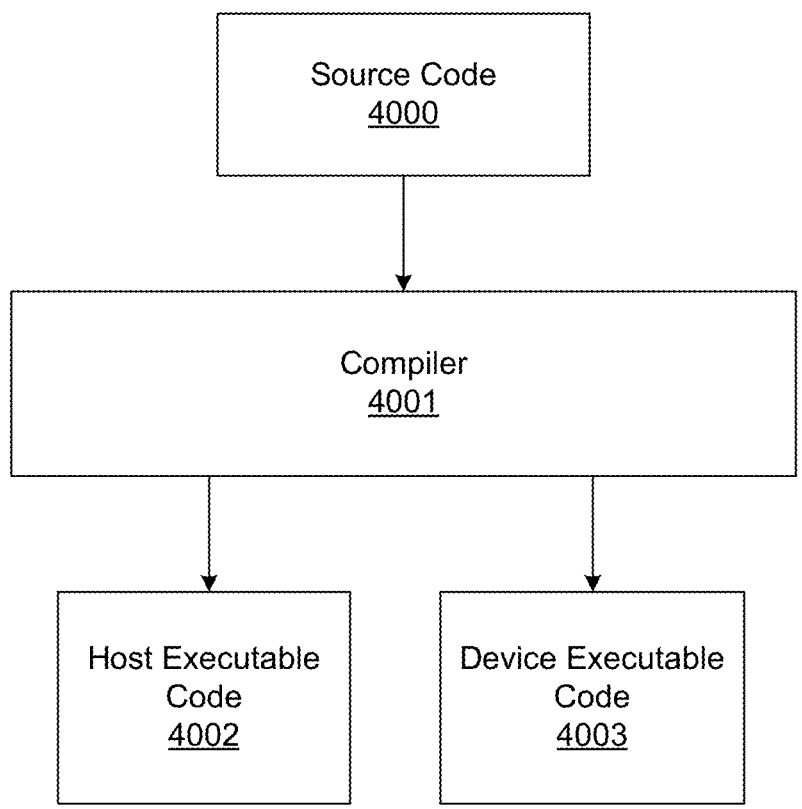
FIG. 40 illustrates compiling code to execute on programming platforms of FIGS. 35-38, in accordance with at least one embodiment.

FIG. 40 illustrates compiling code to execute on one of programming platforms of FIGS. 35-38, in accordance with at least one embodiment. In at least one embodiment, a compiler 4001 receives source code 4000 that includes both host code as well as device code. In at least one embodiment, compiler 4001 is configured to convert source code 4000 into host executable code 4002 for execution on a host and device executable code 4003 for execution on a device. In at least one embodiment, source code 4000 may either be compiled offline prior to execution of an application, or online during execution of an application.

In at least one embodiment, source code 4000 may include code in any programming language supported by compiler 4001, such as C++, C, Fortran, etc. In at least one embodiment, source code 4000 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 4000 may include multiple source code files, rather than a single-source file, into which host code and device code are separated.

In at least one embodiment, compiler 4001 is configured to compile source code 4000 into host executable code 4002 for execution on a host and device executable code 4003 for execution on a device. In at least one embodiment, compiler 4001 performs operations including parsing source code 4000 into an abstract system tree (AST), performing optimizations, and generating executable code. In at least one embodiment in which source code 4000 includes a single-source file, compiler 4001 may separate device code from host code in such a single-source file, compile device code and host code into device executable code 4003 and host executable code 4002, respectively, and link device executable code 4003 and host executable code 4002 together in a single file, as discussed in greater detail below with respect to FIG. 41.

In at least one embodiment, host executable code 4002 and device executable code 4003 may be in any suitable format, such as binary code and/or IR code. In the case of CUDA, host executable code 4002 may include native object code and device executable code 4003 may include code in PTX intermediate representation, in at least one embodiment. In the case of ROCm, both host executable code 4002 and device executable code 4003 may include target binary code, in at least one embodiment.

Figure 41:
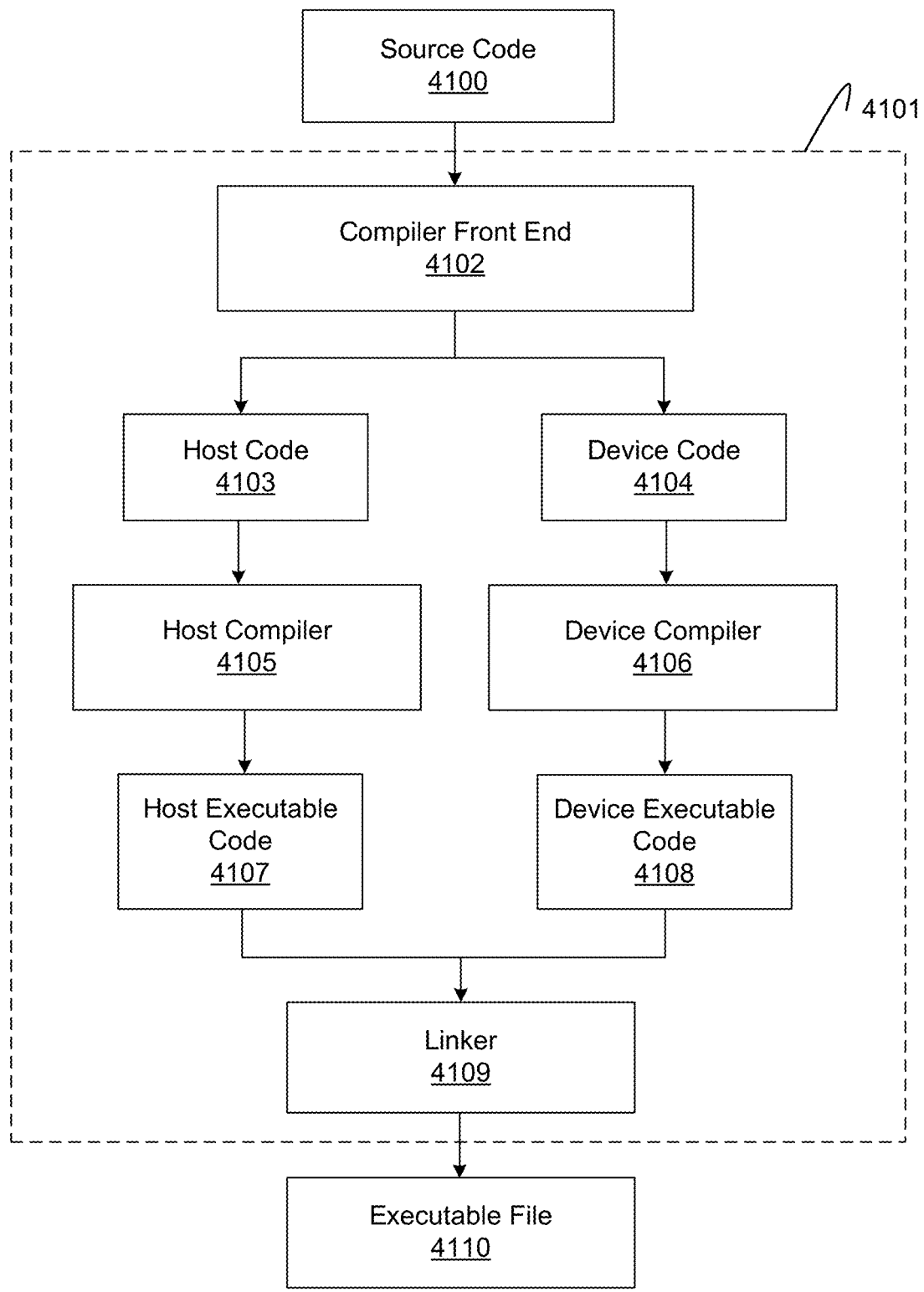
FIG. 41 illustrates in greater detail compiling code to execute on programming platforms of FIGS. 35-38, in accordance with at least one embodiment.

FIG. 41 is a more detailed illustration of compiling code to execute on one of programming platforms of FIGS. 35-38, in accordance with at least one embodiment. In at least one embodiment, a compiler 4101 is configured to receive source code 4100, compile source code 4100, and output an executable file 4110. In at least one embodiment, source code 4100 is a single-source file, such as a .cu file, a .hip.cpp file, or a file in another format, that includes both host and device code. In at least one embodiment, compiler 4101 may be, but is not limited to, an NVIDIA CUDA compiler ("NVCC") for compiling CUDA code in .cu files, or a HCC compiler for compiling HIP code in .hip.cpp files.

In at least one embodiment, compiler 4101 includes a compiler front end 4102, a host compiler 4105, a device compiler 4106, and a linker 4109. In at least one embodiment, compiler front end 4102 is configured to separate device code 4104 from host code 4103 in source code 4100. Device code 4104 is compiled by device compiler 4106 into device executable code 4108, which as described may include binary code or IR code, in at least one embodiment. Separately, host code 4103 is compiled by host compiler 4105 into host executable code 4107, in at least one embodiment. For NVCC, host compiler 4105 may be, but is not limited to, a general purpose C/C++ compiler that outputs native object code, while device compiler 4106 may be, but is not limited to, a Low Level Virtual Machine ("LLVM")-based compiler that forks a LLVM compiler infrastructure and outputs PTX code or binary code, in at least one embodiment. For HCC, both host compiler 4105 and device compiler 4106 may be, but are not limited to, LLVM-based compilers that output target binary code, in at least one embodiment.

Subsequent to compiling source code 4100 into host executable code 4107 and device executable code 4108, linker 4109 links host and device executable code 4107 and 4108 together in executable file 4110, in at least one embodiment. In at least one embodiment, native object code for a host and PTX or binary code for a device may be linked together in an Executable and Linkable Format ("ELF") file, which is a container format used to store object code.

Figure 42:
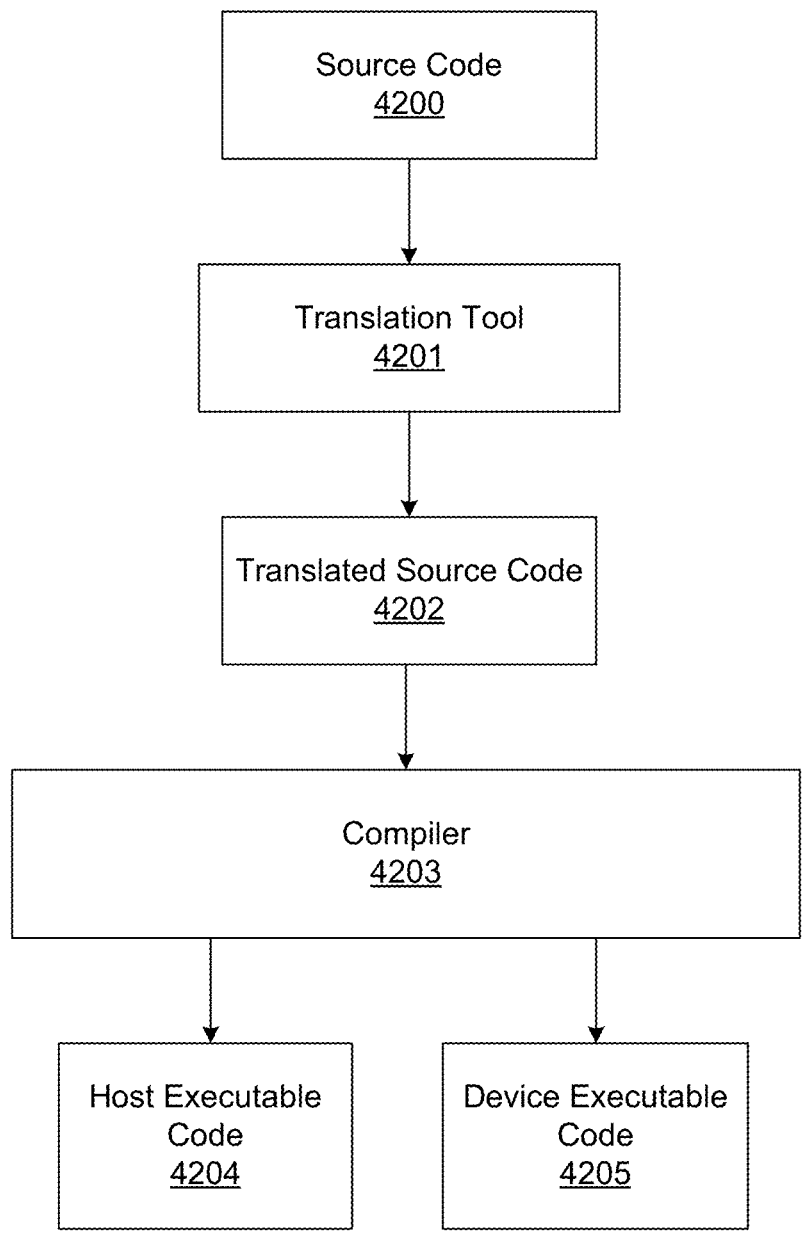
FIG. 42 illustrates translating source code prior to compiling source code, in accordance with at least one embodiment.

FIG. 42 illustrates translating source code prior to compiling source code, in accordance with at least one embodiment. In at least one embodiment, source code 4200 is passed through a translation tool 4201, which translates source code 4200 into translated source code 4202. In at least one embodiment, a compiler 4203 is used to compile translated source code 4202 into host executable code 4204 and device executable code 4205 in a process that is similar to compilation of source code 4000 by compiler 4001 into host executable code 4002 and device executable code 4003, as discussed above in conjunction with FIG. 40.

In at least one embodiment, a translation performed by translation tool 4201 is used to port source 4200 for execution in a different environment than that in which it was originally intended to run. In at least one embodiment, translation tool 4201 may include, but is not limited to, a HIP translator that is used to "hipify" CUDA code intended for a CUDA platform into HIP code that can be compiled and executed on a ROCm platform. In at least one embodiment, translation of source code 4200 may include parsing source code 4200 and converting calls to API(s) provided by one programming model (e.g., CUDA) into corresponding calls to API(s) provided by another programming model (e.g., HIP), as discussed in greater detail below in conjunction with FIGS. 43A-44. Returning to the example of hipifying CUDA code, calls to CUDA runtime API, CUDA driver API, and/or CUDA libraries may be converted to corresponding HIP API calls, in at least one embodiment. In at least one embodiment, automated translations performed by translation tool 4201 may sometimes be incomplete, requiring additional, manual effort to fully port source code 4200.

Configuring GPUs for General-Purpose Computing

The following FIGS. set forth, without limitation, exemplary architectures for compiling and executing compute source code, in accordance with at least one embodiment.

Figure 43A:
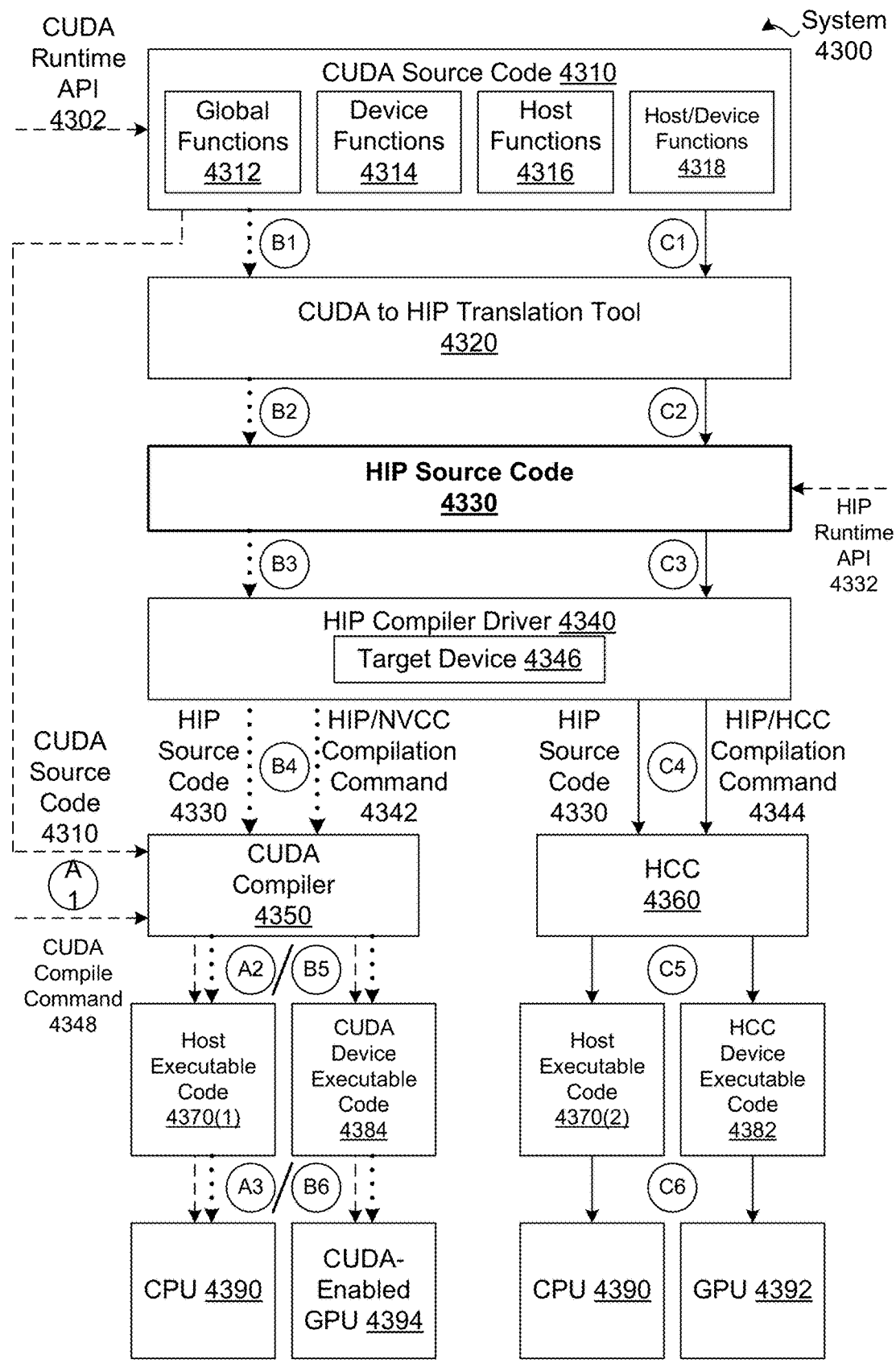
FIG. 43A illustrates a system configured to compile and execute CUDA source code using different types of processing units, in accordance with at least one embodiment.

FIG. 43A illustrates a system 4300 configured to compile and execute CUDA source code 4310 using different types of processing units, in accordance with at least one embodiment. In at least one embodiment, system 4300 includes, without limitation, CUDA source code 4310, a CUDA compiler 4350, host executable code 4370(1), host executable code 4370(2), CUDA device executable code 4384, a CPU 4390, a CUDA-enabled GPU 4394, a GPU 4392, a CUDA to HIP translation tool 4320, HIP source code 4330, a HIP compiler driver 4340, an HCC 4360, and HCC device executable code 4382.

In at least one embodiment, CUDA source code 4310 is a collection of human-readable code in a CUDA programming language. In at least one embodiment, CUDA code is human-readable code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable in parallel on a device. In at least one embodiment, a device may be a processor that is optimized for parallel instruction processing, such as CUDA-enabled GPU 4390, GPU 4392, or another GPGPU, etc. In at least one embodiment, host code is source code that, after compilation, is executable on a host. In at least one embodiment, a host is a processor that is optimized for sequential instruction processing, such as CPU 4390.

In at least one embodiment, CUDA source code 4310 includes, without limitation, any number (including zero) of global functions 4312, any number (including zero) of device functions 4314, any number (including zero) of host functions 4316, and any number (including zero) of host/device functions 4318. In at least one embodiment, global functions 4312, device functions 4314, host functions 4316, and host/device functions 4318 may be mixed in CUDA source code 4310. In at least one embodiment, each of global functions 4312 is executable on a device and callable from a host. In at least one embodiment, one or more of global functions 4312 may therefore act as entry points to a device. In at least one embodiment, each of global functions 4312 is a kernel. In at least one embodiment and in a technique known as dynamic parallelism, one or more of global functions 4312 defines a kernel that is executable on a device and callable from such a device. In at least one embodiment, a kernel is executed N (where N is any positive integer) times in parallel by N different threads on a device during execution.

In at least one embodiment, each of device functions 4314 is executed on a device and callable from such a device only. In at least one embodiment, each of host functions 4316 is executed on a host and callable from such a host only. In at least one embodiment, each of host/device functions 4316 defines both a host version of a function that is executable on a host and callable from such a host only and a device version of the function that is executable on a device and callable from such a device only.

In at least one embodiment, CUDA source code 4310 may also include, without limitation, any number of calls to any number of functions that are defined via a CUDA runtime API 4302. In at least one embodiment, CUDA runtime API 4302 may include, without limitation, any number of functions that execute on a host to allocate and deallocate device memory, transfer data between host memory and device memory, manage systems with multiple devices, etc. In at least one embodiment, CUDA source code 4310 may also include any number of calls to any number of functions that are specified in any number of other CUDA APIs. In at least one embodiment, a CUDA API may be any API that is designed for use by CUDA code. In at least one embodiment, CUDA APIs include, without limitation, CUDA runtime API 4302, a CUDA driver API, APIs for any number of CUDA libraries, etc. In at least one embodiment and relative to CUDA runtime API 4302, a CUDA driver API is a lower-level API but provides finer-grained control of a device. In at least one embodiment, examples of CUDA libraries include, without limitation, cuBLAS, cuFFT, cuRAND, cuDNN, etc.

In at least one embodiment, CUDA compiler 4350 compiles input CUDA code (e.g., CUDA source code 4310) to generate host executable code 4370(1) and CUDA device executable code 4384. In at least one embodiment, CUDA compiler 4350 is NVCC. In at least one embodiment, host executable code 4370(1) is a compiled version of host code included in input source code that is executable on CPU 4390. In at least one embodiment, CPU 4390 may be any processor that is optimized for sequential instruction processing.

In at least one embodiment, CUDA device executable code 4384 is a compiled version of device code included in input source code that is executable on CUDA-enabled GPU 4394. In at least one embodiment, CUDA device executable code 4384 includes, without limitation, binary code. In at least one embodiment, CUDA device executable code 4384 includes, without limitation, IR code, such as PTX code, that is further compiled at runtime into binary code for a specific target device (e.g., CUDA-enabled GPU 4394) by a device driver. In at least one embodiment, CUDA-enabled GPU 4394 may be any processor that is optimized for parallel instruction processing and that supports CUDA. In at least one embodiment, CUDA-enabled GPU 4394 is developed by NVIDIA Corporation of Santa Clara, Calif.

In at least one embodiment, CUDA to HIP translation tool 4320 is configured to translate CUDA source code 4310 to functionally similar HIP source code 4330. In a least one embodiment, HIP source code 4330 is a collection of human-readable code in a HIP programming language. In at least one embodiment, HIP code is human-readable code in a HIP programming language. In at least one embodiment, a HIP programming language is an extension of the C++ programming language that includes, without limitation, functionally similar versions of CUDA mechanisms to define device code and distinguish between device code and host code. In at least one embodiment, a HIP programming language may include a subset of functionality of a CUDA programming language. In at least one embodiment, for example, a HIP programming language includes, without limitation, mechanism(s) to define global functions 4312, but such a HIP programming language may lack support for dynamic parallelism and therefore global functions 4312 defined in HIP code may be callable from a host only.

In at least one embodiment, HIP source code 4330 includes, without limitation, any number (including zero) of global functions 4312, any number (including zero) of device functions 4314, any number (including zero) of host functions 4316, and any number (including zero) of host/device functions 4318. In at least one embodiment, HIP source code 4330 may also include any number of calls to any number of functions that are specified in a HIP runtime API 4332. In at least one embodiment, HIP runtime API 4332 includes, without limitation, functionally similar versions of a subset of functions included in CUDA runtime API 4302. In at least one embodiment, HIP source code 4330 may also include any number of calls to any number of functions that are specified in any number of other HIP APIs. In at least one embodiment, a HIP API may be any API that is designed for use by HIP code and/or ROCm. In at least one embodiment, HIP APIs include, without limitation, HIP runtime API 4332, a HIP driver API, APIs for any number of HIP libraries, APIs for any number of ROCm libraries, etc.

In at least one embodiment, CUDA to HIP translation tool 4320 converts each kernel call in CUDA code from a CUDA syntax to a HIP syntax and converts any number of other CUDA calls in CUDA code to any number of other functionally similar HIP calls. In at least one embodiment, a CUDA call is a call to a function specified in a CUDA API, and a HIP call is a call to a function specified in a HIP API. In at least one embodiment, CUDA to HIP translation tool 4320 converts any number of calls to functions specified in CUDA runtime API 4302 to any number of calls to functions specified in HIP runtime API 4332.

In at least one embodiment, CUDA to HIP translation tool 4320 is a tool known as hipify-perl that executes a text-based translation process. In at least one embodiment, CUDA to HIP translation tool 4320 is a tool known as hipify-clang that, relative to hipify-perl, executes a more complex and more robust translation process that involves parsing CUDA code using clang (a compiler front-end) and then translating resulting symbols. In at least one embodiment, properly converting CUDA code to HIP code may require modifications (e.g., manual edits) in addition to those performed by CUDA to HIP translation tool 4320.

In at least one embodiment, HIP compiler driver 4340 is a front end that determines a target device 4346 and then configure s a compiler that is compatible with target device 4346 to compile HIP source code 4330. In at least one embodiment, target device 4346 is a processor that is optimized for parallel instruction processing. In at least one embodiment, HIP compiler driver 4340 may determine target device 4346 in any technically feasible fashion.

In at least one embodiment, if target device 4346 is compatible with CUDA (e.g., CUDA-enabled GPU 4394), then HIP compiler driver 4340 generates a HIP/NVCC compilation command 4342. In at least one embodiment and as described in greater detail in conjunction with FIG. 43B, HIP/NVCC compilation command 4342 configure s CUDA compiler 4350 to compile HIP source code 4330 using, without limitation, a HIP to CUDA translation header and a CUDA runtime library. In at least one embodiment and in response to HIP/NVCC compilation command 4342, CUDA compiler 4350 generates host executable code 4370(1) and CUDA device executable code 4384.

In at least one embodiment, if target device 4346 is not compatible with CUDA, then HIP compiler driver 4340 generates a HIP/HCC compilation command 4344. In at least one embodiment and as described in greater detail in conjunction with FIG. 43C, HIP/HCC compilation command 4344 configure s HCC 4360 to compile HIP source code 4330 using, without limitation, an HCC header and a HIP/HCC runtime library. In at least one embodiment and in response to HIP/HCC compilation command 4344, HCC 4360 generates host executable code 4370(2) and HCC device executable code 4382. In at least one embodiment, HCC device executable code 4382 is a compiled version of device code included in HIP source code 4330 that is executable on GPU 4392. In at least one embodiment, GPU 4392 may be any processor that is optimized for parallel instruction processing, is not compatible with CUDA, and is compatible with HCC. In at least one embodiment, GPU 4392 is developed by AMD Corporation of Santa Clara, Calif. In at least one embodiment GPU, 4392 is a non-CUDA-enabled GPU 4392.

For explanatory purposes only, three different flows that may be implemented in at least one embodiment to compile CUDA source code 4310 for execution on CPU 4390 and different devices are depicted in FIG. 43A. In at least one embodiment, a direct CUDA flow compiles CUDA source code 4310 for execution on CPU 4390 and CUDA-enabled GPU 4394 without translating CUDA source code 4310 to HIP source code 4330. In at least one embodiment, an indirect CUDA flow translates CUDA source code 4310 to HIP source code 4330 and then compiles HIP source code 4330 for execution on CPU 4390 and CUDA-enabled GPU 4394. In at least one embodiment, a CUDA/HCC flow translates CUDA source code 4310 to HIP source code 4330 and then compiles HIP source code 4330 for execution on CPU 4390 and GPU 4392.

A direct CUDA flow that may be implemented in at least one embodiment is depicted via dashed lines and a series of bubbles annotated A1-A3. In at least one embodiment and as depicted with bubble annotated A1, CUDA compiler 4350 receives CUDA source code 4310 and a CUDA compile command 4348 that configure s CUDA compiler 4350 to compile CUDA source code 4310. In at least one embodiment, CUDA source code 4310 used in a direct CUDA flow is written in a CUDA programming language that is based on a programming language other than C++ (e.g., C, Fortran, Python, Java, etc.). In at least one embodiment and in response to CUDA compile command 4348, CUDA compiler 4350 generates host executable code 4370(1) and CUDA device executable code 4384 (depicted with bubble annotated A2). In at least one embodiment and as depicted with bubble annotated A3, host executable code 4370(1) and CUDA device executable code 4384 may be executed on, respectively, CPU 4390 and CUDA-enabled GPU 4394. In at least one embodiment, CUDA device executable code 4384 includes, without limitation, binary code. In at least one embodiment, CUDA device executable code 4384 includes, without limitation, PTX code and is further compiled into binary code for a specific target device at runtime.

An indirect CUDA flow that may be implemented in at least one embodiment is depicted via dotted lines and a series of bubbles annotated B1-B6. In at least one embodiment and as depicted with bubble annotated B1, CUDA to HIP translation tool 4320 receives CUDA source code 4310. In at least one embodiment and as depicted with bubble annotated B2, CUDA to HIP translation tool 4320 translates CUDA source code 4310 to HIP source code 4330. In at least one embodiment and as depicted with bubble annotated B3, HIP compiler driver 4340 receives HIP source code 4330 and determines that target device 4346 is CUDA-enabled.

In at least one embodiment and as depicted with bubble annotated B4, HIP compiler driver 4340 generates HIP/NVCC compilation command 4342 and transmits both HIP/NVCC compilation command 4342 and HIP source code 4330 to CUDA compiler 4350. In at least one embodiment and as described in greater detail in conjunction with FIG. 43B, HIP/NVCC compilation command 4342 configure s CUDA compiler 4350 to compile HIP source code 4330 using, without limitation, a HIP to CUDA translation header and a CUDA runtime library. In at least one embodiment and in response to HIP/NVCC compilation command 4342, CUDA compiler 4350 generates host executable code 4370(1) and CUDA device executable code 4384 (depicted with bubble annotated B5). In at least one embodiment and as depicted with bubble annotated B6, host executable code 4370(1) and CUDA device executable code 4384 may be executed on, respectively, CPU 4390 and CUDA-enabled GPU 4394. In at least one embodiment, CUDA device executable code 4384 includes, without limitation, binary code. In at least one embodiment, CUDA device executable code 4384 includes, without limitation, PTX code and is further compiled into binary code for a specific target device at runtime.

A CUDA/HCC flow that may be implemented in at least one embodiment is depicted via solid lines and a series of bubbles annotated C1-C6. In at least one embodiment and as depicted with bubble annotated C1, CUDA to HIP translation tool 4320 receives CUDA source code 4310. In at least one embodiment and as depicted with bubble annotated C2, CUDA to HIP translation tool 4320 translates CUDA source code 4310 to HIP source code 4330. In at least one embodiment and as depicted with bubble annotated C3, HIP compiler driver 4340 receives HIP source code 4330 and determines that target device 4346 is not CUDA-enabled.

In at least one embodiment, HIP compiler driver 4340 generates HIP/HCC compilation command 4344 and transmits both HIP/HCC compilation command 4344 and HIP source code 4330 to HCC 4360 (depicted with bubble annotated C4). In at least one embodiment and as described in greater detail in conjunction with FIG. 43C, HIP/HCC compilation command 4344 configure s HCC 4360 to compile HIP source code 4330 using, without limitation, an HCC header and a HIP/HCC runtime library. In at least one embodiment and in response to HIP/HCC compilation command 4344, HCC 4360 generates host executable code 4370(2) and HCC device executable code 4382 (depicted with bubble annotated C5). In at least one embodiment and as depicted with bubble annotated C6, host executable code 4370(2) and HCC device executable code 4382 may be executed on, respectively, CPU 4390 and GPU 4392.

In at least one embodiment, after CUDA source code 4310 is translated to HIP source code 4330, HIP compiler driver 4340 may subsequently be used to generate executable code for either CUDA-enabled GPU 4394 or GPU 4392 without re-executing CUDA to HIP translation tool 4320. In at least one embodiment, CUDA to HIP translation tool 4320 translates CUDA source code 4310 to HIP source code 4330 that is then stored in memory. In at least one embodiment, HIP compiler driver 4340 then configure s HCC 4360 to generate host executable code 4370(2) and HCC device executable code 4382 based on HIP source code 4330. In at least one embodiment, HIP compiler driver 4340 subsequently configure s CUDA compiler 4350 to generate host executable code 4370(1) and CUDA device executable code 4384 based on stored HIP source code 4330.

Figure 43B:
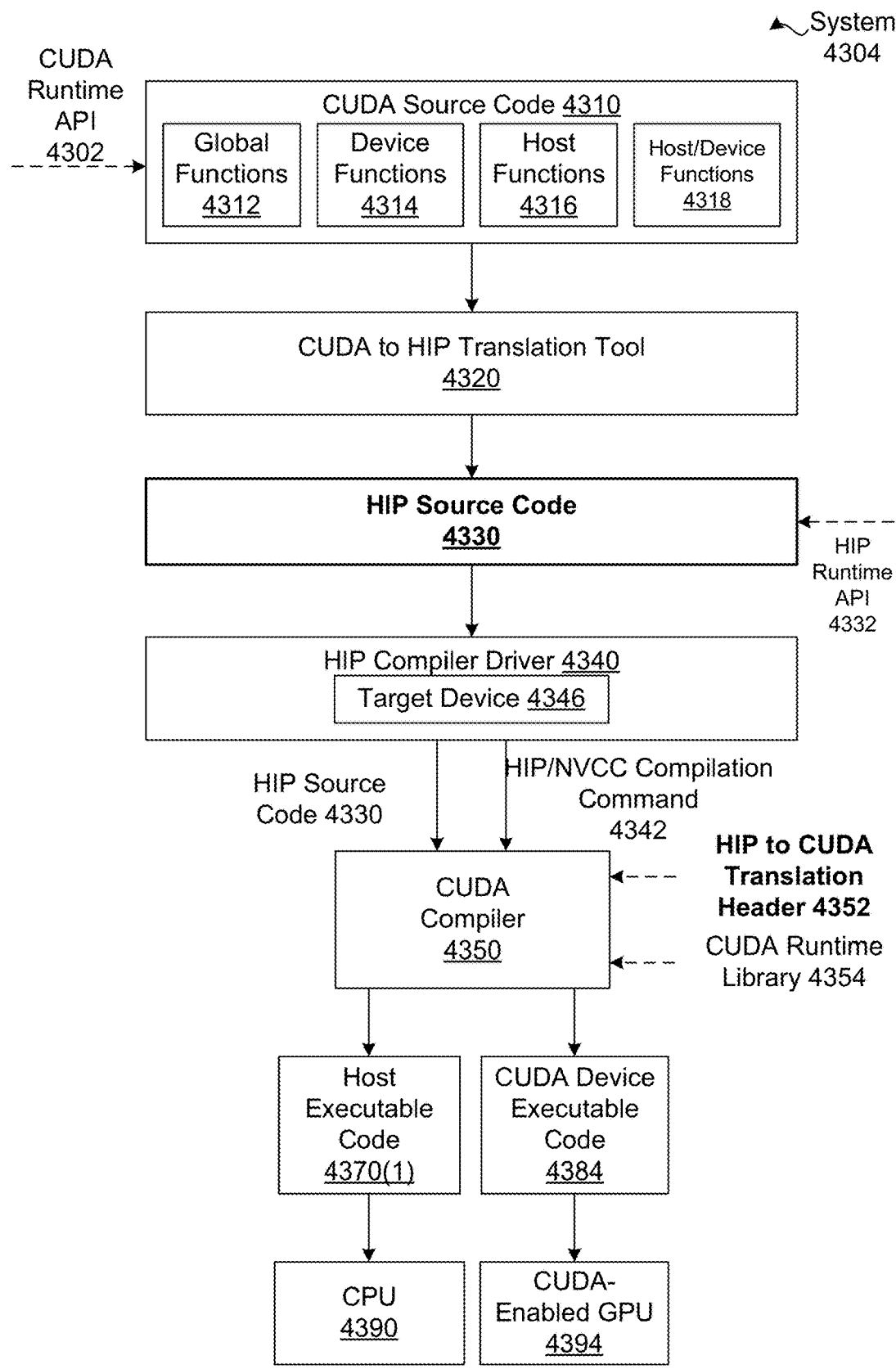
FIG. 43B illustrates a system configured to compile and execute CUDA source code of FIG. 43A using a CPU and a CUDA-enabled GPU, in accordance with at least one embodiment.

FIG. 43B illustrates a system 4304 configured to compile and execute CUDA source code 4310 of FIG. 43A using CPU 4390 and CUDA-enabled GPU 4394, in accordance with at least one embodiment. In at least one embodiment, system 4304 includes, without limitation, CUDA source code 4310, CUDA to HIP translation tool 4320, HIP source code 4330, HIP compiler driver 4340, CUDA compiler 4350, host executable code 4370(1), CUDA device executable code 4384, CPU 4390, and CUDA-enabled GPU 4394.

In at least one embodiment and as described previously herein in conjunction with FIG. 43A, CUDA source code 4310 includes, without limitation, any number (including zero) of global functions 4312, any number (including zero) of device functions 4314, any number (including zero) of host functions 4316, and any number (including zero) of host/device functions 4318. In at least one embodiment, CUDA source code 4310 also includes, without limitation, any number of calls to any number of functions that are specified in any number of CUDA APIs.

In at least one embodiment, CUDA to HIP translation tool 4320 translates CUDA source code 4310 to HIP source code 4330. In at least one embodiment, CUDA to HIP translation tool 4320 converts each kernel call in CUDA source code 4310 from a CUDA syntax to a HIP syntax and converts any number of other CUDA calls in CUDA source code 4310 to any number of other functionally similar HIP calls.

In at least one embodiment, HIP compiler driver 4340 determines that target device 4346 is CUDA-enabled and generates HIP/NVCC compilation command 4342. In at least one embodiment, HIP compiler driver 4340 then configure s CUDA compiler 4350 via HIP/NVCC compilation command 4342 to compile HIP source code 4330. In at least one embodiment, HIP compiler driver 4340 provides access to a HIP to CUDA translation header 4352 as part of configuring CUDA compiler 4350. In at least one embodiment, HIP to CUDA translation header 4352 translates any number of mechanisms (e.g., functions) specified in any number of HIP APIs to any number of mechanisms specified in any number of CUDA APIs. In at least one embodiment, CUDA compiler 4350 uses HIP to CUDA translation header 4352 in conjunction with a CUDA runtime library 4354 corresponding to CUDA runtime API 4302 to generate host executable code 4370(1) and CUDA device executable code 4384. In at least one embodiment, host executable code 4370(1) and CUDA device executable code 4384 may then be executed on, respectively, CPU 4390 and CUDA-enabled GPU 4394. In at least one embodiment, CUDA device executable code 4384 includes, without limitation, binary code. In at least one embodiment, CUDA device executable code 4384 includes, without limitation, PTX code and is further compiled into binary code for a specific target device at runtime.

Figure 43C:
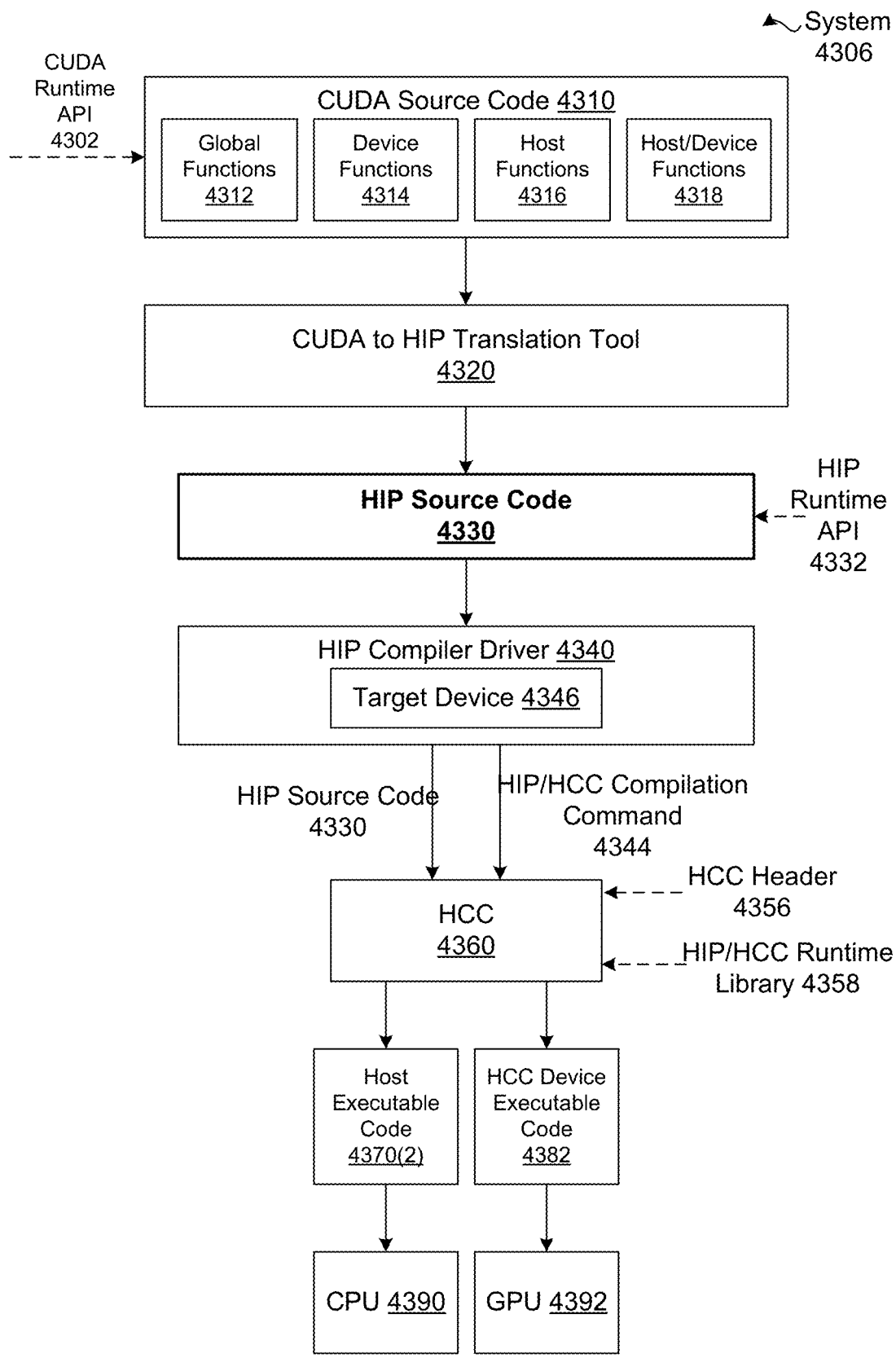
FIG. 43C illustrates a system configured to compile and execute CUDA source code of FIG. 43A using a CPU and a non-CUDA-enabled GPU, in accordance with at least one embodiment.

FIG. 43C illustrates a system 4306 configured to compile and execute CUDA source code 4310 of FIG. 43A using CPU 4390 and non-CUDA-enabled GPU 4392, in accordance with at least one embodiment. In at least one embodiment, system 4306 includes, without limitation, CUDA source code 4310, CUDA to HIP translation tool 4320, HIP source code 4330, HIP compiler driver 4340, HCC 4360, host executable code 4370(2), HCC device executable code 4382, CPU 4390, and GPU 4392.

In at least one embodiment and as described previously herein in conjunction with FIG. 43A, CUDA source code 4310 includes, without limitation, any number (including zero) of global functions 4312, any number (including zero) of device functions 4314, any number (including zero) of host functions 4316, and any number (including zero) of host/device functions 4318. In at least one embodiment, CUDA source code 4310 also includes, without limitation, any number of calls to any number of functions that are specified in any number of CUDA APIs.

In at least one embodiment, CUDA to HIP translation tool 4320 translates CUDA source code 4310 to HIP source code 4330. In at least one embodiment, CUDA to HIP translation tool 4320 converts each kernel call in CUDA source code 4310 from a CUDA syntax to a HIP syntax and converts any number of other CUDA calls in source code 4310 to any number of other functionally similar HIP calls.

In at least one embodiment, HIP compiler driver 4340 subsequently determines that target device 4346 is not CUDA-enabled and generates HIP/HCC compilation command 4344. In at least one embodiment, HIP compiler driver 4340 then configure s HCC 4360 to execute HIP/HCC compilation command 4344 to compile HIP source code 4330. In at least one embodiment, HIP/HCC compilation command 4344 configure s HCC 4360 to use, without limitation, a HIP/HCC runtime library 4358 and an HCC header 4356 to generate host executable code 4370(2) and HCC device executable code 4382. In at least one embodiment, HIP/HCC runtime library 4358 corresponds to HIP runtime API 4332. In at least one embodiment, HCC header 4356 includes, without limitation, any number and type of interoperability mechanisms for HIP and HCC. In at least one embodiment, host executable code 4370(2) and HCC device executable code 4382 may be executed on, respectively, CPU 4390 and GPU 4392.

Figure 44:
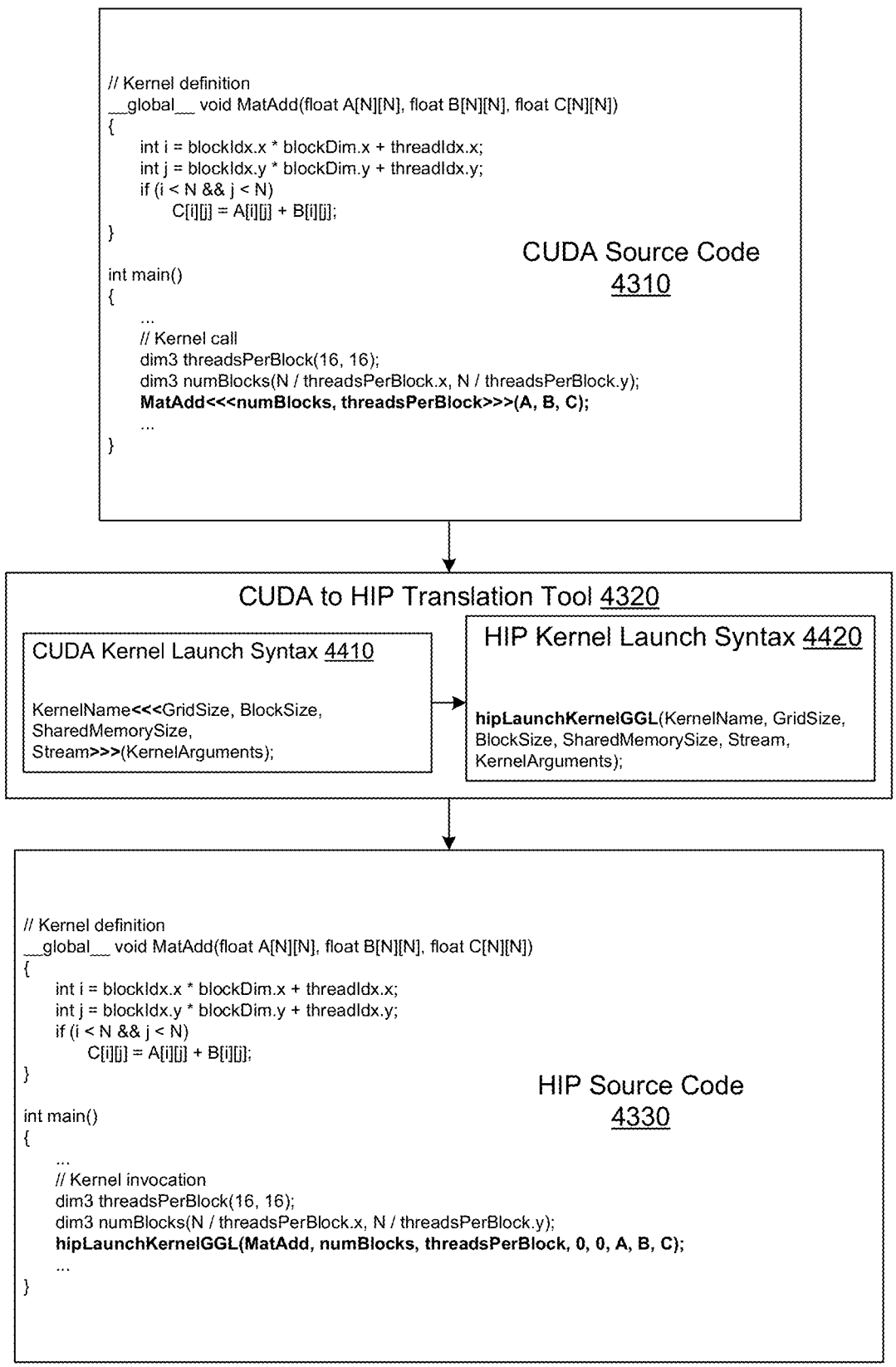
FIG. 44 illustrates an exemplary kernel translated by CUDA-to-HIP translation tool of FIG. 43C, in accordance with at least one embodiment.

FIG. 44 illustrates an exemplary kernel translated by CUDA-to-HIP translation tool 4320 of FIG. 43C, in accordance with at least one embodiment. In at least one embodiment, CUDA source code 4310 partitions an overall problem that a given kernel is designed to solve into relatively coarse sub-problems that can independently be solved using thread blocks. In at least one embodiment, each thread block includes, without limitation, any number of threads. In at least one embodiment, each sub-problem is partitioned into relatively fine pieces that can be solved cooperatively in parallel by threads within a thread block. In at least one embodiment, threads within a thread block can cooperate by sharing data through shared memory and by synchronizing execution to coordinate memory accesses.

In at least one embodiment, CUDA source code 4310 organizes thread blocks associated with a given kernel into a one-dimensional, a two-dimensional, or a three-dimensional grid of thread blocks. In at least one embodiment, each thread block includes, without limitation, any number of threads, and a grid includes, without limitation, any number of thread blocks.

In at least one embodiment, a kernel is a function in device code that is defined using a "_global_" declaration specifier. In at least one embodiment, the dimension of a grid that executes a kernel for a given kernel call and associated streams are specified using a CUDA kernel launch syntax 4410. In at least one embodiment, CUDA kernel launch syntax 4410 is specified as "KernelName<<<GridSize, BlockSize, SharedMemorySize, Stream>>>(KernelArguments);". In at least one embodiment, an execution configuration syntax is a "<<< . . . >>>" construct that is inserted between a kernel name ("KernelName") and a parenthesized list of kernel arguments ("KernelArguments"). In at least one embodiment, CUDA kernel launch syntax 4410 includes, without limitation, a CUDA launch function syntax instead of an execution configuration syntax.

In at least one embodiment, "GridSize" is of a type dim3 and specifies the dimension and size of a grid. In at least one embodiment, type dim3 is a CUDA-defined structure that includes, without limitation, unsigned integers x, y, and z. In at least one embodiment, if z is not specified, then z defaults to one. In at least one embodiment, if y is not specified, then y defaults to one. In at least one embodiment, the number of thread blocks in a grid is equal to the product of GridSize.x, GridSize.y, and GridSize.z. In at least one embodiment, "BlockSize" is of type dim3 and specifies the dimension and size of each thread block. In at least one embodiment, the number of threads per thread block is equal to the product of BlockSize.x, BlockSize.y, and BlockSize.z. In at least one embodiment, each thread that executes a kernel is given a unique thread ID that is accessible within the kernel through a built-in variable (e.g., "threadIdx").

In at least one embodiment and with respect to CUDA kernel launch syntax 4410, "SharedMemorySize" is an optional argument that specifies a number of bytes in a shared memory that is dynamically allocated per thread block for a given kernel call in addition to statically allocated memory. In at least one embodiment and with respect to CUDA kernel launch syntax 4410, SharedMemorySize defaults to zero. In at least one embodiment and with respect to CUDA kernel launch syntax 4410, "Stream" is an optional argument that specifies an associated stream and defaults to zero to specify a default stream. In at least one embodiment, a stream is a sequence of commands (possibly issued by different host threads) that execute in order. In at least one embodiment, different streams may execute commands out of order with respect to one another or concurrently.

In at least one embodiment, CUDA source code 4310 includes, without limitation, a kernel definition for an exemplary kernel "MatAdd" and a main function. In at least one embodiment, main function is host code that executes on a host and includes, without limitation, a kernel call that causes kernel MatAdd to execute on a device. In at least one embodiment and as shown, kernel MatAdd adds two matrices A and B of size N×N, where N is a positive integer, and stores the result in a matrix C. In at least one embodiment, main function defines a threadsPerBlock variable as 16 by 16 and a numBlocks variable as N/16 by N/16. In at least one embodiment, main function then specifies kernel call "MatAdd<<<numBlocks, threadsPerBlock>>>(A, B, C);". In at least one embodiment and as per CUDA kernel launch syntax 4410, kernel MatAdd is executed using a grid of thread blocks having a dimension N/16 by N/16, where each thread block has a dimension of 16 by 16. In at least one embodiment, each thread block includes 256 threads, a grid is created with enough blocks to have one thread per matrix element, and each thread in such a grid executes kernel MatAdd to perform one pair-wise addition.

In at least one embodiment, while translating CUDA source code 4310 to HIP source code 4330, CUDA to HIP translation tool 4320 translates each kernel call in CUDA source code 4310 from CUDA kernel launch syntax 4410 to a HIP kernel launch syntax 4420 and converts any number of other CUDA calls in source code 4310 to any number of other functionally similar HIP calls. In at least one embodiment, HIP kernel launch syntax 4420 is specified as "hipLaunchKernelGGL(KernelName, GridSize, BlockSize, SharedMemorySize, Stream, KernelArguments);". In at least one embodiment, each of KernelName, GridSize, BlockSize, ShareMemorySize, Stream, and KernelArguments has the same meaning in HIP kernel launch syntax 4420 as in CUDA kernel launch syntax 4410 (described previously herein). In at least one embodiment, arguments SharedMemorySize and Stream are required in HIP kernel launch syntax 4420 and are optional in CUDA kernel launch syntax 4410.

In at least one embodiment, a portion of HIP source code 4330 depicted in FIG. 44 is identical to a portion of CUDA source code 4310 depicted in FIG. 44 except for a kernel call that causes kernel MatAdd to execute on a device. In at least one embodiment, kernel MatAdd is defined in HIP source code 4330 with the same "_global_" declaration specifier with which kernel MatAdd is defined in CUDA source code 4310. In at least one embodiment, a kernel call in HIP source code 4330 is "hipLaunchKernelGGL(MatAdd, numBlocks, threadsPerBlock, 0, 0, A, B, C);", while a corresponding kernel call in CUDA source code 4310 is "MatAdd<<<numBlocks, threadsPerBlock>>>(A, B, C);".

Figure 45:
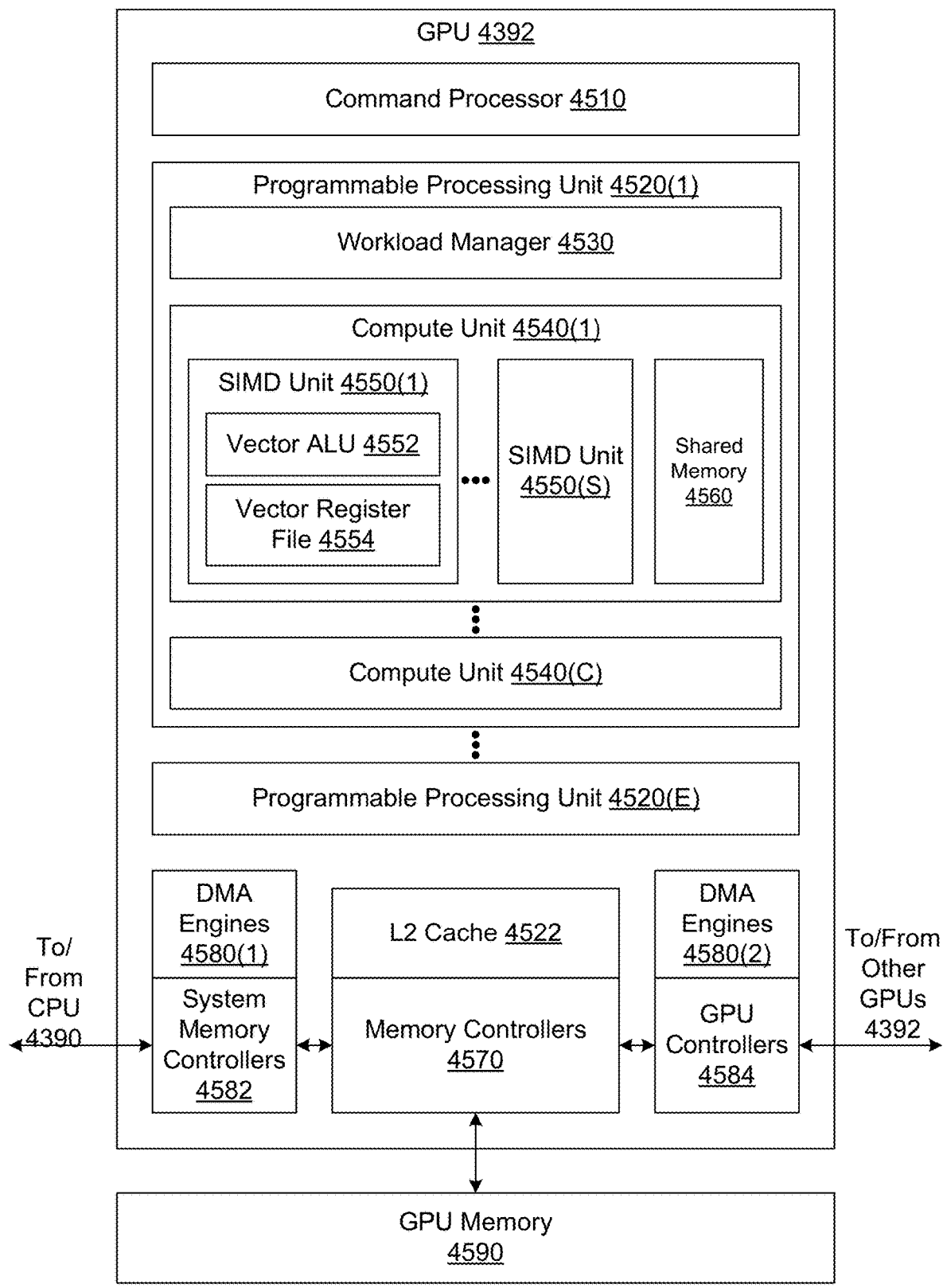
FIG. 45 illustrates non-CUDA-enabled GPU of FIG. 43C in greater detail, in accordance with at least one embodiment.

FIG. 45 illustrates non-CUDA-enabled GPU 4392 of FIG. 43C in greater detail, in accordance with at least one embodiment. In at least one embodiment, GPU 4392 is developed by AMD corporation of Santa Clara. In at least one embodiment, GPU 4392 can be configured to perform compute operations in a highly-parallel fashion. In at least one embodiment, GPU 4392 is configured to execute graphics pipeline operations such as draw commands, pixel operations, geometric computations, and other operations associated with rendering an image to a display. In at least one embodiment, GPU 4392 is configured to execute operations unrelated to graphics. In at least one embodiment, GPU 4392 is configured to execute both operations related to graphics and operations unrelated to graphics. In at least one embodiment, GPU 4392 can be configured to execute device code included in HIP source code 4330.

In at least one embodiment, GPU 4392 includes, without limitation, any number of programmable processing units 4520(1)-4520(E), a command processor 4510, an L2 cache 4522, memory controllers 4570, DMA engines 4580(1), system memory controllers 4582, DMA engines 4580(2), and GPU controllers 4584. In at least one embodiment, each programmable processing unit 4520 includes, without limitation, a workload manager 4530 and any number of compute units 4540. In at least one embodiment, command processor 4510 reads commands from one or more command queues (not shown) and distributes commands to workload managers 4530. In at least one embodiment, for each programmable processing unit 4520, associated workload manager 4530 distributes work to compute units 4540 included in programmable processing unit 4520. In at least one embodiment, each compute unit 4540 may execute any number of thread blocks, but each thread block executes on a single compute unit 4540. In at least one embodiment, a workgroup is a thread block.

In at least one embodiment, each compute unit 4540 includes, without limitation, any number of SIMD units 4550(1)-4550(S) and a shared memory 4560. In at least one embodiment, each SIMD unit 4550 implements a SIMD architecture and is configured to perform operations in parallel. In at least one embodiment, each SIMD unit 4550 includes, without limitation, a vector ALU 4552 and a vector register file 4554. In at least one embodiment, each SIMD unit 4550 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 4560.

In at least one embodiment, programmable processing units 4520 are referred to as "shader engines." In at least one embodiment, each programmable processing unit 4520 includes, without limitation, any amount of dedicated graphics hardware in addition to compute units 4540. In at least one embodiment, each programmable processing unit 4520 includes, without limitation, any number (including zero) of geometry processors, any number (including zero) of rasterizers, any number (including zero) of render back ends, workload manager 4530, and any number of compute units 4540.

In at least one embodiment, compute units 4540 share L2 cache 4522. In at least one embodiment, L2 cache 4522 is partitioned. In at least one embodiment, a GPU memory 4590 is accessible by all compute units 4540 in GPU 4392. In at least one embodiment, memory controllers 4570 and system memory controllers 4582 facilitate data transfers between GPU 4392 and a host, and DMA engines 4580(1) enable asynchronous memory transfers between GPU 4392 and such a host. In at least one embodiment, memory controllers 4570 and GPU controllers 4584 facilitate data transfers between GPU 4392 and other GPUs 4392, and DMA engines 4580(2) enable asynchronous memory transfers between GPU 4392 and other GPUs 4392.

In at least one embodiment, GPU 4392 includes, without limitation, any amount and type of system interconnect that facilitates data and control transmissions across any number and type of directly or indirectly linked components that may be internal or external to GPU 4392. In at least one embodiment, GPU 4392 includes, without limitation, any number and type of I/O interfaces (e.g., PCIe) that are coupled to any number and type of peripheral devices. In at least one embodiment, GPU 4392 may include, without limitation, any number (including zero) of display engines and any number (including zero) of multimedia engines. In at least one embodiment, GPU 4392 implements a memory subsystem that includes, without limitation, any amount and type of memory controllers (e.g., memory controllers 4570 and system memory controllers 4582) and memory devices (e.g., shared memories 4560) that may be dedicated to one component or shared among multiple components. In at least one embodiment, GPU 4392 implements a cache subsystem that includes, without limitation, one or more cache memories (e.g., L2 cache 4522) that may each be private to or shared between any number of components (e.g., SIMD units 4550, compute units 4540, and programmable processing units 4520).

Figure 46:
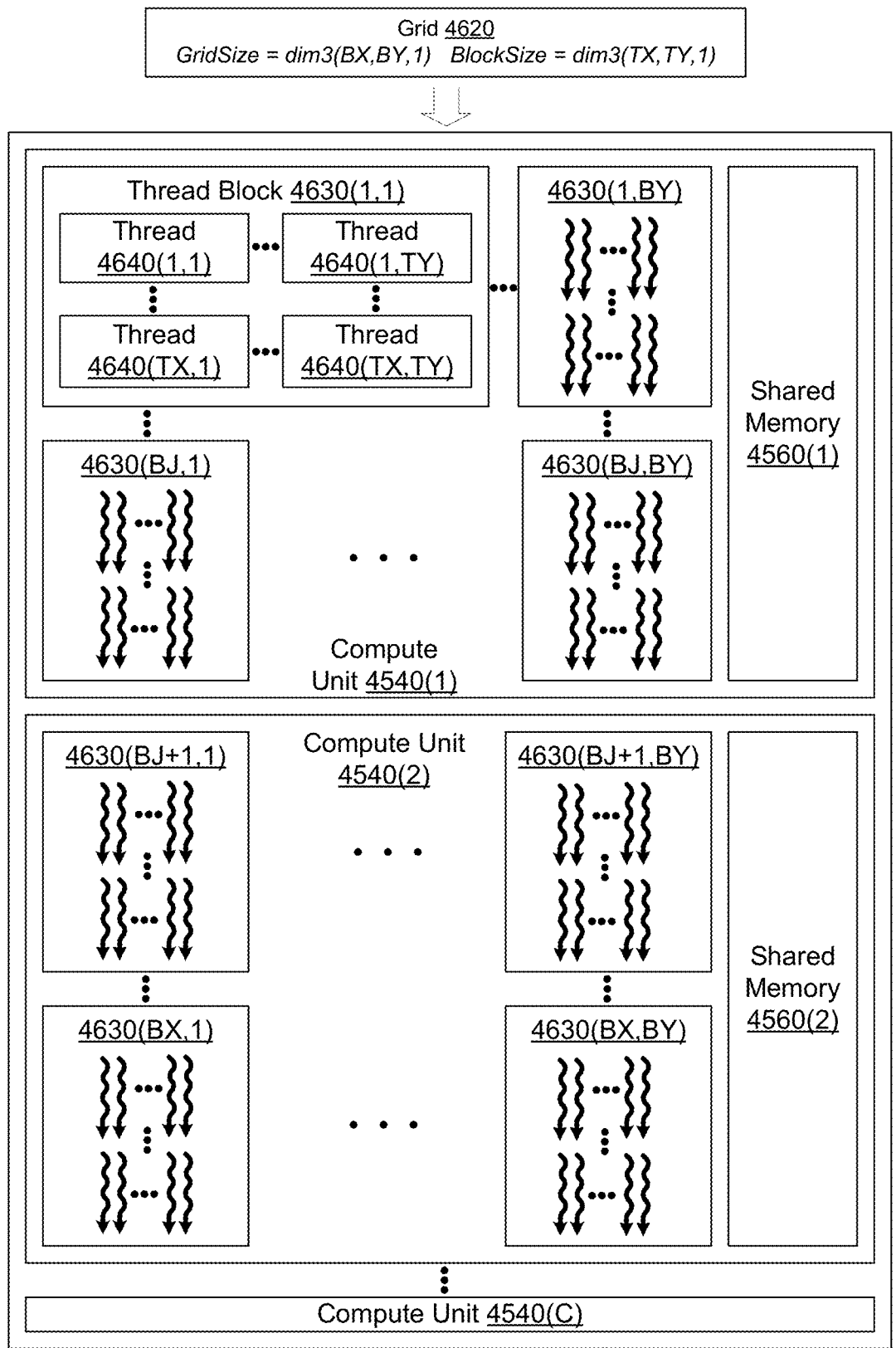
FIG. 46 illustrates how threads of an exemplary CUDA grid are mapped to different compute units of FIG. 45, in accordance with at least one embodiment.

FIG. 46 illustrates how threads of an exemplary CUDA grid 4620 are mapped to different compute units 4540 of FIG. 45, in accordance with at least one embodiment. In at least one embodiment and for explanatory purposes only, grid 4620 has a GridSize of BX by BY by 1 and a BlockSize of TX by TY by 1. In at least one embodiment, grid 4620 therefore includes, without limitation, (BX*BY) thread blocks 4630 and each thread block 4630 includes, without limitation, (TX*TY) threads 4640. Threads 4640 are depicted in FIG. 46 as squiggly arrows.

In at least one embodiment, grid 4620 is mapped to programmable processing unit 4520(1) that includes, without limitation, compute units 4540(1)-4540(C). In at least one embodiment and as shown, (BJ*BY) thread blocks 4630 are mapped to compute unit 4540(1), and the remaining thread blocks 4630 are mapped to compute unit 4540(2). In at least one embodiment, each thread block 4630 may include, without limitation, any number of warps, and each warp is mapped to a different SIMD unit 4550 of FIG. 45.

In at least one embodiment, warps in a given thread block 4630 may synchronize together and communicate through shared memory 4560 included in associated compute unit 4540. For example and in at least one embodiment, warps in thread block 4630(BJ,1) can synchronize together and communicate through shared memory 4560(1). For example and in at least one embodiment, warps in thread block 4630(BJ+1,1) can synchronize together and communicate through shared memory 4560(2).

Figure 47:
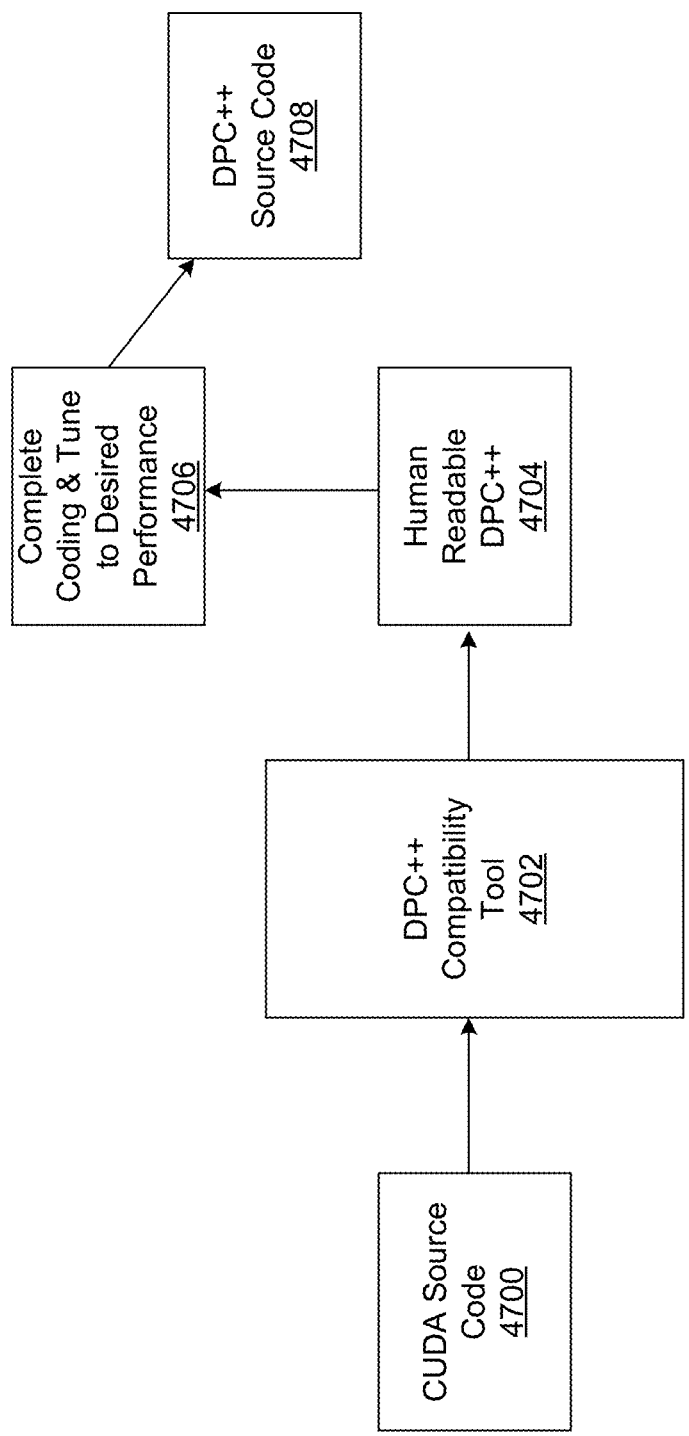
FIG. 47 illustrates how to migrate existing CUDA code to Data Parallel C++ code, in accordance with at least one embodiment.

FIG. 47 illustrates how to migrate existing CUDA code to Data Parallel C++ code, in accordance with at least one embodiment. Data Parallel C++ (DPC++) may refer to an open, standards-based alternative to single-architecture proprietary languages that allows developers to reuse code across hardware targets (CPUs and accelerators such as GPUs and FPGAs) and also perform custom tuning for a specific accelerator. DPC++ use similar and/or identical C and C++ constructs in accordance with ISO C++ which developers may be familiar with. DPC++ incorporates standard SYCL from The Khronos Group to support data parallelism and heterogeneous programming. SYCL refers to a cross-platform abstraction layer that builds on underlying concepts, portability and efficiency of OpenCL that enables code for heterogeneous processors to be written in a "single-source" style using standard C++. SYCL may enable single source development where C++ template functions can contain both host and device code to construct complex algorithms that use OpenCL acceleration, and then re-use them throughout their source code on different types of data.

In at least one embodiment, a DPC++ compiler is used to compile DPC++ source code which can be deployed across diverse hardware targets. In at least one embodiment, a DPC++ compiler is used to generate DPC++ applications that can be deployed across diverse hardware targets and a DPC++ compatibility tool can be used to migrate CUDA applications to a multiplatform program in DPC++. In at least one embodiment, a DPC++ base tool kit includes a DPC++ compiler to deploy applications across diverse hardware targets; a DPC++ library to increase productivity and performance across CPUs, GPUs, and FPGAs; a DPC++ compatibility tool to migrate CUDA applications to multiplatform applications; and any suitable combination thereof.

In at least one embodiment, a DPC++ programming model is utilized to simply one or more aspects relating to programming CPUs and accelerators by using modern C++ features to express parallelism with a programming language called Data Parallel C++. DPC++ programming language may be utilized to code reuse for hosts (e.g., a CPU) and accelerators (e.g., a GPU or FPGA) using a single source language, with execution and memory dependencies being clearly communicated. Mappings within DPC++ code can be used to transition an application to run on a hardware or set of hardware devices that best accelerates a workload. A host may be available to simplify development and debugging of device code, even on platforms that do not have an accelerator available.

In at least one embodiment, CUDA source code 4700 is provided as an input to a DPC++ compatibility tool 4702 to generate human readable DPC++ 4704. In at least one embodiment, human readable DPC++ 4704 includes inline comments generated by DPC++ compatibility tool 4702 that guides a developer on how and/or where to modify DPC++ code to complete coding and tuning to desired performance 4706, thereby generating DPC++ source code 4708.

In at least one embodiment, CUDA source code 4700 is or includes a collection of human-readable source code in a CUDA programming language. In at least one embodiment, CUDA source code 4700 is human-readable source code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable on a device (e.g., GPU or FPGA) and may include or more parallelizable workflows that can be executed on one or more processor cores of a device. In at least one embodiment, a device may be a processor that is optimized for parallel instruction processing, such as CUDA-enabled GPU, GPU, or another GPGPU, etc. In at least one embodiment, host code is source code that, after compilation, is executable on a host. In least one embodiment, some or all of host code and device code can be executed in parallel across a CPU and GPU/FPGA. In at least one embodiment, a host is a processor that is optimized for sequential instruction processing, such as CPU. CUDA source code 4700 described in connection with FIG. 47 may be in accordance with those discussed elsewhere in this document.

In at least one embodiment, DPC++ compatibility tool 4702 refers to an executable tool, program, application, or any other suitable type of tool that is used to facilitate migration of CUDA source code 4700 to DPC++ source code 4708. In at least one embodiment, DPC++ compatibility tool 4702 is a command-line-based code migration tool available as part of a DPC++ tool kit that is used to port existing CUDA sources to DPC++. In at least one embodiment, DPC++ compatibility tool 4702 converts some or all source code of a CUDA application from CUDA to DPC++ and generates a resulting file that is written at least partially in DPC++, referred to as human readable DPC++ 4704. In at least one embodiment, human readable DPC++ 4704 includes comments that are generated by DPC++ compatibility tool 4702 to indicate where user intervention may be necessary. In at least one embodiment, user intervention is necessary when CUDA source code 4700 calls a CUDA API that has no analogous DPC++ API; other examples where user intervention is required are discussed later in greater detail.

In at least one embodiment, a workflow for migrating CUDA source code 4700 (e.g., application or portion thereof) includes creating one or more compilation database files; migrating CUDA to DPC++ using a DPC++ compatibility tool 4702; completing migration and verifying correctness, thereby generating DPC++ source code 4708; and compiling DPC++ source code 4708 with a DPC++ compiler to generate a DPC++ application. In at least one embodiment, a compatibility tool provides a utility that intercepts commands used when Makefile executes and stores them in a compilation database file. In at least one embodiment, a file is stored in JSON format. In at least one embodiment, an intercept-built command converts Makefile command to a DPC compatibility command.

In at least one embodiment, intercept-build is a utility script that intercepts a build process to capture compilation options, macro defs, and include paths, and writes this data to a compilation database file. In at least one embodiment, a compilation database file is a JSON file. In at least one embodiment, DPC++ compatibility tool 4702 parses a compilation database and applies options when migrating input sources. In at least one embodiment, use of intercept-build is optional, but highly recommended for Make or CMake based environments. In at least one embodiment, a migration database includes commands, directories, and files: command may include necessary compilation flags; directory may include paths to header files; file may include paths to CUDA files.

In at least one embodiment, DPC++ compatibility tool 4702 migrates CUDA code (e.g., applications) written in CUDA to DPC++ by generating DPC++ wherever possible. In at least one embodiment, DPC++ compatibility tool 4702 is available as part of a tool kit. In at least one embodiment, a DPC++ tool kit includes an intercept-build tool. In at least one embodiment, an intercept-built tool creates a compilation database that captures compilation commands to migrate CUDA files. In at least one embodiment, a compilation database generated by an intercept-built tool is used by DPC++ compatibility tool 4702 to migrate CUDA code to DPC++. In at least one embodiment, non-CUDA C++ code and files are migrated as is. In at least one embodiment, DPC++ compatibility tool 4702 generates human readable DPC++ 4704 which may be DPC++ code that, as generated by DPC++ compatibility tool 4702, cannot be compiled by DPC++ compiler and requires additional plumbing for verifying portions of code that were not migrated correctly, and may involve manual intervention, such as by a developer. In at least one embodiment, DPC++ compatibility tool 4702 provides hints or tools embedded in code to help developers manually migrate additional code that could not be migrated automatically. In at least one embodiment, migration is a one-time activity for a source file, project, or application.

In at least one embodiment, DPC++ compatibility tool 47002 is able to successfully migrate all portions of CUDA code to DPC++ and there may simply be an optional step for manually verifying and tuning performance of DPC++ source code that was generated. In at least one embodiment, DPC++ compatibility tool 4702 directly generates DPC++ source code 4708 which is compiled by a DPC++ compiler without requiring or utilizing human intervention to modify DPC++ code generated by DPC++ compatibility tool 4702. In at least one embodiment, DPC++ compatibility tool generates compile-able DPC++ code which can be optionally tuned by a developer for performance, readability, maintainability, other various considerations; or any combination thereof.

In at least one embodiment, one or more CUDA source files are migrated to DPC++ source files at least partially using DPC++ compatibility tool 4702. In at least one embodiment, CUDA source code includes one or more header files which may include CUDA header files. In at least one embodiment, a CUDA source file includes a <cuda.h> header file and a <stdio.h> header file which can be used to print text. In at least one embodiment, a portion of a vector addition kernel CUDA source file may be written as or related to:

```
#include <cuda.h>
#include <stdio.h>
#define VECTOR_SIZE 256
[ ] global_void VectorAddKernel(float* A, float* B, float* C)
{
    A[threadIdx.x]=threadIdx.x+1.0f;
    B[threadIdx.x]=threadIdx.x+1.0f;
    C[threadIdx.x]=A[threadIdx.x]+B[threadIdx.x];
}
```

```
int main( )
{
   float *d_A, *d_B, *d_C;
   cudaMalloc(&d_A, VECTOR_SIZE*sizeof(float));
   cudaMalloc(&d_B, VECTOR_SIZE*sizeof(float));
   cudaMalloc(&d_C, VECTOR_SIZE*sizeof(float));
   VectorAddKernel<<<1,      VECTOR_SIZE>>>(d_A,
      d_B, d_C);
   float Result[VECTOR_SIZE]={ };
   cudaMemcpy(Result, d_C, VECTOR_SIZE*sizeof
      (float), cudaMemcpyDeviceToHost);
   cudaFree(d_A);
   cudaFree(d_B);
   cudaFree(d_C);
   for (int i=0; i<VECTOR_SIZE; i++ {
      if (i % 16==0) {
         printf("\n");
      }
      printf("%f", Result[i]);
   }
   return 0;
}
```

In at least one embodiment and in connection with CUDA source file presented above, DPC++ compatibility tool 4702 parses a CUDA source code and replaces header files with appropriate DPC++ and SYCL header files. In at least one embodiment, DPC++ header files includes helper declarations. In CUDA, there is a concept of a thread ID and correspondingly, in DPC++ or SYCL, for each element there is a local identifier.

In at least one embodiment and in connection with CUDA source file presented above, there are two vectors A and B which are initialized and a vector addition result is put into vector C as part of VectorAddKernel( ) In at least one embodiment, DPC++ compatibility tool 4702 converts CUDA thread IDs used to index work elements to SYCL standard addressing for work elements via a local ID as part of migrating CUDA code to DPC++ code. In at least one embodiment, DPC++ code generated by DPC++ compatibility tool 4702 can be optimized—for example, by reducing dimensionality of an nd_item, thereby increasing memory and/or processor utilization.

In at least one embodiment and in connection with CUDA source file presented above, memory allocation is migrated. In at least one embodiment, cudaMalloc( ) is migrated to a unified shared memory SYCL call malloc_device( ) to which a device and context is passed, relying on SYCL concepts such as platform, device, context, and queue. In at least one embodiment, a SYCL platform can have multiple devices (e.g., host and GPU devices); a device may have multiple queues to which jobs can be submitted; each device may have a context; and a context may have multiple devices and manage shared memory objects.

In at least one embodiment and in connection with CUDA source file presented above, a main( ) function invokes or calls VectorAddKernel( ) to add two vectors A and B together and store result in vector C. In at least one embodiment, CUDA code to invoke VectorAddKernel( ) is replaced by DPC++ code to submit a kernel to a command queue for execution. In at least one embodiment, a command group handler cgh passes data, synchronization, and computation that is submitted to the queue, parallel_for is called for a number of global elements and a number of work items in that work group where VectorAddKernel( ) is called.

In at least one embodiment and in connection with CUDA source file presented above, CUDA calls to copy device memory and then free memory for vectors A, B, and C are migrated to corresponding DPC++ calls. In at least one embodiment, C++ code (e.g., standard ISO C++ code for printing a vector of floating point variables) is migrated as is, without being modified by DPC++ compatibility tool 4702. In at least one embodiment, DPC++ compatibility tool 4702 modify CUDA APIs for memory setup and/or host calls to execute kernel on the acceleration device. In at least one embodiment and in connection with CUDA source file presented above, a corresponding human readable DPC++ 4704 (e.g., which can be compiled) is written as or related to:

```
#include <CL/sycl.hpp>
#include <dpct/dpct.hpp>
#define VECTOR_SIZE 256
void VectorAddKernel(float* A, float* B, float* C, sycl::
   nd_item<3>item_ct1)
{
   A[item_ct1.get_local_id(2)]=item_ct1.get_local_id
      (2)+1.0f;
   B[item_ct1.get_local_id(2)]=item_ct1.get_local_id
      (2)+1.0f;
   C[item_ct1.get_local_id(2)]=A[item_ct1.get_local_id
      (2)]+B[item_ct1.get_local_id(2)];
}
int main( )
{
   float *d_A, *d_B, *d_C;
   d_A=(float              *)sycl::malloc_device
      (VECTOR_SIZE*sizeof(float), dpct::get_current_
      device( ), dpct::get_default_context( ));
   d_B=(float              *)sycl::malloc_device
      (VECTOR_SIZE*sizeof(float), dpct::get_current_
      device( ), dpct::get_default_context( ));
   d_C=(float              *)sycl::malloc_device
      (VECTOR_SIZE*sizeof(float), dpct::get_current_
      device( ), dpct::get_default_context( ));
   dpct::get_default_queue_wait( ).submit([&](sycl::han-
      dler &cgh) {
      cgh.parallel_for(
         sycl::nd_range<3>(sycl::range<3>(1, 1, 1) * sycl::
            range<3>(1, 1, VECTOR_SIZE) * sycl::
            range<3>(1, 1, VECTOR_SIZE)),
         [=](sycl::nd_items<3>item_ct1) {
            VectorAddKernel(d_A, d_B, d_C, item_ct1);
         });
   });
   float Result[VECTOR_SIZE]={ };
   dpct::get_default_queue_wait( )
      .memcpy(Result,  d_C,  VECTOR_SIZE*sizeof
         (float)).
      .wait( );
   sycl::free(d_A, dpct::get_default_context( ));
   sycl::free(d_B, dpct::get_default_context( ));
   sycl::free(d_C, dpct::get_default_context( ));
   for (int i=0; i<VECTOR_SIZE; i++ {
      if (i % 16==0) {
         printf("\n");
      }
      printf("%f", Result [i]);
   }
   return 0;
}
```

In at least one embodiment, human readable DPC++ 4704 refers to output generated by DPC++ compatibility tool 4702 and may be optimized in one manner or another. In at least one embodiment, human readable DPC++ 4704 generated by DPC++ compatibility tool 4702 can be manually edited by a developer after migration to make it more maintainable, performance, or other considerations. In at least one embodiment, DPC++ code generated by DPC++ compatibility tool 47002 such as DPC++ disclosed can be optimized by removing repeat calls to get_current_device( ) and/or get_default_context( ) for each malloc_device( ) call. In at least one embodiment, DPC++ code generated above uses a 3 dimensional nd_range which can be refactored to use only a single dimension, thereby reducing memory usage. In at least one embodiment, a developer can manually edit DPC++ code generated by DPC++ compatibility tool 4702 replace uses of unified shared memory with accessors. In at least one embodiment, DPC++ compatibility tool 4702 has an option to change how it migrates CUDA code to DPC++ code. In at least one embodiment, DPC++ compatibility tool 4702 is verbose because it is using a general template to migrate CUDA code to DPC++ code that works for a large number of cases.

In at least one embodiment, a CUDA to DPC++ migration workflow includes steps to: prepare for migration using intercept-build script; perform migration of CUDA projects to DPC++ using DPC++ compatibility tool 4702; review and edit migrated source files manually for completion and correctness; and compile final DPC++ code to generate a DPC++ application. In at least one embodiment, manual review of DPC++ source code may be required in one or more scenarios including but not limited to: migrated API does not return error code (CUDA code can return an error code which can then be consumed by the application but SYCL uses exceptions to report errors, and therefore does not use error codes to surface errors); CUDA compute capability dependent logic is not supported by DPC++; statement could not be removed. In at least one embodiment, scenarios in which DPC++ code requires manual intervention may include, without limitation: error code logic replaced with (*,0) code or commented out; equivalent DPC++ API not available; CUDA compute capability-dependent logic; hardware-dependent API (clock( )); missing features unsupported API; execution time measurement logic; handling built-in vector type conflicts; migration of cuBLAS API; and more.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system, comprising:
    one or more computers having one or more processors to:
        determine one or more forces in a simulation of one or more objects to determine a set of constraints to be satisfied for the simulation where the one or more objects are to be simulated using a force-based formulation, wherein the set of constraints include at least one of velocity approximations, contact forces, or friction coefficients between the one or more objects;
        apply a preconditioner to the force-based formulation to perform a gradient descent;
        solve an energy minimization problem, using a primal formulation, to solve one or more constraints of the set of constraints for simulation; and
        simulate the one or more objects to satisfy the set of constraints of the simulation by updating states of the one or more objects based on results from performing the gradient descent.

2. The system of claim 1, wherein the preconditioner comprises a Hessian approximation.

3. The system of claim 1, wherein the set of constraints for the simulation are satisfied at two or more frames of the simulation using an implicit penalty formulation.

4. The system of claim 1, wherein the force-based formulation with the preconditioner is a differentiable contact model using Coulomb friction.

5. The system of claim 1, wherein the one or more processors are further to perform collision detection of the one or more objects, during simulation, to determine the set of constraints.

6. The system of claim 1, wherein the one or more processors are further to compute contact forces in the force-based formulation that satisfy the set of constraints for the simulation.

7. The system of claim 1, wherein the one or more objects are modeled by a triangle mesh.

8. A processor, comprising:
one or more arithmetic logic units (ALUs) to:
determine one or more forces in a simulation of one or more objects to determine a set of constraints;
perform collision detection of the one or more objects that are to be simulated using a primal formulation;
generate a preconditioner for the primal formulation to perform a gradient descent;
solve an energy minimization problem, using the primal formulation, to simulate the one or more objects; and
update states of the one or more objects, based on results from the gradient descent and the set of constraints, to simulate collisions between the one or more objects.

9. The processor of claim 8, wherein the one or more ALUs are to generate the preconditioner for the primal formulation using approximations of second derivatives.

10. The processor of claim 9, wherein the one or more ALUs are to generate the preconditioner by dropping higher order terms corresponding to a geometric stiffness.

11. The processor of claim 8, wherein the primal formulation with the preconditioner is based on a differentiable contact model using Coulomb friction.

12. The processor of claim 8, wherein the collision detection comprises determining the set of constraints when simulating the one or more objects, wherein the set of constraints include friction coefficients.

13. The processor of claim 12, wherein the one or more ALUs are to satisfy the set of constraints at each frame, during simulation, using an implicit penalty formulation.

14. A method, comprising:
using one or more graphics processing units (GPUs) to execute code that performs a set of instructions that:
determines one or more constraints by at least determining one or more forces in a simulation of one or more objects;
performs a gradient descent by applying a preconditioner for a primal formulation;
solve an energy minimization problem, using the primal formulation, to solve the one or more constraints for simulation; and
uses one or more gradients resulting from performing the gradient descent to update states of the one or more objects to satisfy the one or more constraints for the simulation.

15. The method of claim 14, wherein the one or more GPUs are further to execute code to:
generate a square matrix of second-order partial derivatives of a multivariable function associated with the energy minimization problem; and
use the generated matrix as the preconditioner to perform the gradient descent.

16. The method of claim 15, wherein the preconditioner is a diagonally invertible preconditioner.

17. The method of claim 15, wherein the primal formulation with the preconditioner is a differentiable contact model using Coulomb friction.

18. The method of claim 14, wherein the one or more objects comprise triangle meshes that, when simulated, experience contact forces.

19. The method of claim 14, wherein the one or more GPUs are further to execute code to use the updated states of the one or more objects when performing a simulation for rigid body contacts.

20. The method of claim 14, wherein the one or more GPUs are further to execute code to use the updated states of the one or more objects when performing simulation for at least one of:
generation of data for training a neural network of a control stack of an autonomous or semi-autonomous machine;
generation of data for training a neural network of a perception stack of an autonomous or semi-autonomous machine;
validation of a control stack of an autonomous or semi-autonomous machine;
validation of a perception stack of an autonomous or semi-autonomous machine;
generation of graphical output using ray-tracing for simulating lighting conditions in a rendered scene;
generation of data for a dataset used to train a deep learning model; or
generation of data for augmenting a dataset used to train a deep learning model.

\* \* \* \* \*